(12) United States Patent
Yamada

(10) Patent No.: US 9,502,931 B2
(45) Date of Patent: Nov. 22, 2016

(54) BRUSHLESS MOTOR

(71) Applicant: ASMO CO., LTD., Shizuoka-ken (JP)

(72) Inventor: Yoji Yamada, Hamamatsu (JP)

(73) Assignee: ASMO CO., LTD., Shizuoka-ken (JP)

( * ) Notice: Subject to any disclaimer, the term of this patent is extended or adjusted under 35 U.S.C. 154(b) by 664 days.

(21) Appl. No.: 13/831,641

(22) Filed: Mar. 15, 2013

(65) Prior Publication Data

US 2013/0313938 A1    Nov. 28, 2013

(30) Foreign Application Priority Data

Mar. 23, 2012 (JP) ................ 2012-067983
Mar. 27, 2012 (JP) ................ 2012-072116
Apr. 12, 2012 (JP) ................ 2012-091165
Apr. 16, 2012 (JP) ................ 2012-093211
May 11, 2012 (JP) ................ 2012-109734
May 22, 2012 (JP) ................ 2012-116605
Jul. 18, 2012 (JP) ................ 2012-159832

(51) Int. Cl.
*H02K 1/27* (2006.01)
*H02K 21/12* (2006.01)
*H02K 3/28* (2006.01)

(52) U.S. Cl.
CPC .......... *H02K 1/2713* (2013.01); *H02K 1/2746* (2013.01); *H02K 21/12* (2013.01); *H02K 3/28* (2013.01)

(58) Field of Classification Search
CPC ............................ H02K 21/044; H02K 1/243
USPC .......................... 310/156.66, 156.15, 156.69
See application file for complete search history.

(56) References Cited

U.S. PATENT DOCUMENTS 4,388,545 A * 6/1983 Honsinger ............. H02K 21/46
310/156.66
5,682,073 A    10/1997 Mizuno
(Continued)

FOREIGN PATENT DOCUMENTS

JP    S52-74410 U    6/1977
JP    S60-96163 A    5/1985
(Continued)

OTHER PUBLICATIONS

Japanese Office Action of JP 2012-093211 dated Aug. 13, 2015 with its English Translation.
(Continued)

*Primary Examiner* — Naishadh Desai
(74) *Attorney, Agent, or Firm* — Christensen Fonder P.A.

(57) ABSTRACT

A brushless motor includes a first rotor core, a second rotor core, and a field magnet member. The first rotor core includes primary projecting pieces arranged along a circumferential direction at equal intervals. The second rotor core has the same shape as the first rotor core, and includes secondary projecting pieces arranged along the circumferential direction at equal intervals. The secondary projecting pieces are positioned between the primary projecting pieces that are adjacent to one another in the circumferential direction. The field magnet member is arranged between the first rotor core and the second rotor core. The field magnet member is magnetized along an axial direction to generate primary magnetic poles in the primary projecting pieces, and generate secondary magnetic poles in the secondary projecting pieces. A rotor includes the first rotor core, the second rotor core, and the field magnet member.

3 Claims, 56 Drawing Sheets

(56) References Cited

U.S. PATENT DOCUMENTS

| | | | |
|---|---|---|---|
| 5,952,749 A | 9/1999 | Umeda et al. | |
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,020,669 A | 2/2000 | Umeda et al. | |
| 6,051,906 A | 4/2000 | Umeda et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A | 10/2000 | Umeda et al. | |
| 6,144,136 A | 11/2000 | Umeda et al. | |
| 6,181,043 B1 | 1/2001 | Kusase et al. | |
| 6,181,045 B1 | 1/2001 | Umeda et al. | |
| 6,198,190 B1 | 3/2001 | Umeda et al. | |
| 6,291,918 B1 | 9/2001 | Umeda et al. | |
| 6,459,177 B1 | 10/2002 | Nakamura et al. | |
| 6,459,186 B1 | 10/2002 | Umeda et al. | |
| 6,774,512 B2 * | 8/2004 | Takagi | H02K 37/14 310/156.01 |
| 7,876,013 B2 * | 1/2011 | Okubo | H02K 1/278 310/114 |
| 2003/0102758 A1 | 6/2003 | Kusase et al. | |
| 2003/0102764 A1 | 6/2003 | Kusase et al. | |
| 2005/0040721 A1 | 2/2005 | Kusase et al. | |
| 2005/0236920 A1 | 10/2005 | Kusase et al. | |
| 2006/0082238 A1 | 4/2006 | Kusase et al. | |
| 2006/0238058 A1 | 10/2006 | Koide et al. | |
| 2007/0273243 A1 | 11/2007 | Okumoto et al. | |
| 2009/0096314 A1 | 4/2009 | Atarashi et al. | |
| 2009/0218901 A1 * | 9/2009 | Rigaud | H02K 21/044 310/156.15 |
| 2010/0042295 A1 | 2/2010 | Shibata et al. | |
| 2010/0288577 A1 | 11/2010 | Sonoda et al. | |
| 2010/0289370 A1 | 11/2010 | Roth et al. | |
| 2010/0295403 A1 | 11/2010 | Morita et al. | |
| 2010/0308680 A1 | 12/2010 | Yamada et al. | |
| 2011/0140562 A1 | 6/2011 | Kato et al. | |
| 2011/0148240 A1 | 6/2011 | Koide et al. | |
| 2011/0193440 A1 | 8/2011 | Yamada et al. | |
| 2012/0001509 A1 | 1/2012 | Yamada et al. | |
| 2012/0056502 A1 | 3/2012 | Cai et al. | |
| 2013/0119812 A1 | 5/2013 | Takizawa et al. | |
| 2014/0265703 A1 | 9/2014 | Yamada et al. | |

FOREIGN PATENT DOCUMENTS

| | | |
|---|---|---|
| JP | S61-112553 A | 5/1986 |
| JP | S62-272836 A | 11/1987 |
| JP | S63-015176 U | 2/1988 |
| JP | H1-214250 A | 8/1989 |
| JP | H03-393555 U | 8/1989 |
| JP | 5-43749 U | 6/1993 |
| JP | H6-351206 A | 12/1994 |
| JP | H09-327139 A | 12/1997 |
| JP | H11-164499 A | 6/1999 |
| JP | 2000-236652 A | 8/2000 |
| JP | 2000-270503 A | 9/2000 |
| JP | 2001-197711 A | 7/2001 |
| JP | 2002-359953 A | 12/2002 |
| JP | 2003-164125 A | 6/2003 |
| JP | 2004-048920 A | 2/2004 |
| JP | 2004-096874 A | 3/2004 |
| JP | 2004-350427 A | 12/2004 |
| JP | 2005-122026 A | 5/2005 |
| JP | 2006-288187 A | 10/2006 |
| JP | 2007-318901 A | 12/2007 |
| JP | 2007-318998 A | 12/2007 |
| JP | 2007-330025 A | 12/2007 |
| JP | 2008120214 | 5/2008 |
| JP | 2009-095139 A | 4/2009 |
| JP | 2009-148020 A | 7/2009 |
| JP | 2010-035375 A | 2/2010 |
| JP | 2010-531130 A | 9/2010 |
| JP | 2010-252417 A | 11/2010 |
| JP | 2011-004583 A | 1/2011 |
| JP | 2011-103759 A | 5/2011 |
| JP | 2011135735 | 7/2011 |
| JP | 2012-16126 A | 1/2012 |
| JP | 2012-16131 A | 1/2012 |
| JP | 2012-506683 A | 3/2012 |
| JP | 2012-529877 A | 11/2012 |
| WO | WO 2007/072622 A1 | 6/2007 |
| WO | WO 2007/132768 A1 | 11/2007 |
| WO | WO 2009/125506 | 10/2009 |
| WO | WO 2012/014836 A1 | 2/2012 |

OTHER PUBLICATIONS

Japanese Office Action of JP 2012-091165 dated Sep. 11, 2015 with its English Translation.
Japanese Office Action of JP 2012-072116 dated Sep. 11, 2015 with its English Translation.
Japanese Office Action of JP 2012-159832 dated Jan. 20, 2016 with its English Translation.
Japanese Office Action of JP 2012-093211 dated Mar. 15, 2016 with its English Translation.
Japanese Office Action of JP 2012-109734 dated Oct. 30, 2015 with its English Translation.
Japanese Office Action of JP 2012-116605 dated Oct. 30, 2015 with its English Translation.
Japanese Office Action of JP 2012-116605, dated Jun. 7, 2016 along with its English Translation.

* cited by examiner

Other Circumferential Side ↔ One Circumferential Side

BRUSHLESS MOTOR

The present invention relates to a brushless motor for an electric power steering device.

Conventionally, a motor of a so-called SPM (Surface Permanent Magnet) type is used as a motor for an electric power steering device. The motor of the SPM type includes a rotor and a plurality of magnets. The plurality of magnets is adhered to an outer circumferential surface of the rotor so that two types of magnets having magnetic poles of different orientations are alternately arranged in a radial direction along a circumferential direction. However, in the SPM type motor, when an abnormality occurs in the electric power steering device and the motor becomes inoperable, assist force is not generated by the motor. Instead, brake torque unique to a magnet type motor is generated. As a result, the steering wheel becomes heavy, and steering becomes difficult.

In this regard, taking into consideration that the SPM type motor may become inoperable due to an abnormality in the electric power steering device, a motor of a so-called IPM (Interior Permanent Magnet) type has been proposed in which two types of magnets having magnetic poles of different orientations in the radial direction are alternately arranged in the circumferential direction and embedded in the rotor (for example, Japanese Laid-Open Patent Publication No. 2000-236652). Specifically, in the IPM motor, the embedment of the magnets in the rotor decreases the brake torque that is unique to the magnet type motor generated in an inoperable situation. This results in the steering becoming lighter, and the steering becomes easier.

However, in an IPM type brushless motor capable of reducing the brake torque when the motor is inoperable, the number of magnets is determined in accordance with the number of the magnetic poles. This increases the number of magnets. Accordingly, in the brushless motor used in the electric power steering device, a motor that can replace the motor of the IPM type is desired.

It is an object of the present invention to provide a brushless motor for an electric power steering device that allows for reduction in the number of magnets and reduce the brake torque taking into consideration that the motor may become inoperable.

To achieve the above object, one aspect of the present invention provides a brushless motor for an electric power steering device that applies assist torque to a steering wheel. The brushless motor includes a first rotor core, a second rotor core, and a field magnet member. The first rotor core includes a plurality of primary projecting pieces arranged along a circumferential direction at equal intervals. The second rotor core is shaped identically to the first rotor core and includes a plurality of secondary projecting pieces arranged along the circumferential direction at equal intervals. The second rotor core is arranged relative to the first rotor core so that the secondary projecting pieces are positioned between the primary projecting pieces that are adjacent to each other in the circumferential direction. The field magnet member is arranged between the first rotor core and the second rotor core. The field magnet member is magnetized along an axial direction to generate primary magnetic poles in the primary projecting pieces and generate secondary magnetic poles in the secondary projecting pieces. The first rotor core, the second rotor core, and the field magnet member form a rotor.

A second aspect of the present invention provides a brushless motor for an electric power steering device including a steering shaft. The brushless motor includes a rotor of an SPM type structure moved in cooperation with the steering shaft. The rotor includes an outer circumferential surface having a plurality of slots, a plurality of salient pole iron cores each positioned between the slots that are adjacent to each other, and a plurality of permanent magnets respectively arranged in the slots. The permanent magnets include arcuate outer circumferential surfaces that extend along a circumferential direction. The salient pole iron cores include arcuate outer circumferential surfaces that extend along the circumferential direction. The permanent magnets are magnetized so that portions at an outer side in a radial direction of all of the permanent magnets function as primary magnetic poles. The plurality of salient pole iron cores is configured so that portions at an outer side in the radial direction of all of the salient pole iron cores function as secondary magnetic poles that differ from the primary magnetic poles.

A third aspect of the present invention provides a brushless motor including a ring-shaped stator and a rotor. The rotor is arranged at an inner side of the stator and includes a rotor core and a field magnet. The rotor core includes a first core member and a second core member. The first core member includes a substantially disk-shaped first core base and a plurality of primary cog-shaped magnetic poles arranged at equal intervals on an outer circumferential portion of the first core base. Each of the primary cog-shaped magnetic poles is projected toward an outer side in a radial direction and extended in an axial direction. The second core member includes a substantially disk-shaped second core base and a plurality of secondary cog-shaped magnetic poles arranged at equal intervals on an outer circumferential portion of the second core base. Each of the secondary cog-shaped magnetic poles is projected toward an outer side in the radial direction and extended in the axial direction. The secondary cog-shaped magnetic poles are each arranged between the primary cog-shaped magnetic poles that are adjacent to each other. The field magnet is arranged between the first core base and the second core base in the axial direction. The field magnet is configured so that when magnetized along the axial direction, the primary cog-shaped magnetic poles function as primary magnetic poles and the secondary cog-shaped magnetic poles function as secondary magnetic poles. The stator is of a slotless structure including a cylindrical armature coil that surrounds an outer circumference of the rotor.

A fourth aspect of the present invention provides a brushless motor including a stator, a rotary shaft, an outer rotor, and an inner rotor. The stator includes a plurality of teeth portions, a ring portion, and a plurality of coils. The plurality of teeth portions each include an outer tooth extending toward an outer side in a radial direction and an inner tooth extending toward an inner side in the radial direction. The ring portion includes a plurality of coupling portions that couples the teeth portions so that the teeth portions are arranged in a ring-shaped manner at equal pitches and are each positioned between the teeth portions that are adjacent to each other, and a plurality of coils respectively wound around the plurality of coupling portions. The rotary shaft extends through the center of the stator along an axial direction. The outer rotor is fixed to the rotary shaft and positioned at an outer side of the stator in the radial direction. The inner rotor is fixed to the rotary shaft and positioned at an inner side of the stator in the radial direction. At least one of the outer rotor and the inner rotor includes a first rotor core, a second rotor core, and a field magnet member. The first rotor core includes a disk-shaped first core base and a plurality of primary projecting pieces arranged on the first core base at equal intervals. Each of the primary projecting pieces projects from the first core base, and a distal end of each of the primary projecting pieces is bent to extend along an axial direction. The second rotor core includes a disk-shaped second core base and a plurality of secondary projecting pieces arranged at equal intervals on the second core base. Each of the plurality of secondary projecting pieces is projected from the second core base. A distal end of each of the secondary projecting pieces is bent to extend in the axial direction. The second rotor core is arranged relative to the first rotor core so that the secondary projecting pieces are each positioned between the primary projecting pieces that are adjacent to each other in the axial direction. The field magnet member is arranged between the first rotor core and the second rotor core. The field magnet member is magnetized along the axial direction to generate primary magnetic poles in the primary projecting pieces of the first rotor core and generate secondary magnetic poles in the secondary projecting pieces of the second rotor core.

A fifth aspect of the present invention is a brushless motor including a stator, a rotary shaft, an outer rotor, and an inner rotor. The stator includes a plurality of teeth, a ring portion, and a plurality of coils. The plurality of teeth portions each include an outer tooth extending toward an outer side in a radial direction and an inner tooth extending toward an inner side in the radial direction. The ring portion includes a plurality of coupling portions that couples the teeth portions so that the teeth portions are arranged in a ring-shape manner at equal pitches and are each positioned between the teeth portions that are adjacent to each other. The plurality of coils are respectively wound around the coupling portions. The rotary shaft extends through the center of the stator along an axial direction. The outer rotor is arranged at an outer side of the stator. The outer rotor includes a cylindrical outer rotor core having a cover and fixed to the rotary shaft, a plurality of outer magnet magnetic pole portions, a plurality of outer iron core portions, and a plurality of outer permanent magnets respectively embedded in the outer magnet magnetic pole portions. The outer magnet magnetic pole portions and the outer iron core portions are defined by dividing an inner circumferential surface of the outer rotor core along a circumferential direction. The outer magnet magnetic pole portions and the outer iron core portions are alternately arranged along the circumferential direction and each extended along the axial direction. The inner rotor is arranged at an inner side of the stator. The inner rotor includes a cylindrical columnar inner rotor core fixed to the rotary shaft, a plurality of inner magnet magnetic pole portions, a plurality of inner iron core portions, and a plurality of inner permanent magnets respectively embedded in the inner magnet magnetic pole portions. The inner magnet magnetic pole portions and the inner iron core portions are defined by dividing an outer circumferential surface of the inner rotor core along the circumferential direction, and the inner magnet magnetic pole portions and the inner iron core portions are alternately arranged along the circumferential direction and each extended along the axial direction.

A sixth aspect of the present invention provides a brushless motor including a first rotor core, a second rotor core, and a field magnet member. The first rotor core includes a substantially disk-shaped first core base and a plurality of primary cog-shaped magnetic poles arranged at equal intervals on an outer circumferential portion of the first core base. Each of the primary cog-shaped magnetic poles projects toward an outer side in a radial direction and extends in an axial direction to include at least one end portion in the axial direction. The first core base includes an inner end surface, positioned at an inner side in the axial direction, and a shaft fixing portion. The second rotor core is arranged to oppose the first rotor core and includes a substantially disk-shaped second core base and a plurality of secondary cog-shaped magnetic poles arranged on an outer circumferential portion of the second core base at equal intervals. Each of the secondary cog-shaped magnetic poles projects toward the outer side in the radial direction and extended in the axial direction to include at least one end portion in the axial direction. The secondary cog-shaped magnetic poles are each arranged between the primary cog-shaped magnetic poles that are adjacent to each other. The second core base includes an inner end surface, positioned at an inner side in the axial direction, and a shaft fixing portion. The field magnet is arranged between the inner end surface of the first core base and the inner end surface of the second core base. The field magnet is magnetized along the axial direction so that the primary cog-shaped magnetic poles function as primary magnetic poles and the secondary cog-shaped magnetic poles function as secondary magnetic poles. The rotary shaft is axially supported by bearings respectively arranged at an outer side of the first core base in the axial direction and an outer side of the second core base in the axial direction. The rotary shaft is inserted through and fixed to the shaft fixing portions of the first and second core bases. The primary cog-shaped magnetic poles are projected toward the second core base in the axial direction and the secondary cog-shaped magnetic poles are projected toward the first core base in the axial direction so that the primary and secondary cog-shaped magnetic poles are arranged on an outer circumference of the field magnet. At least one of the end portions of the primary cog-shaped magnetic poles in the axial direction and the end portions of the secondary cog-shaped magnetic poles in the axial direction are positioned at the outer side in the axial direction from at least one of the shaft fixing portion of the first core base and the shaft fixing portion of the second core base.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF PREFERRED EMBODIMENTS

First Embodiment

A first embodiment of a brushless motor M according to the present invention will now be described with reference to FIG. 1 to FIG. 6.

Figure 1:
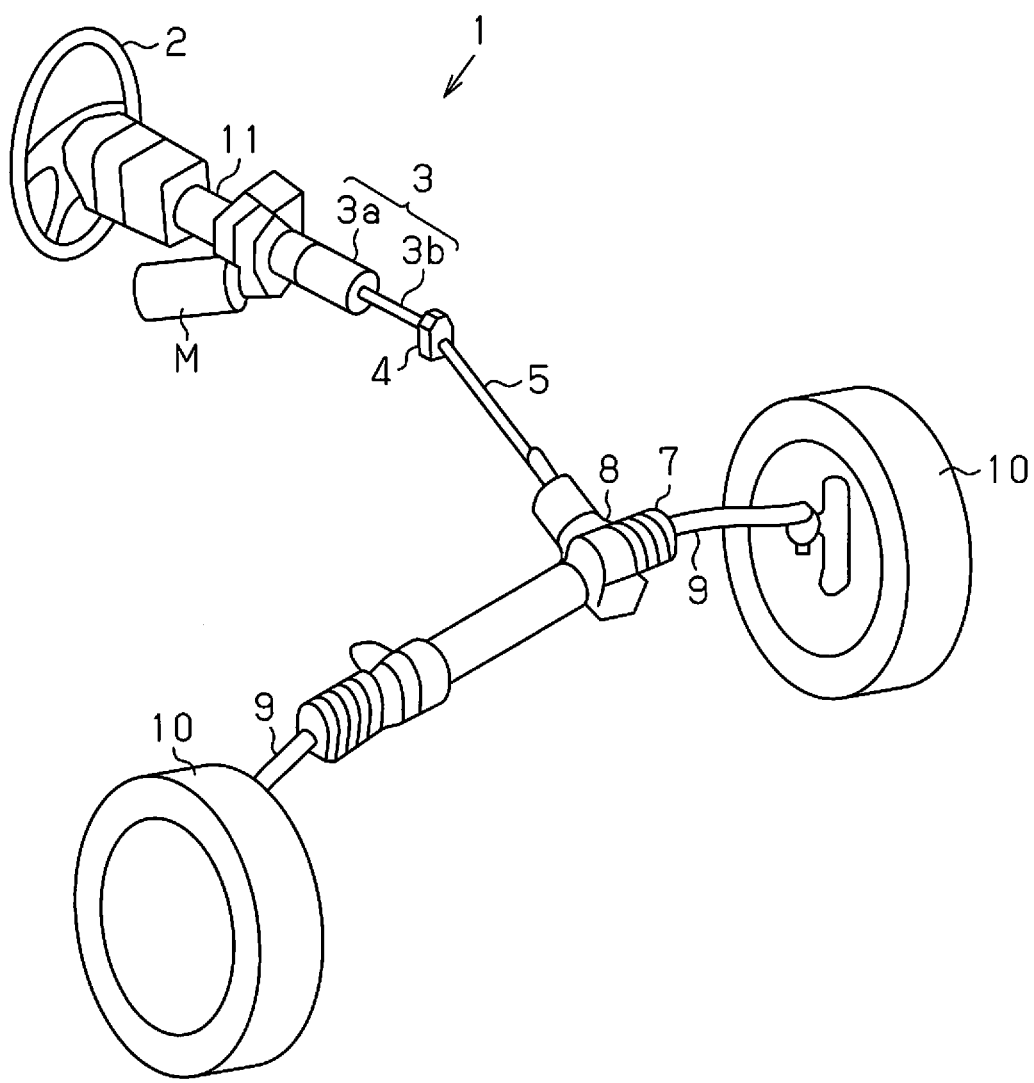
FIG. 1 is a schematic diagram showing an electric power steering device in which a brushless motor of the present invention is to be provided.

As shown in FIG. 1, an electric power steering device 1 is of a column assist type and includes a steering shaft 3, onto which a steering wheel 2 is fixed at its basal portion, and a distal portion of the steering shaft 3 is coupled to an intermediator 5 by a universal joint 4. The steering shaft 3 includes an input shaft 3a and an output shaft 3b, and has part of the output shaft 3b inserted to the cylindrical input shaft 3a. The steering wheel 2 is fixed at a basal portion of the input shaft 3a, and the universal joint 4 is coupled to a distal portion of the output shaft 3b. Further, a torsion bar (not shown) is arranged between the input shaft 3a and the output shaft 3b, which causes the output shaft 3b to rotate by following rotation of the input shaft 3a.

Further, rotation and steering torque based on a steering operation are transmitted to a rack 7 and a pinion shaft 8, and the rack 7 reciprocally moves in a vehicle width direction by rotation of the pinion shaft 8. Thus, a steering angle of steered wheels 10 is changed by tie rods 9 coupled to both ends of the rack 7.

A steering column 11 is mounted on the input shaft 3a of the steering shaft 3. The steering column 11 includes a three-phase brushless motor (hereafter referred to as a brushless motor) M as a motor for the electric power steering device. The brushless motor M applies auxiliary steering force (hereafter referred to as assist torque) to the steering wheel 2 during a steering operation by controlling rotation of the input shaft 3a.

More specifically, when the input shaft 3a rotates based on the operation of the steering wheel 2, a displacement is occurs between the input shaft 3a and the output shaft 3b, and this displacement is exhibited as torsion in the torsion bar. That is, the output shaft 3b causes delay with respect to the rotation of the input shaft 3a due to road surface resistance and the like on the steered wheels 10, whereby the torsion is generated in the torsion bar.

Then, a torsion angle of the torsion bar is detected by a torque sensor that is not shown, the steering torque on the input shaft 3a (steering wheel 2) is detected, the assist torque applied to the steering wheel is calculated based on the detected steering torque, and the brushless motor M is driven and controlled.

Figure 2:
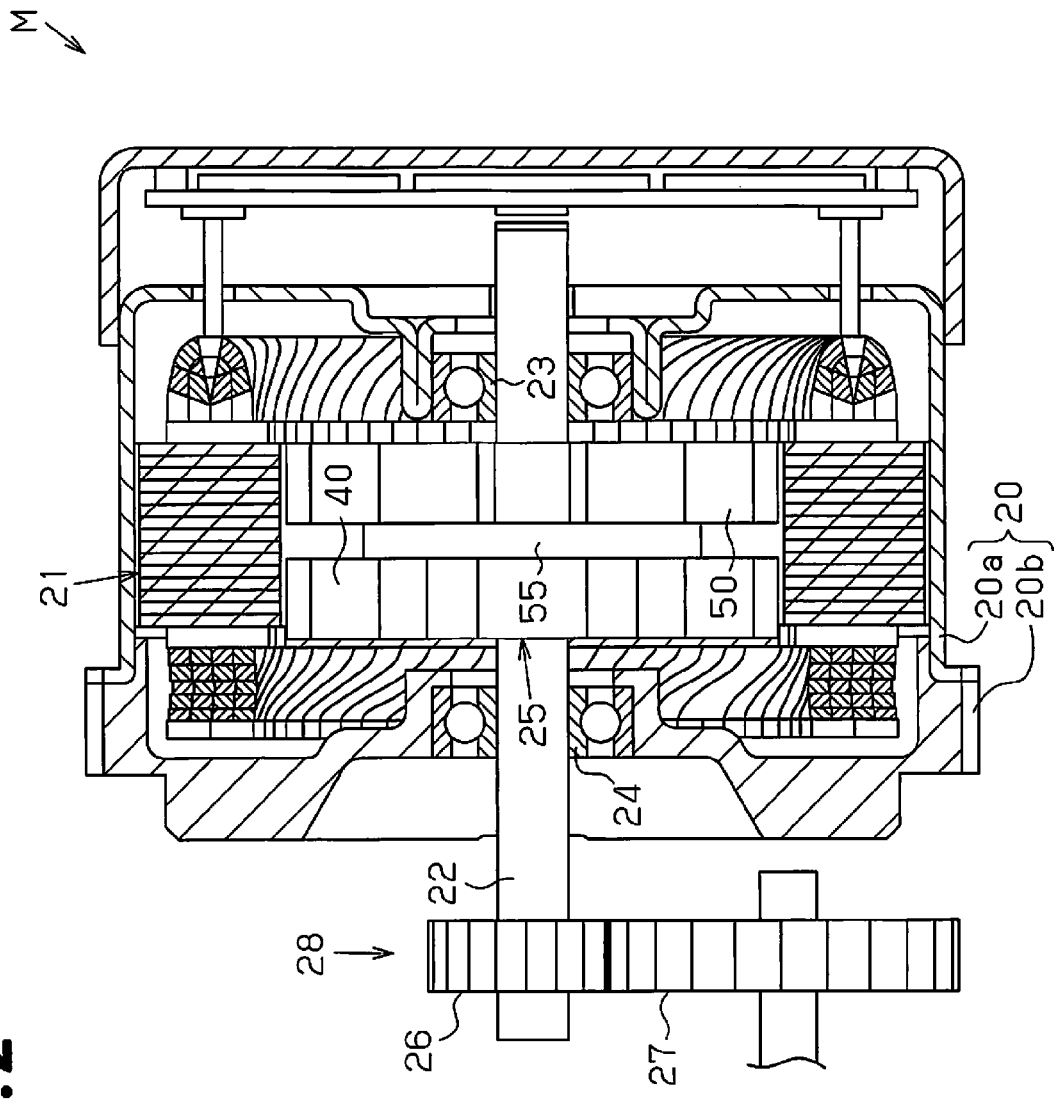
FIG. 2 is a cross-sectional view in an axial direction showing the brushless motor of a first embodiment.

As shown in FIG. 2, a motor casing 20 of the brushless motor M includes a motor housing 20a formed in a bottomed cylinder shape with an outer diameter of 10 cm, and a front cover 20b that closes an opening of the motor housing 20a at a front side.

A stator 21 is fixed to an inner circumferential surface of the motor housing 20a, and at an inner side of the stator 21, a rotor 25 fixed to a rotary shaft 22 formed from a nonmagnetic member (for example, stainless steel) and configured to rotate integrally with the rotary shaft 22 is provided. Further, the rotary shaft 22 is supported in a rotatable manner by bearings 23, 24 arranged at the bottom portion of the motor housing 20a and the front cover 20b, and has a distal portion projected out from the front cover 20b drivingly coupled to the input shaft 3a of the steering shaft 3 by a reduction gear device 28 formed by gears 26, 27 and the like.

Figure 3:
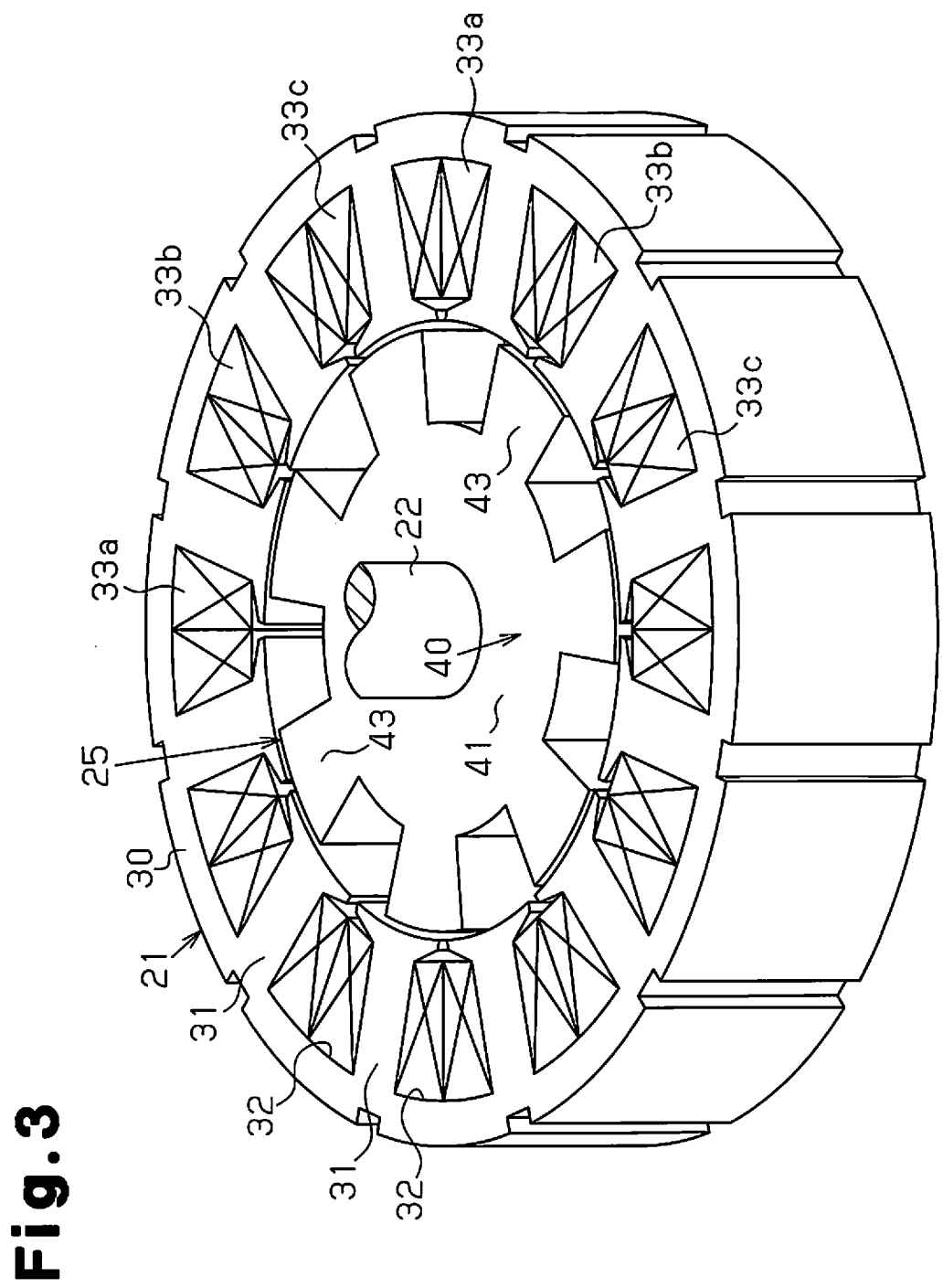
FIG. 3 is an overall perspective view showing a stator and a rotor of FIG. 2.

As shown in FIG. 3, the stator 21 includes a cylindrical stator core 30, and an outer circumferential surface of the stator core 30 is fixed to the motor housing 20a. At an inner side of the stator core 30, a plurality of teeth 31 formed along an axial direction and arranged at equal pitches in a circumferential direction is formed to extend out toward an inner side in a radial direction. The teeth 31 are T-shaped teeth that are formed so that both side surfaces of a distal portion in the circumferential direction project in the circumferential direction, and a distal end surface on the inner side in the radial direction is an arcuate surface having a center axis L1 of the rotary shaft 22 (see FIG. 4) as a center.

Further, a slot 32 is formed between a tooth 31 and a tooth 31. In the present embodiment, the number of the teeth 31 is 12, and the number of the slots 32 is 12, which is the same as the teeth 31.

Further, in each of the teeth 31, three-phase coils, namely a U-phase coil 33a, a V-phase coil 33b, and a W-phase coil 33c, are wound in a clockwise direction by concentrated winding.

Figure 5:
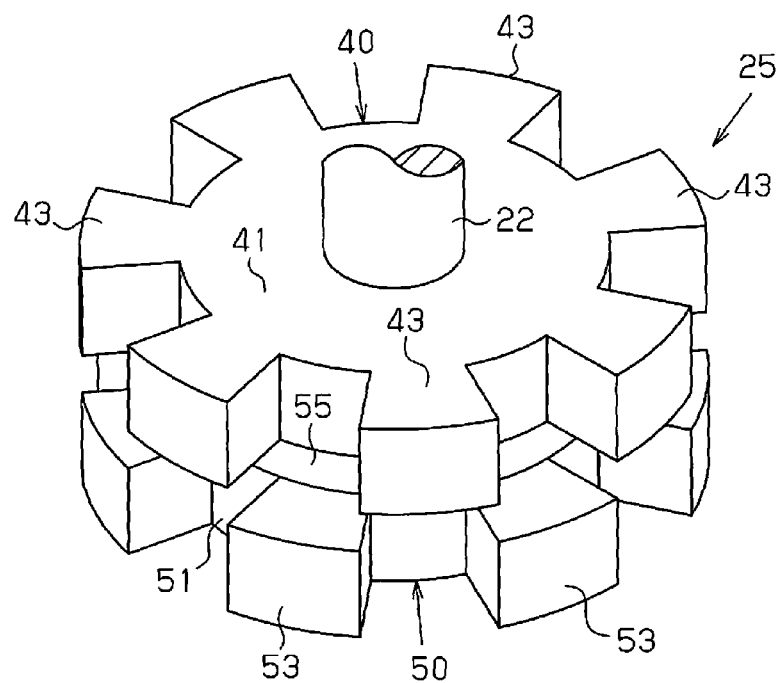
FIG. 5 is an overall perspective view showing the rotor of FIG. 2.
Figure 6:
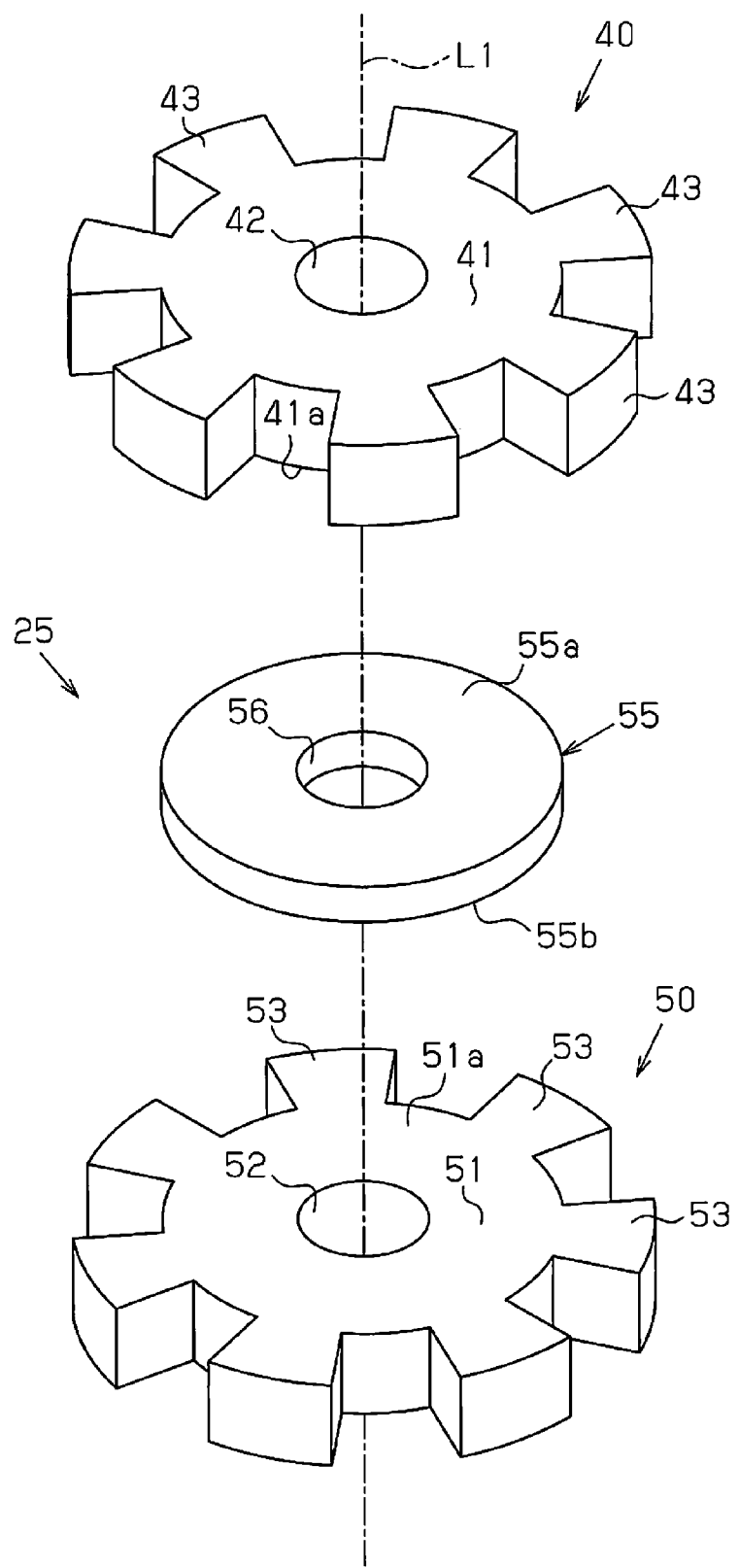
FIG. 6 is an exploded perspective view showing the rotor of FIG. 2.

As shown in FIG. 3, the rotor 25 fixed to the rotary shaft 22 is arranged on the inner side of the stator 21. As shown in FIG. 5 and FIG. 6, the rotor 25 includes a first rotor core 40, a second rotor core 50 arranged to oppose the first rotor core 40, and a disk magnet (field magnet member) 55 arranged between the first rotor core 40 and the second rotor core 50.

The first rotor core 40 is formed by an electromagnetic steel plate in the present embodiment, and as shown in FIG. 5 and FIG. 6, includes a first core base 41. A through hole 42 for inserting the rotary shaft 22 and fixing the same is formed at a central position of the first core base 41. Further, seven primary projecting pieces 43 are projected at equal pitches in the radial direction on an outer circumferential surface of the first core base 41. An outer circumferential surface of each of the primary projecting pieces 43 is formed in an arcuate surface having a center axis L1 of the rotary shaft 22 as a center.

Further, a width of each of the primary projecting pieces 43 in the circumferential direction is smaller than an interval between a primary projecting piece 43 and a primary projecting piece 43. Thus, the primary projecting pieces 43 at the regular pitch in the circumferential direction are projected on the first rotor core 40.

The second rotor core 50 is formed by an electromagnetic steel plate in the present embodiment, is identical in shape as the first rotor core 40, and as shown in FIG. 5 and FIG. 6, includes a second core base 51. A through hole 52 for inserting the rotary shaft 22 and fixing the same is formed at a central position of the second core base 51. Further, seven secondary projecting pieces 53 are projected at equal pitches in the radial direction on an outer circumferential surface of the second core base 51. An outer circumferential surface of each of the secondary projecting pieces 53 is formed in an arcuate surface having the center axis L1 of the rotary shaft 22 as a center.

Further, a width of each of the secondary projecting pieces 53 in the circumferential direction is smaller than an interval between a secondary projecting piece 53 and a secondary projecting piece 53. Thus, the secondary projecting pieces 53 at the regular pitch in the circumferential direction are projected on the second rotor core 50.

Figure 4:
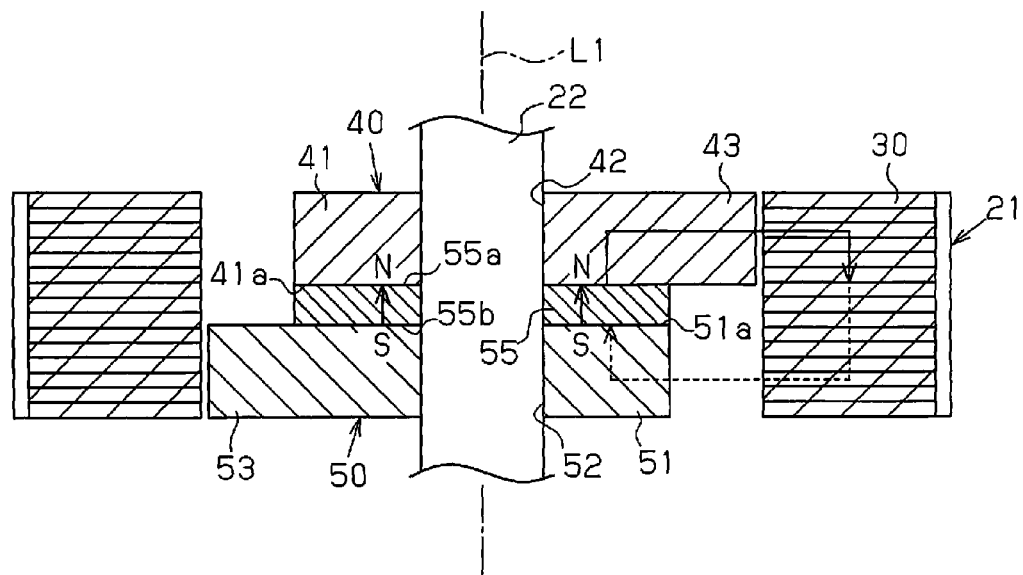
FIG. 4 is a cross-sectional view in a radial direction of the stator and the rotor of FIG. 2.

Moreover, the second rotor core 50 is arranged and fixed to the rotary shaft 22 so that the secondary projecting pieces 53 are at positions that do not oppose the primary projecting pieces 43 of the first rotor core 40 when seen in an axial direction with respect to the first rotor core 40, that is, each of them is to be positioned between a primary projecting piece 43 and a primary projecting piece 43. When the first rotor core 40 and the second rotor core 50 are arranged and fixed to the rotary shaft 22, as shown in FIG. 4 and FIG. 5, the disk magnet 55 is coupled between the first rotor core 40 and the second rotor core 50.

In the present embodiment, the disk magnet 55 is a disk-shaped permanent magnet formed from a Neodymium magnet. As shown in FIG. 6, the disk magnet 55 has a through hole 56 formed at its central position for inserting the rotary shaft 22. Further, one side surface 55a of the disk magnet 55 contacts a surface of the first core base 41 on a second rotor core 50 side (opposing surface 41a), and the other side surface 55b of the disk magnet 55 contacts a surface of the second core base 51 on a first rotor core 40 side (opposing surface 51a), respectively, and the disk magnet 55 is sandwiched and fixed between the first rotor core 40 and the second rotor core 50.

An outer diameter of the disk magnet 55 is in conformance with outer diameters of the first and second core bases 41, 51 of the first and second rotor cores 40, 50. In other words, the outer diameter of the disk magnet 55 is smaller than outer diameters of the first and second rotor cores 40, 50 (primary and secondary projecting pieces 43, 53).

Further, a thickness of the disk magnet 55 is set to a predetermined thickness that is thinner than a thickness of the first core base 41 (second core base 51). Meanwhile, when the rotor 25 is formed by the disk magnet 55 coupled between a set of the first rotor core 40 and the second rotor core 50, a length of the rotor 25 in the axial direction is set to a length that is one-half or less of the outer diameter of the rotor 25.

As shown in FIG. 4, the disk magnet 55 is magnetized in the axial direction, and is magnetized so that a portion on the side of the first rotor core 40 is an N pole, and a portion on the side of the second rotor core 50 is an S pole. Accordingly, due to the disk magnet 55, the primary projecting pieces 43 of the first rotor core 40 function as the N poles (primary magnetic poles), and the secondary projecting pieces 53 of the second rotor core 50 function as the S poles (secondary magnetic poles).

As a result, the rotor 25 of the present embodiment functions as a magnet field system rotor using the disk magnet 55. Further, the rotor 25 of the present embodiment is a rotor that has the primary projecting pieces 43 function as the N poles and the secondary projecting pieces 53 function as the S poles arranged alternately in the circumferential direction, and has the number of magnetic poles of fourteen poles (the number of magnetic pole pairs is seven). That is, the number of magnetic pole pairs in the rotor 25 of the present embodiment is an odd number of three or more.

Next, the operation of the brushless motor M of the first embodiment described above will be described.

The rotor 25 of the brushless motor M of the present embodiment provides the disk magnet 55 between the first rotor core 40 and the second rotor core 50. Further, the N poles (primary magnetic poles) are generated in the primary projecting pieces 43 of the first rotor core 40, and the S poles (secondary magnetic poles) are generated in the secondary projecting pieces 53 of the second rotor core 50 by the disk magnet 55, whereby the rotor 25 of the magnet field system is configured. Thus, the length of the rotor 25 in the axial direction may be decreased, and moreover the size of the brushless motor M may be small. In addition, since the length of the rotor 25 in the axial direction is set to the length that is one-half or less of the outer diameter of the rotor 25, the size of the brushless motor M in the axial direction becomes even smaller.

Further, the rotor 25 rotates by forming a rotating magnetic field in the stator 21 by conducting the U-phase coil 33$a$, the V-phase coil 33$b$, and the W-phase coil 33$c$ wound on the teeth 31. This rotation of the rotor 25 drives the input shaft 3$a$ of the steering shaft 3 with the rotary shaft 22 and the reduction gear device 28, and applies assist torque to the steering wheel 2.

Further, when rotating and driving the brushless motor M, since a large load is driven by the reduction gear device 28, the brushless motor M (rotor 25) rotates at a high speed of 2000 rpm or more. Here, since the disk magnet 55 is arranged between the first rotor core 40 and the second rotor core 50 and is sandwiched in the axial direction by the first and second rotor cores 40, 50 (first and second core bases 41, 51), it is not separated by centrifugal force.

Further, both side surfaces 55$a$, 55$b$ of the disk magnet 55 are in pressure contact with the opposing surfaces 41$a$, 51$a$ of the first and second core bases 41, 51 of the first and second rotor cores 40, 50 formed of the electromagnetic steel plates. Thus, even if an ambient temperature is in a high temperature range of 100° C. or greater, a change in the external temperature of the disk magnet 55 is hindered by the first and second rotor cores 40, 50. Thus, heat durability is improved. Especially, in the disk magnet 55 formed of Neodymium magnet having an irreversible demagnetization in the high temperature zone, a structure with superior heat durability is obtained. Thus, in a wide variety of external temperature environments, a change in a magnetic property of the disk magnet 55 can be suppressed by the rotating magnetic field generated by the electric conduction of the U-phase coil 33$a$, the V-phase coil 33$b$, and the W-phase coil 33$c$.

As a result, high power, low cogging torque, and low torque rippling can be maintained under any temperature under use, and satisfactory steering feel can be achieved.

Further, due to the rotor 25 having the odd number of magnetic pole pair being seven, when seen in rotor core units, since magnetic poles of the same polarity do not take 180° opposed positions in the circumferential direction, the shape provides stability against magnetic vibration, so the low cogging torque and low torque rippling can be improved and satisfactory steering feel can be achieved.

Next, advantages of the first embodiment will be described below.

(1) According to the present embodiment, a change in the external temperature is hindered by the first and second rotor cores 40, 50. This improves the heat durability of the disk magnet 55. Change in the magnetic property (demagnetization) of the disk magnet 55 caused by the rotating magnetic field is hardly generated under various external temperature environments.

(2) According to the present embodiment, since the disk magnet 55 is arranged between the first rotor core 40 and the second rotor core 50 and is sandwiched in the axial direction, the disk magnet 55 is prevented from being separated by the centrifugal force.

(3) According to the present embodiment, the rotor 25 is a magnet field system rotor that sandwiches the disk magnet 55 by the two rotor cores 40, 50, and the size of the brushless motor M may be small. In addition, since the length of the rotor 25 in the axial direction is set to the length that is one-half or less of the outer diameter of the rotor 25, the size of the brushless motor M in the axial direction may be even smaller.

(4) According to the present embodiment, since the number of magnetic pole pairs of the rotor 25 is an odd number of seven, the shape provides stability against magnetic vibration, and the low cogging torque and low torque rippling can further be improved, and the satisfactory steering feel can be achieved.

(5) According to the present embodiment, reluctance torque can be utilized at the primary and secondary projecting pieces 43, 53, so the brake torque generated upon the breakage can be suppressed low, the steering is made lighter, and the steering becomes easier.

Second Embodiment

Next, a second embodiment of the present invention will now be described with reference to FIG. 7 to FIG. 10. The present embodiment differs in a configuration of the brushless motor M of the first embodiment. Thus, the differing brushless motor M will only be described in detail, and common portions will be omitted for the convenience sake of the explanation.

Figure 7:
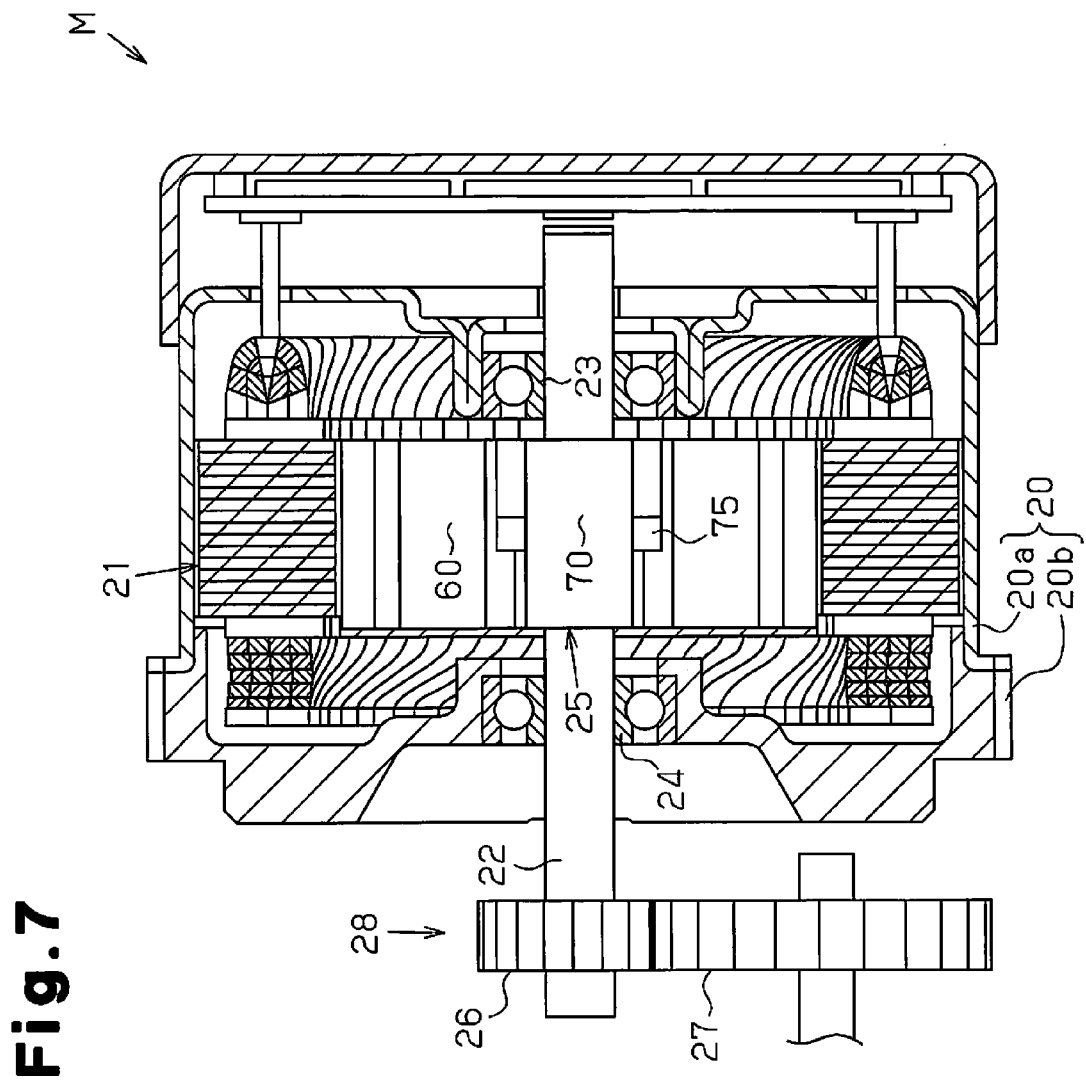
FIG. 7 is a cross-sectional view in an axial direction showing a brushless motor of a second embodiment.

FIG. 7 is a cross-sectional view of a brushless motor M of the present embodiment, and a stator 21 is fixed to an inner side of a motor housing 20a.

Figure 8:
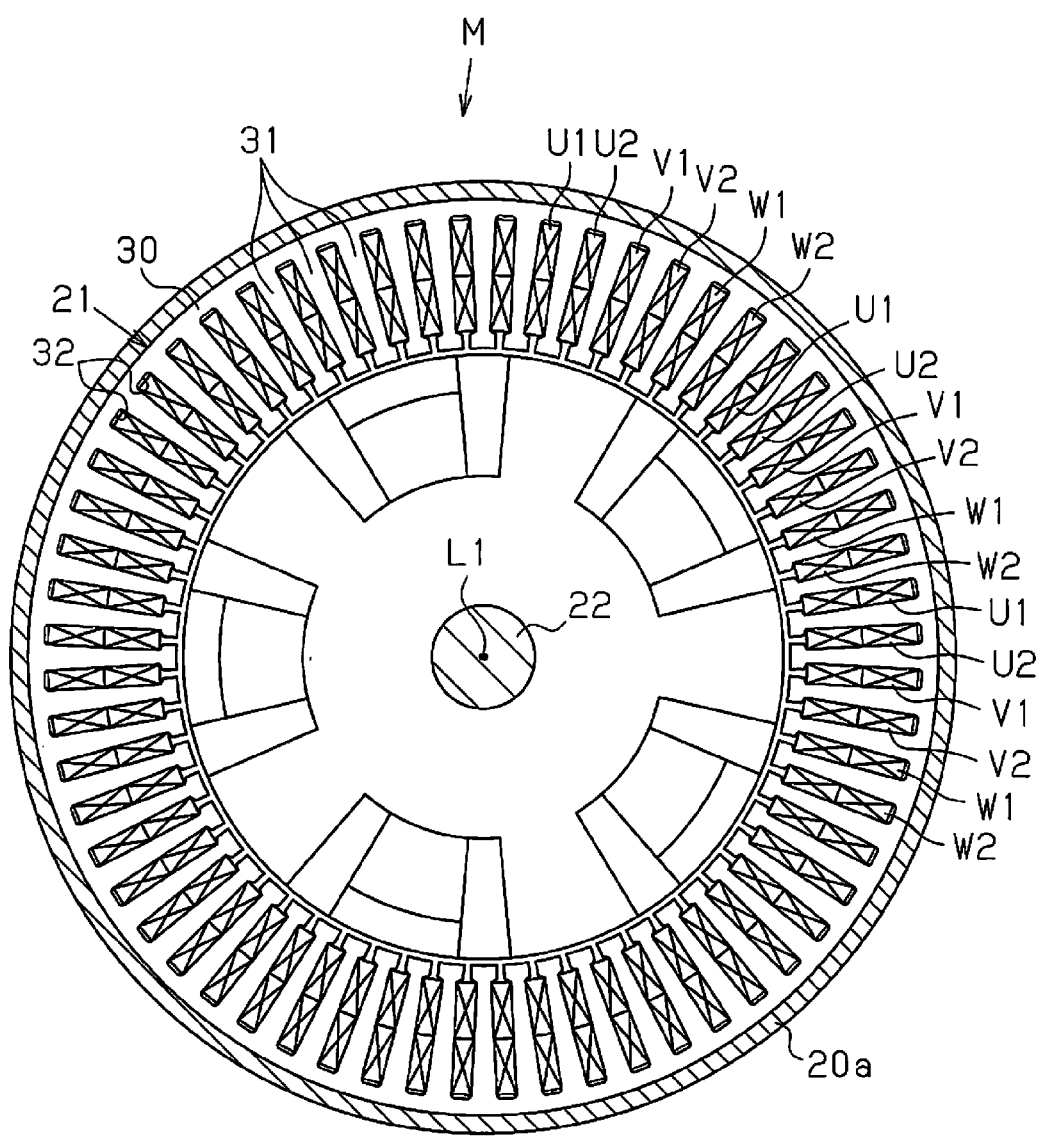
FIG. 8 is a cross-sectional view in a radial direction showing the brushless motor of FIG. 7.

As shown in FIG. 8, a stator core 30 of the stator 21 has sixty teeth 31 projected on an inner side in a radial direction. Accordingly, sixty slots 32 are formed between the teeth 31, and the sixty slots 32 are formed at an equiangular interval as viewed from a center axis L1 of a rotary shaft 22.

Segment conductor (SC) coils are wound around the sixty teeth 31. In more detail, two three-phase coils of U-phase, V-phase, and W-phase, that is, a first system three-phase coil and a second system three-phase coil are formed on the sixty teeth 31 in a clockwise direction.

The first system three-phase coil and the second system three-phase coil wound on the stator core 30 of the present embodiment are wound by distributed winding, in the clockwise direction in an order of a first system U-phase coil U1, a second system U-phase coil U2, a first system V-phase coil V1, a second system V-phase coil V2, a first system W-phase coil W1, and a second system W-phase coil W2. More specifically, the first system U-phase coil U1, the second system U-phase coil U2, the first system V-phase coil V1, the second system V-phase coil V2, the first system W-phase coil W1, and the second system W-phase coil W2 are wound in an order with six teeth 31 as one set, and are wound in order with the teeth 31 in the set being shifted by one.

Here, of the respective phase coils U1, V1, W1 in the first system and the respective phase coils U2, V2, W2 in the second system that are wound by the distributed winding, adjacent and same-phased coils are wound in each slot 32.

The first system three-phase coil and the second system three-phase coil are configured so that three-phase power voltages with 30° phase difference from one another are applied thereto. That is, U-phase power voltages with 30° phase difference are applied to the first system U-phase coil U1 and the second system U-phase coil U2, V-phase power voltages with 30° phase difference are applied to the first system V-phase coil V1 and the second system V-phase coil V2, and W-phase power voltages with 30° phase difference are applied to the first system W-phase coil W1 and the second system W-phase coil W2.

As shown in FIG. 8 to FIG. 11, the rotor 25 arranged on the inner side of the stator 21 includes a first rotor core 60, a second rotor core 70 arranged opposed to the first rotor core 60, and a disk magnet (field magnet member) 75 arranged between the first rotor core 60 and the second rotor core 70.

As shown in FIG. 8 to FIG. 11, the first rotor core 60 includes a first core base 61 formed in a substantially disk-shaped. A through hole 62 for inserting the rotary shaft 22 and fixing the same is formed at a central position of the first core base 61. Further, on an outer circumferential surface of the first core base 61, a plurality (five in the present embodiment) of primary projecting pieces 63 is arranged at equal intervals. Each of the primary projecting pieces 63 is projected to an outer side in a radial direction, and further, a distal end thereof bends, and is projected toward the second rotor core 70 along an axial direction.

Circumferential direction end surfaces 63a, 63b of the primary projecting piece 63 are flat surfaces extending in a radial direction (not being inclined with respect to the radial direction when as viewed from the axial direction), and the primary projecting piece 63 is formed with a sector-shaped cross-section in an axially vertical direction.

An angle of each primary projecting piece 63 in the circumferential direction, that is, an angle formed between the circumferential direction end surfaces 63a, 63b and the center axis L1 of the rotary shaft 22 is set smaller than an angle of a space between adjacent primary projecting piece 63 and primary projecting piece 63.

As shown in FIG. 8 to FIG. 11, the second rotor core 70 is identical in shape as the first rotor core 60, and a through hole 72 for inserting the rotary shaft 22 and fixing the same is formed at a central position of the second core base 71 formed in a substantially disk-shaped. Further, five secondary projecting pieces 73 are arranged at equal intervals on an outer circumferential surface of the second core base 71. Each of the secondary projecting pieces 73 projects toward the outer side in the radial direction, a distal end thereof bends, and is projected toward the first rotor core 60 along the axial direction.

Circumferential direction end surfaces 73a, 73b of the secondary projecting piece 73 are flat surfaces extending in the radial direction, and the secondary projecting piece 73 is formed with a sector-shaped cross-section in the axially vertical direction.

An angle of each secondary projecting piece 73 in the circumferential direction, that is, an angle formed between the circumferential direction end surfaces 73a, 73b and the center axis L1 of the rotary shaft 22 is set smaller than an angle of a space between the adjacent secondary projecting piece 73 and the secondary projecting piece 73.

Further, the second rotor core 70 is arranged and fixed so that the secondary projecting pieces 73 of the second rotor core 70 are respectively arranged between the primary projecting pieces 63 of the first rotor core 60 with respect to the first rotor core 60 as viewed from the axial direction. Here, the second rotor core 70 is coupled to the first rotor core 60 so that the disk magnet 75 is arranged between the first rotor core 60 and the second rotor core 70 in the axial direction.

Figure 11:
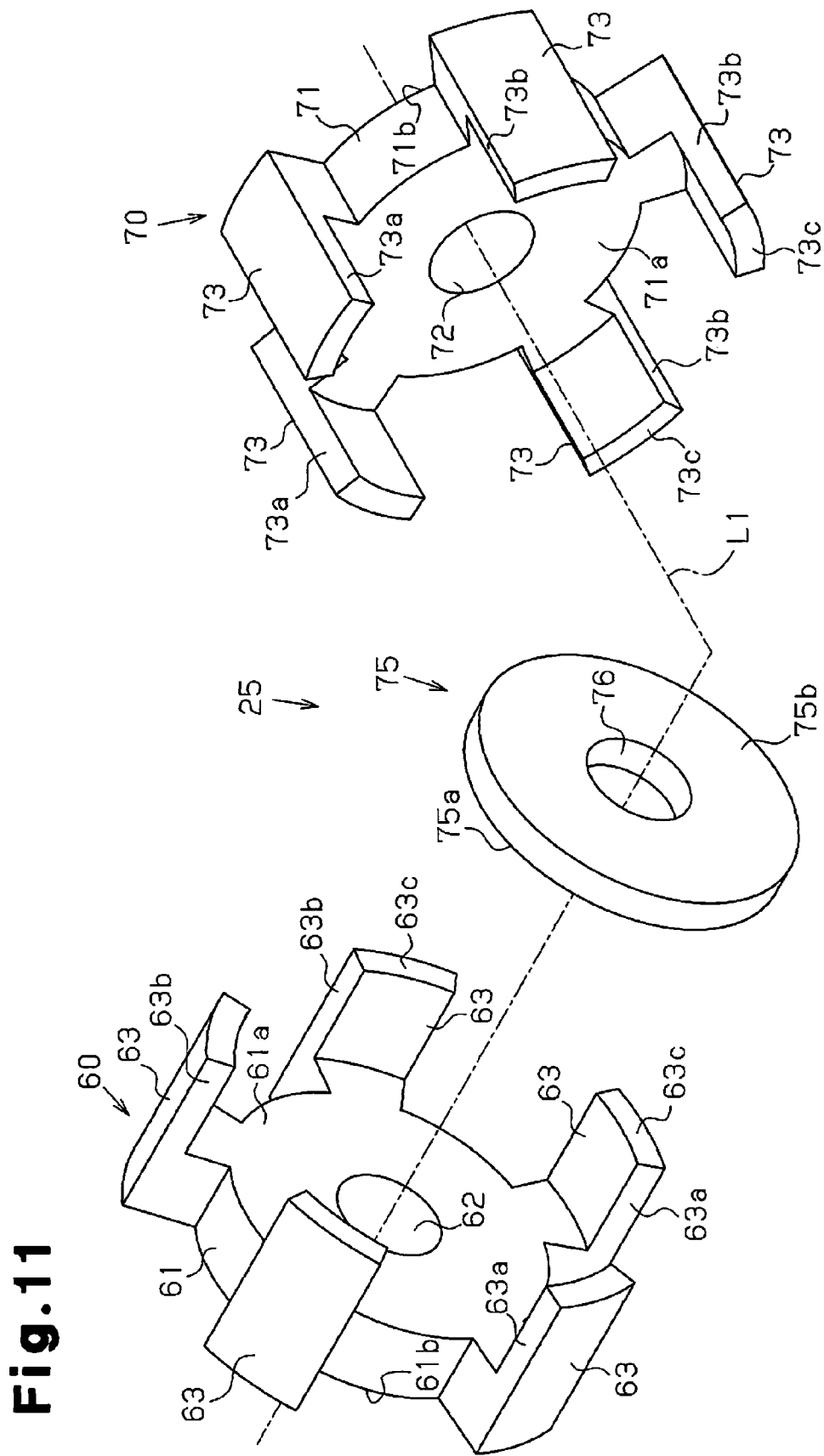
FIG. 11 is an exploded perspective view showing the rotor of FIG. 7.

More specifically, as shown in FIG. 11, the disk magnet 75 is sandwiched between a surface of the first core base 61 on a second core base 71 side (opposing surface 61a) and a surface of the second core base 71 on a first core base 61 side (opposing surface 71a).

Here, since the end surface 63a of the primary projecting piece 63 on one side in the circumferential direction and the end surface 73b of the secondary projecting piece 73 on the other side in the circumferential direction are formed to be parallel along the axial direction, a space between both end surfaces 63a, 73b is formed to form a substantially linear shape along the axial direction. Further, since the end surface 63b of the primary projecting piece 63 on the other side in the circumferential direction and the end surface 73a of the secondary projecting piece 73 on the one side in the circumferential direction are formed to be parallel along the axial direction, a space between both end surfaces 63b, 73a is formed to form a substantially linear shape along the axial direction.

In the present embodiment, the disk magnet 75 is a disk-shaped permanent magnet formed from a Neodymium magnet. As shown in FIG. 11, the disk magnet 75 has a through hole 76 formed at its central position for inserting the rotary shaft 22. Further, one side surface 75a of the disk magnet 75 contacts the opposing surface 61a of the first core base 61, and the other side surface 75b of the disk magnet 75 contacts the opposing surface 71a of the second core base 71, respectively, and the disk magnet 75 is sandwiched and fixed between the first rotor core 60 and the second rotor core 70.

An outer diameter of the disk magnet 75 is set in conformance with the outer diameters of the first and second core bases 61, 71, and a thickness thereof is set to a predetermined thickness.

That is, when the disk magnet 75 is arranged between the first rotor core 60 and the second rotor core 70, the distal end surfaces 63c of the primary projecting pieces 63 and the opposing surface 71b of the second core base 71 are formed to be leveled, and the distal end surfaces 73c of the secondary projecting pieces 73 and the opposing surface 61b of the first core base 61 are formed to be leveled.

Figure 9:
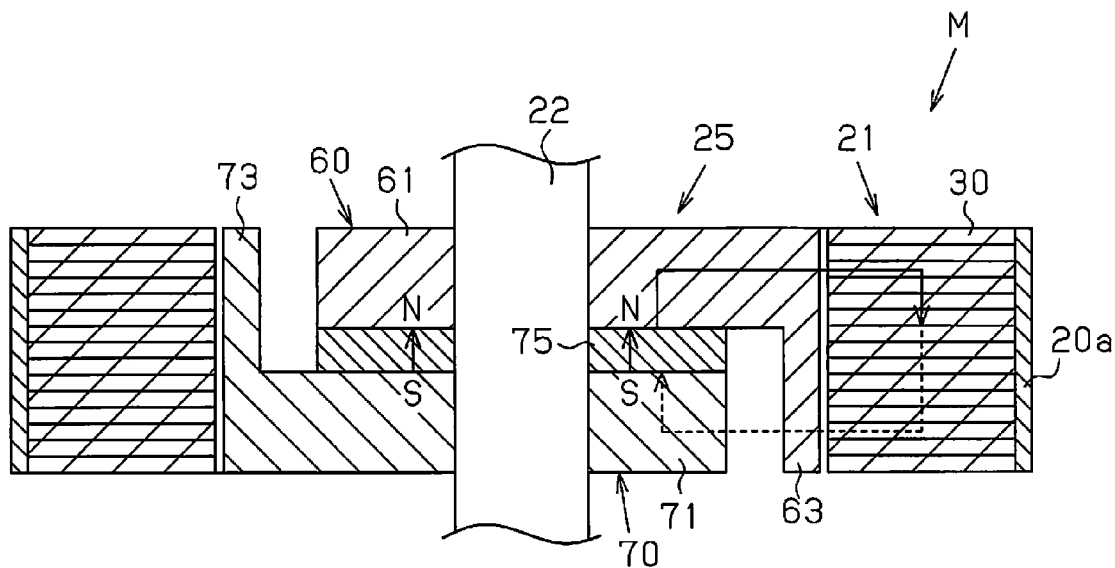
FIG. 9 is a cross-sectional view in the axial direction of a stator and a rotor of FIG. 7.
Figure 10:
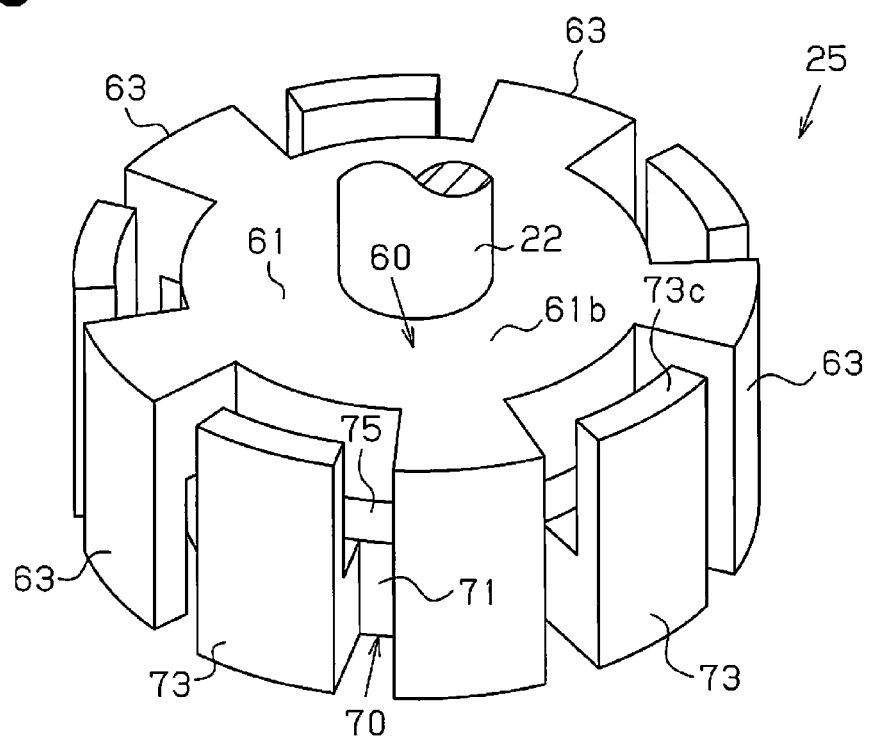
FIG. 10 is an overall perspective view showing of the rotor of FIG. 7.

As shown in FIG. 9, the disk magnet 75 is magnetized in the axial direction, and is magnetized so that a portion on the first rotor core 60 side becomes an N pole, and a portion on the second rotor core 70 side becomes an S pole. Thus, by the disk magnet 75, the primary projecting pieces 63 of the first rotor core 60 function as N poles (primary magnetic poles), and the secondary projecting pieces 73 of the second rotor core 70 function as the S poles (secondary magnetic poles).

As a result, the rotor 25 of the present embodiment becomes a rotor with a so-called Randell type structure using the disk magnet 75. Further, the rotor 25 of the present embodiment becomes a rotor having the primary projecting pieces 63 to be the N poles and the secondary projecting pieces 73 to be the S poles arranged alternately in the circumferential direction and having the number of magnetic poles of ten poles (the number of magnetic pole pairs being five). That is, the rotor 25 of the present embodiment has the number of magnetic pole pairs being an odd number of three or more.

Next, the operation of the brushless motor M of the second embodiment described above will be described.

The primary projecting pieces 63 of the first rotor core 60 are formed so that the primary projecting pieces 63 are projected to an outer side in a radial direction from an outer circumferential surface of the first core base 61, and distal ends thereof are bent to extend toward the second rotor core 70 along the axial direction. Thus, the portions of the primary projecting pieces 63 extended toward the second rotor core 70 along the axial direction function as the N poles. Further, the secondary projecting pieces 73 of the second rotor core 70 are formed so that the secondary projecting pieces 73 are projected to the outer side in the radial direction from an outer circumferential surface of the second core base 71, and distal ends thereof are bent to extend toward the first rotor core 60 along the axial direction. Thus, the portions of the secondary projecting pieces 73 extended toward the first rotor core 60 along the axial direction function as the S poles. Accordingly, the first rotor core 60 and the second rotor core 70 have the function as the so-called Randell type structure.

Further, since the number of the magnetic pole pairs is an odd number being five, the rotor 25 has a shape that is stable against magnetic vibration since the magnetic poles of the same polarity are not positioned to be opposed in 180° in the circumferential direction when seen in rotor core units, so low cogging torque and low torque rippling are further improved, and a satisfactory steering feel can be achieved.

Moreover, since the disk magnet 75 is in a state of having its both sides in the axial direction surrounded by the first and second core bases 61, 71 at the central portion of the rotor 25, and its outer side surface in the radial direction surrounded by the primary and secondary projecting pieces 63, 73, suppression of brake torque upon breakage becomes possible, whereby the steering is made lighter, and the steering becomes easier.

Next, the second embodiment has the following advantages in addition to the advantages of the first embodiment.

(6) According to the present embodiment, the portions of the primary projecting pieces 63 extended toward the second rotor core 70 along the axial direction are caused to function as the N poles. Further, the portions of the secondary projecting pieces 73 extended toward the first rotor core 60 along the axial direction are caused to function as the S poles. Thus, magnetic flux of the disk magnet 75 can more effectively be utilized in improving an output of the brushless motor M.

(7) In the present embodiment, since the number of magnetic pole pairs in the rotor 25 is made to be the odd number of five, the shape thereof becomes stable against the magnetic vibration, so the low cogging torque and low torque rippling are further improved, and the satisfactory steering feel can be achieved.

(8) In the present embodiment, since the disk magnet 73 is arranged in the state of being surrounded by the first and second core bases 61, 71 at the central portion of the rotor 25, and the primary and secondary projecting pieces 63, 73, the suppression of the brake torque upon breakage becomes possible.

Third Embodiment

Next, a third embodiment of the present invention will now be described with reference to FIG. 12 and FIG. 13.

The present embodiment is characterized in being a so-called tandem type having two rotors 25 of the second embodiment stacked. Accordingly, the characteristic portions will now be described in detail, and detailed explanation on common portions will be omitted.

Figure 12:
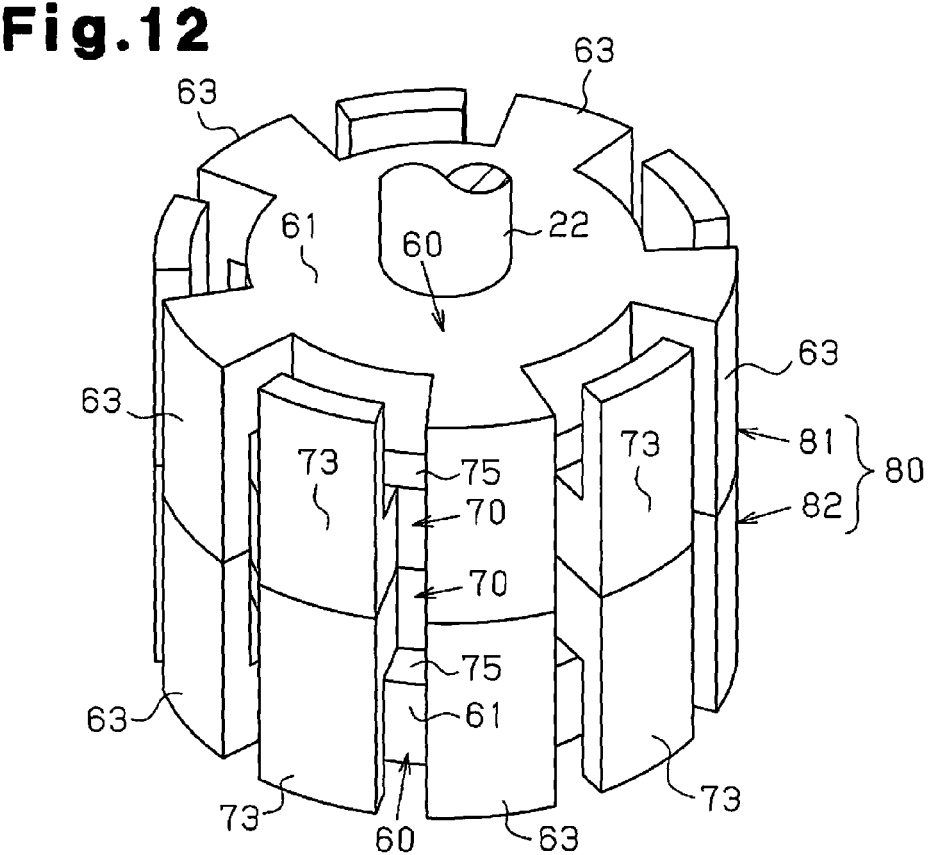
FIG. 12 is an overall perspective view showing a rotor of a brushless motor of a third embodiment.
Figure 13:
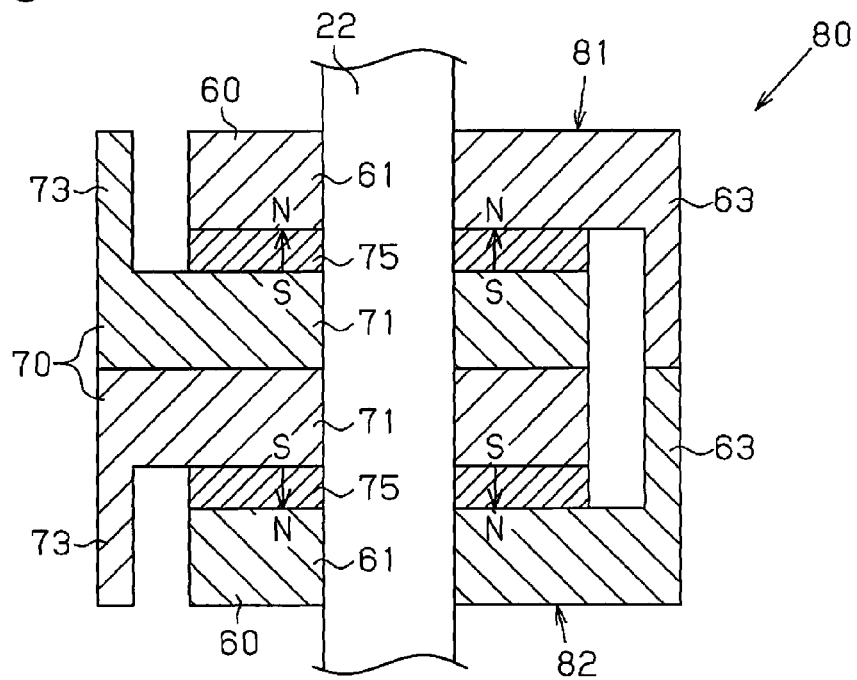
FIG. 13 is a cross-sectional view in an axial direction of the rotor of FIG. 12.

As shown in FIG. 12 and FIG. 13, a rotor 80 of a brushless motor M of the present embodiment includes a front side rotor 81 and a rear side rotor 82.

The front side rotor 81 has identical configuration as the rotor 25 of the second embodiment, and includes a first rotor core 60 provided with primary projecting pieces 63, a second rotor core 70 provided with secondary projecting pieces 73, and a disk magnet (field magnet member) 75.

The rear side rotor 82 has identical configuration as the rotor 25 of the second embodiment, and includes a first rotor core 60 provided with primary projecting pieces 63, a second rotor core 70 provided with secondary projecting pieces 73, and a disk magnet (field magnet member) 75.

Further, when the front side rotor 81 and the rear side rotor 82 are stacked, the second rotor core 70 of the front side rotor 81 and the second rotor core 70 of the rear side rotor 82 are stacked to make contact, and the rotor 80 is fixed to a rotary shaft 22.

Next, the operation of the third embodiment described above will be described.

Since the rotor 80 is formed in the tandem structure having stacked the front side rotor 81 and the rear side rotor 82 having same configuration as one another, a compact and high power motor can be formed.

Further, since the front side rotor 81 and the rear side rotor 82 are formed in the same shape and of same materials, component management and assembly work in assembling the rotor 80 become easy.

According to the third embodiment, a compact motor with even a higher power can be realized in addition to the advantages of the second embodiment.

Fourth Embodiment

Next, a fourth embodiment of the present invention will now be described with reference to FIG. 14 to FIG. 16.

The present embodiment adds a new configuration to the rotor 25 of the second embodiment. Thus, the portion of the newly added configuration will be described in detail, and detailed explanation of common portions will be omitted.

Figure 14:
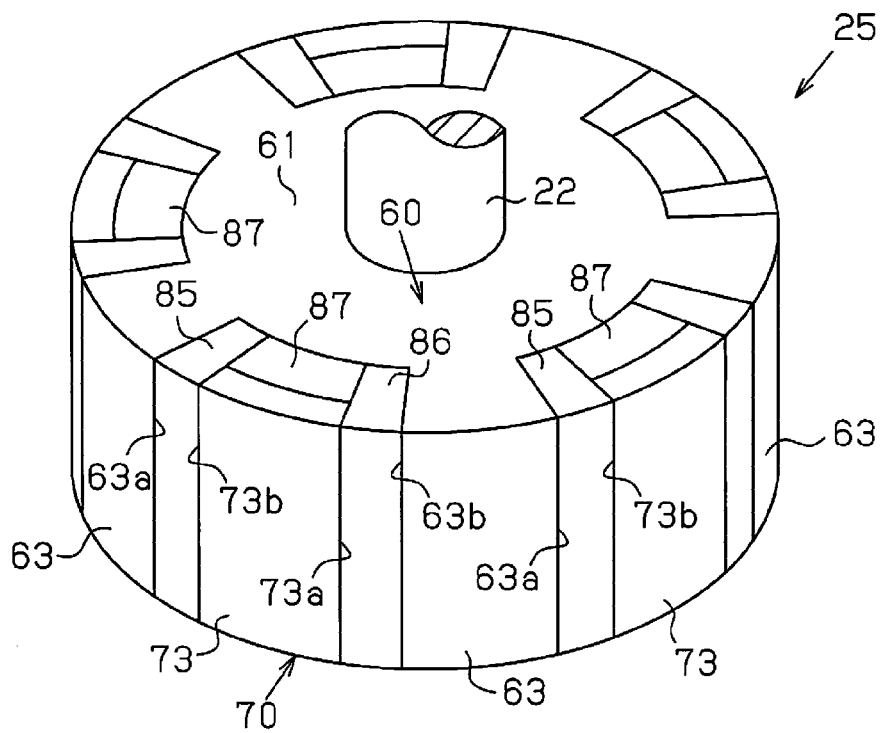
FIG. 14 is an overall perspective view of a rotor of a fourth embodiment as viewed from a first rotor core.
Figure 15:
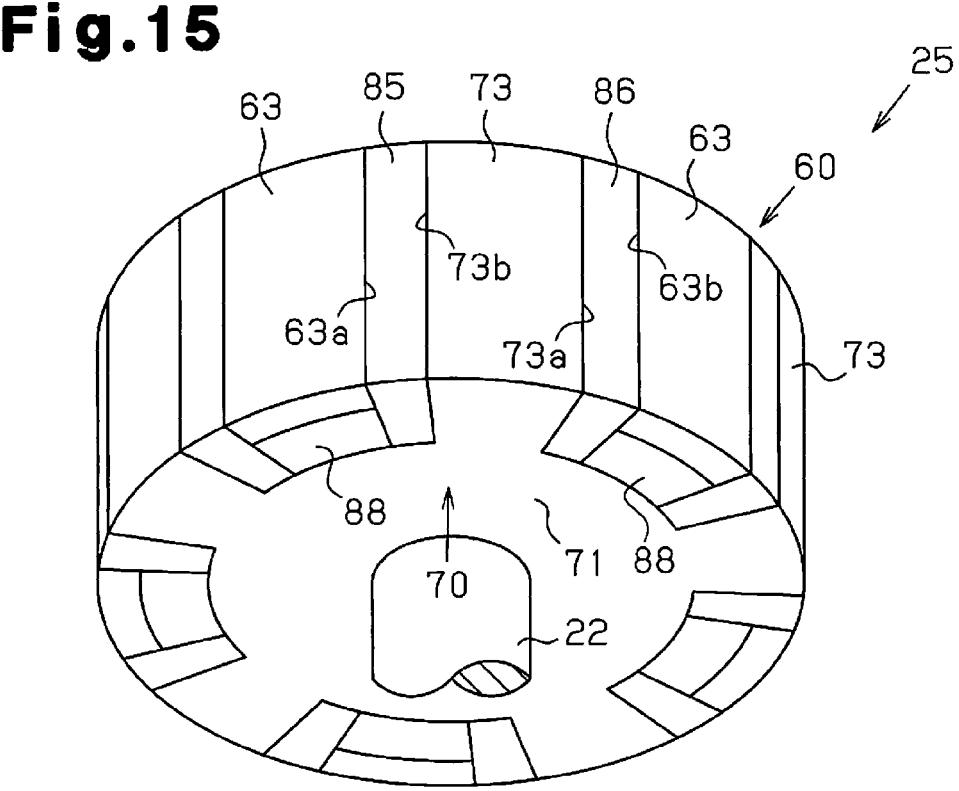
FIG. 15 is an overall perspective view of the rotor of FIG. 14 as viewed from a second rotor core.
Figure 16:
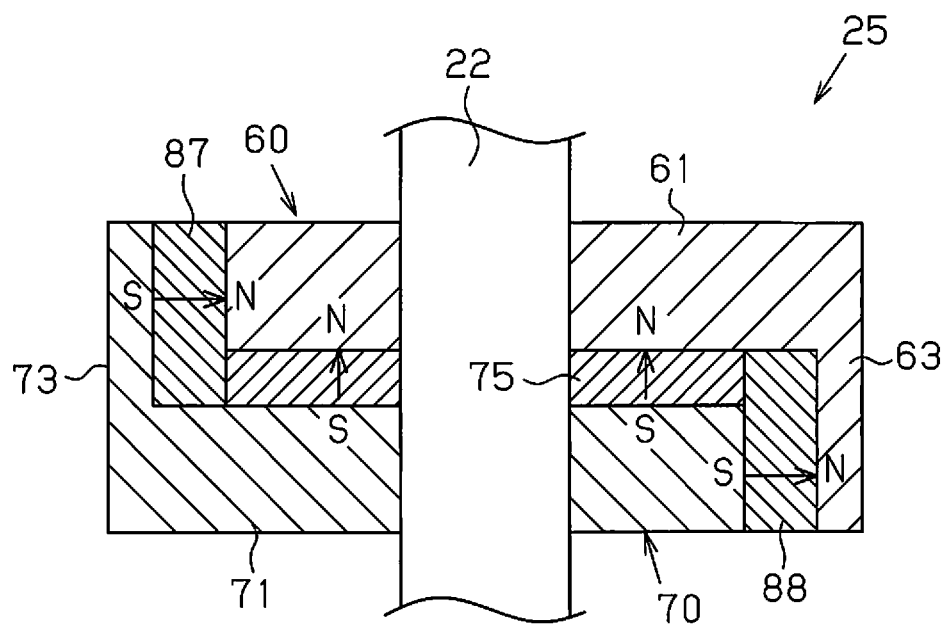
FIG. 16 is a cross-sectional view in an axial direction of the rotor of FIG. 14.

As shown in FIG. 14 and FIG. 15, square column-shaped primary interpolar magnets 85 elongated in an axial direction are respectively sandwiched and fixed between circumferential direction end surfaces 63a of primary projecting pieces 63 and circumferential direction end surfaces 73b of secondary projecting pieces 73. The primary interpolar magnets 85 are projected so that their inner side surfaces in a radial direction contact first and second core bases 61, 71, and are projected so that their outer side surfaces in the radial direction become leveled with outer circumferential surfaces of the primary and secondary projecting pieces 63, 73.

Each of the primary interpolar magnets 85 is a ferrite magnet and is magnetized in the circumferential direction, and is magnetized so that a portion on a side of the primary projecting pieces 63 functioning as N poles similarly becomes the N pole, and a portion on a side of the secondary projecting pieces 73 functioning as S poles similarly becomes the S pole.

As shown in FIG. 14 and FIG. 15, square column-shaped secondary interpolar magnets 86 elongated in the axial direction are respectively sandwiched and fixed between circumferential direction end surfaces 63b of primary projecting pieces 63 and circumferential direction end surfaces 73a of secondary projecting pieces 73. The secondary interpolar magnets 86 are projected so that their inner side surfaces in the radial direction contact first and second core bases 61, 71, and are projected so that their outer side surfaces in the radial direction become leveled with the outer circumferential surfaces of the primary and secondary projecting pieces 63, 73.

Each of the secondary interpolar magnets 86 is a ferrite magnet and is magnetized in the circumferential direction, and is magnetized so that a portion on a side of the primary projecting pieces 63 functioning as the N poles similarly becomes the N pole, and a portion on a side of the secondary projecting pieces 73 functioning as the S poles similarly becomes the S pole.

That is, the primary interpolar magnets 85 and the secondary interpolar magnets 86 are magnetized so that their magnetized directions are opposite in the circumferential direction.

Further, as shown in FIG. 14, by providing the primary and secondary interpolar magnets 85, 86, primary back face magnets 87 are fitted and fixed in spaces positioned between the primary and secondary interpolar magnets 85, 86 and opened toward a first rotor core 60, more specifically the spaces formed by inner circumferential surfaces of the secondary projecting pieces 73 and an outer circumferential surface formed by the first core base 61 and the disk magnet 75. The primary back face magnets 87 are ferrite magnets and are magnetized in the radial direction, and are magnetized so that the vicinities of the surfaces contacting the secondary projecting pieces 73 become the S poles in the same manner as the secondary projecting pieces 73, and further, the vicinities of the surfaces contacting the first core base 61 become the N poles in the same manner as the first core base 61.

In the same manner, as shown in FIG. 15, secondary back face magnets 88 are fitted and fixed in spaces positioned between the primary and secondary interpolar magnets 85, 86 and opened toward the second rotor core 70, more specifically, the spaces formed by inner circumferential surfaces of the primary projecting pieces 63 and an outer circumferential surface formed by the second core base 71 and the disk magnet 75. The secondary back face magnets 88 are ferrite magnets and are magnetized in the radial direction, and are magnetized so that the vicinities of the surfaces contacting the primary projecting pieces 63 become the N poles in the same manner as the primary projecting pieces 63, and further, the vicinities of the surfaces contacting the second core base 71 become the S poles in the same manner as the second core base 71.

Next, the operation of the fourth embodiment described above will be described.

At the part of the first core base 61, a rotor in which the secondary projecting pieces 73 having the portions on a stator 21 side functioning as salient poles of S poles by the primary back face magnets 87 of the S poles, and the primary projecting pieces 63 functioning as salient poles of the N poles by the primary back face magnets 87 are alternately formed in the circumferential direction is formed.

Further, at the part of the second core base 71, a rotor in which the primary projecting pieces 63 having the portions on the stator 21 side functioning as salient poles of the N poles by the secondary back face magnets 88 of the N pole and the secondary projecting pieces 73 functioning as salient poles of the S poles by the secondary back face magnets 88 are alternately formed in the circumferential direction is formed.

Further, at the part of the disk magnet 75, a rotor of a Randell type structure in which the primary projecting pieces 63 having the portions on the stator 21 side functioning as the N poles by the primary back face magnets 87 and the secondary projecting pieces 73 having the portions on the stator 21 side functioning as the S poles by the secondary back face magnets 88 are alternately formed in the circumferential direction is formed.

The fourth embodiment has the following advantages in addition to the effects of the first and second embodiments.

(9) According to the present embodiment, the primary and secondary interpolar magnets 85, 86 magnetized to be of the same polarities as the primary and secondary projecting pieces 63, 73 are arranged between the primary projecting pieces 63 and the secondary projecting pieces 73. Leakage of the magnetic flux between the respective primary projecting pieces 63 of the first rotor core and the respective secondary projecting pieces 73 of the second rotor core can be reduced, and the magnetic flux of the disk magnet 75 can be utilized more effectively in improving the output of the brushless motor M.

(10) According to the present embodiment, since a flow of the magnetic flux at the portion of the first core base 61 becomes a desired flow by the primary back face magnets 87, magnetic flux short circuiting of the disk magnet 75 can be suppressed, and the magnetic flux of the primary back face magnets 87 can be utilized more effectively in improving the output of the brushless motor M.

(11) According to the present embodiment, since a flow of the magnetic flux at the portion of the second core base 71 becomes a desired flow by the secondary back face magnets 88, the magnetic flux short circuiting of the disk magnet 75 can be suppressed, and the magnetic flux of the secondary back face magnets 88 can be utilized more effectively in improving the output of the brushless motor M.

Fifth Embodiment

A fifth embodiment of a motor for an electric power steering device according to the present invention will now be described with reference to FIG. 17 to FIG. 20.

Figure 17:
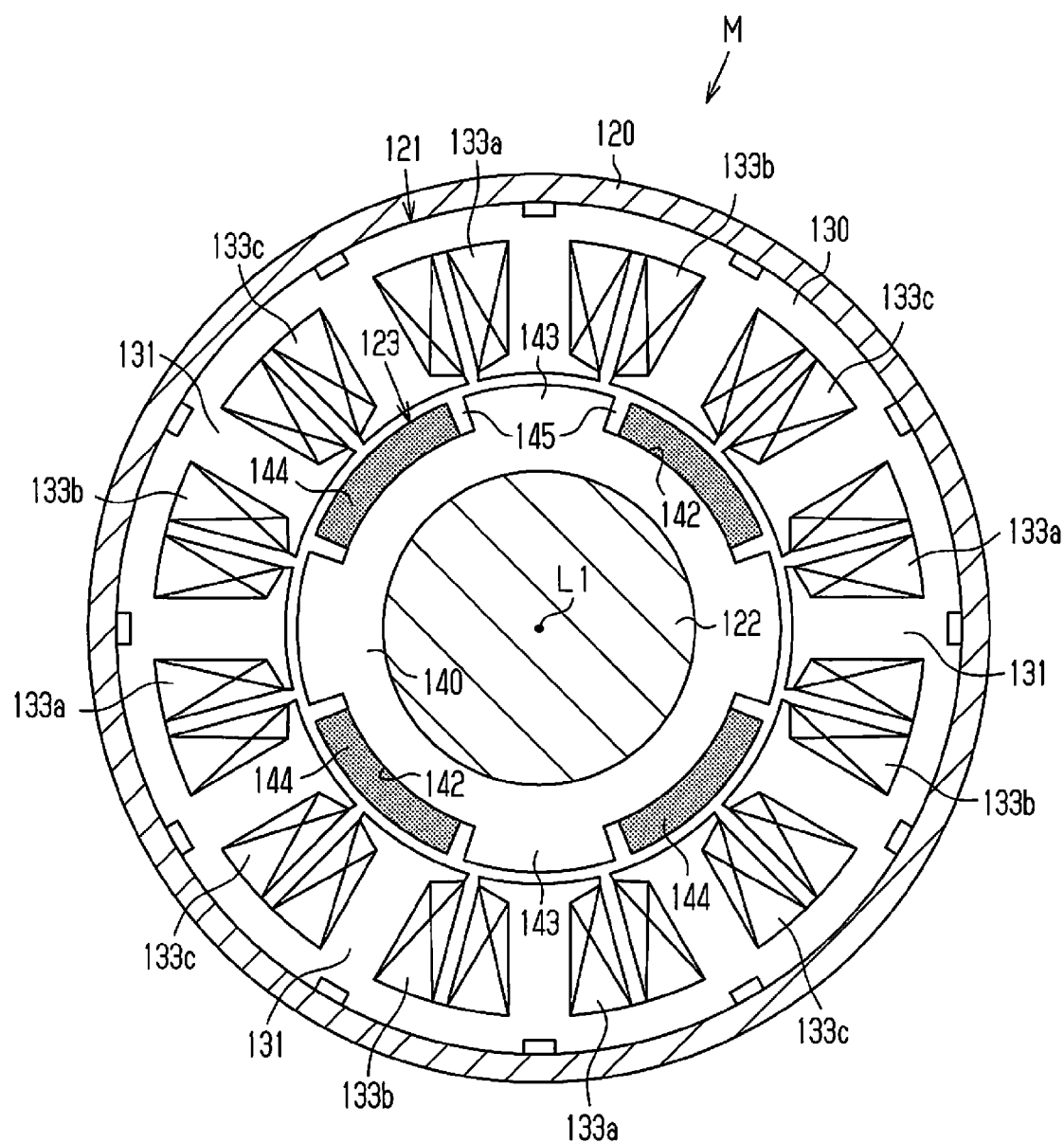
FIG. 17 is a cross-sectional view showing a three-phase brushless motor of a fifth embodiment.

FIG. 17 shows a cross-sectional view of the brushless motor M, where a stator 121 is fixed to an inner circumferential surface of a motor housing 120, and a rotor 123 that is fixed to a rotary shaft 122 formed of a nonmagnetic material (for example, stainless steel) and integrally rotates with the rotary shaft 122 is arranged on an inner side of the stator 121. Further, the rotary shaft 122 is drivingly coupled to an input shaft 3a of the steering shaft 3 by a gear (not shown).

The stator 121 includes a cylindrical stator core 130, and an outer circumferential surface of the stator core 130 is fixed to the motor housing 120. A plurality of teeth 131 formed along an axial direction and arranged at equal pitches in a circumferential direction is projected toward an inner side in a radial direction at an inner side of the stator core 130. The teeth 131 are T-shaped teeth having both side surfaces in the circumferential direction of their distal portions projected in the circumferential direction, and distal end surfaces on an inner side in the radial direction formed in arcuate surfaces with a center axis L1 of the rotary shaft 122 as a center.

Further, a slot 132 is formed between a tooth 131 and a tooth 131. In the present embodiment, the number of the teeth 131 is twelve, and the number of the slots 132 is twelve, which is identical to the number of the teeth 131.

Further, a three-phase coil, that is, a U-phase coil 133a, a V-phase coil 133b, and a W-phase coil 133c, is wound on the teeth 131 in a clockwise direction in an order. Further, the respective phase coils 133a, 133b, 133c wound on the stator core 130 of the present embodiment are wound with concentrated winding, the U-phase coil 133a, the V-phase coil 133b, and the W-phase coil 133c are wound in the circumferential direction in order with the teeth 131 being shifted by one. That is, the winding is performed on the teeth 131 with one teeth being shifted by one in the order of U-phase coil 133a→V-phase coil 133b→W-phase coil 133c→U-phase coil 133a→V-phase coil 133b→W-phase coil 133c→U-phase coil 133a→V-phase coil 133b→W-phase coil 133c→U-phase coil 133a→V-phase coil 133b→W-phase coil 133c in the clockwise direction.

The rotor 123 arranged on the inner side of the stator 121 includes a round columnar-shaped rotor core 140 into which the rotary shaft 122 is inserted and fixed. A plurality of slots 142 arranged at equal pitches in the circumferential direction is formed on an outer circumferential surface of the rotor core 140 along an axial direction. Each of the slots 142 on a rotor side is formed with its inner bottom surface in an arcuate surface with the center axis L1 of the rotary shaft 122 as a center.

Further, by forming the plurality of slots 142, a salient pole iron core 143 is formed between a slot 142 and a slot 142. Here, both side surfaces 143a in a circumferential direction of each of the salient pole iron cores 143 are flat surfaces extending toward the center axis L1 of the rotary shaft 122. Further, a width of the slots 142 in the circumferential direction is formed to be wider than a width of the salient pole iron cores 143 in the circumferential direction.

In the present embodiment, the number of the slots 142 is four. Accordingly, the number of the salient pole iron cores 143 is four, which is the same number as the slots 142.

Each of the slots 142 has a magnet 144 formed by a Neodymium magnet fitted thereto. Each magnet 144 has a magnet inner circumferential surface fixed to the inner bottom surface of the slot 142 by an adhesive, and further, a magnet outer circumferential surface 144b exposed to directly oppose the stator 121 (SPM type structure).

A magnet outer circumferential surface 144b of each of the magnets 144 forms an arcuate surface that becomes leveled with an outer circumferential surface 143b of a salient pole iron core 143 that is an arcuate surface with a center axis L1 of the rotary shaft 122 as a center, in a circumferential direction with an identical curvature radius. A magnetized direction of each of the magnets 144 is set so that an outer side in a radial direction is an S pole, and an inner side in the radial direction is an N pole. That is, magnets with only one magnetic pole are arranged.

Thus, each salient pole iron core 143 arranged between a magnet 144 and a magnet 144 functions as an N pole, which is the other magnetic pole different from the one magnetic pole of the magnets 144, and a rotor of the present embodiment is a so-called consequent pole type rotor 123 (motor) having eight magnetic poles. Accordingly, since the brushless motor M of the present embodiment has the structure in which the magnets 144 are adhered to the slots 142 so that the magnet outer circumferential surfaces 144b are exposed toward the stator 121 as described above, it becomes a consequent pole type motor of an SPM type.

Figure 18:
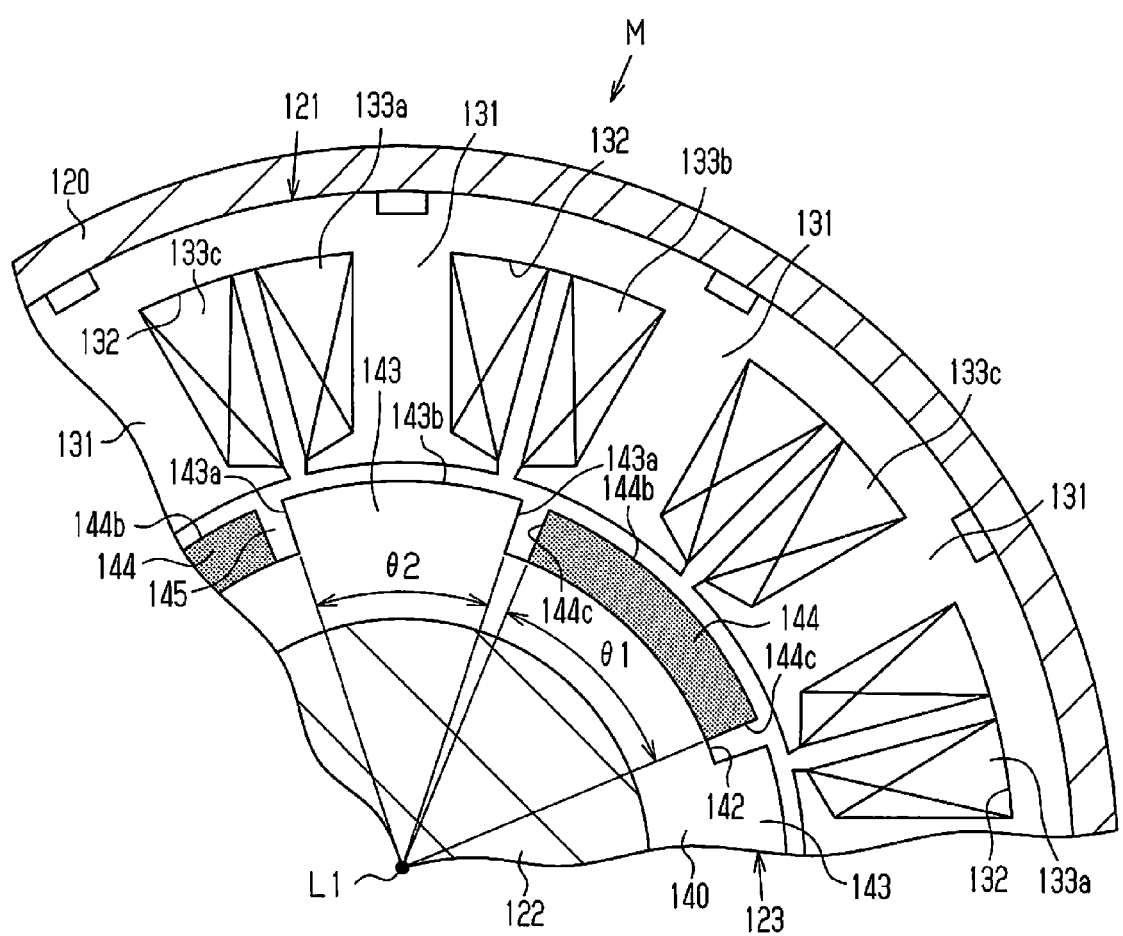
FIG. 18 is a partially enlarged cross-sectional view showing the rotor of FIG. 17.

The salient pole iron cores 143 and the magnets 144 are set so that a divergence θ1 of the magnets 144 become larger than a divergence θ2 of the salient pole iron cores 143. Here, as shown in FIG. 18, the divergence θ1 of the magnets 144 is an angle formed between both side surfaces 144c of each magnet 144 in the circumferential direction with the center axis L1 of the rotary shaft 122 as a center. Further, as shown in FIG. 18, the divergence θ2 of the salient pole iron cores 143 is an angle formed between both side surfaces 143a of each salient pole iron core 143 in the circumferential direction with the center axis L1 of the rotary shaft 122 as a center. Both side surfaces 144c in the circumferential direction of the magnets 144 are formed to be flat surfaces extending toward the center axis L1 of the rotary shaft 122.

Further, the divergence θ1 of the magnets 144 and the divergence θ2 of the salient pole iron cores 143 are set to sizes by which spaces 145 are formed between both side surfaces 144c of each magnet 144 in the circumferential direction and both side surfaces 143a of each salient pole iron core 143 in the circumferential direction.

Next, the operation of the brushless motor M of the fifth embodiment described above will be described.

Now, when a steering wheel 2 is manipulated, the input shaft 3a rotates, and torsion is generated in a torsion bar arranged between the input shaft 3a and an output shaft 3b. Further, a torsion angle of the torsion bar is detected by a torque sensor not shown, and steering torque applied to the input shaft 3a is detected. Then, assist torque applied to the steering wheel is calculated based on the detected steering torque, and the brushless motor M is driven and controlled.

Here, since the brushless motor M is a motor of the SPM type in which the magnets 144 are exposed at a surface, output torque (assist torque) upon a start up is increased than a brushless motor of an IPM type upon the start up.

Further, since the divergence θ1 of the magnets 144 is set to be larger than the divergence θ2 of the salient pole iron cores 143, an amount of the magnetic flux from the magnets 144 can further be increased, and a magnetic flux density is increased by the salient pole iron cores 143 becoming small, thereby the output torque during activation may be increased.

Figure 19:
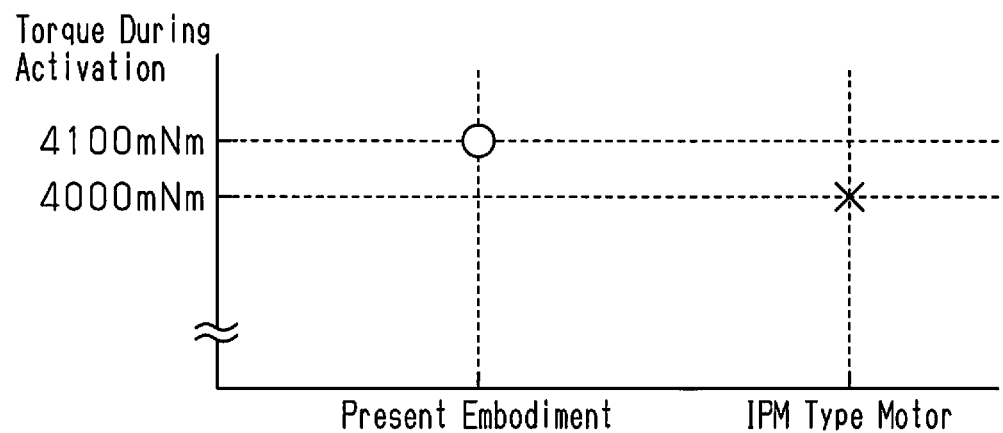
FIG. 19 is a chart comparing generated torque in the brushless motor of FIG. 17 and a conventional IPM type brushless motor.

FIG. 19 is a point graph showing a comparison of torque during activation (assist torque) of the consequent pole type brushless motor M of the SPM type of the present embodiment and a brushless motor of the IPM type with eight poles and twelve slots formed by eight magnets having their orientation of magnetic poles differ alternately, that is obtained from an experiment.

In the experiment, the brushless motor M of the present embodiment and the IPM type brushless motor with eight poles and twelve slots have their output set under an identical condition. Further, four magnets 144 of the brushless motor M of the present embodiment with eight poles and twelve slots and eight magnets of the IPM type brushless motor with eight poles and twelve slots are under an identical condition of being of an identical material (Neodymium magnet material) and having an identical total amount of magnetic material.

Further, "x" mark in FIG. 19 indicates the output torque of the IPM type brushless motor during activation. "○" indicates the output torque of the consequent pole type brushless motor M of the SPM type of the present embodiment during activation.

As is apparent from the point graph, in the consequent pole type brushless motor M of the SPM type of the present embodiment, it can be understood that the assist torque during activation is increased.

Further, since reluctance torque also acts, the output torque during driving is maintained compared to the IPM type brushless motor.

Further, when the brushless motor M becomes inoperable, since the brushless motor M is a consequent pole type motor, that is, since the salient pole iron cores 143 are arranged between the magnets 144, magnet torque is decreased, and brake torque is reduced than the IPM type brushless motor.

Moreover, since spaces 145 are formed between both side surfaces 144c of each magnet 144 in the circumferential direction and both side surfaces 143a of each salient pole iron core 143 in the circumferential direction, the magnet torque is further decreased, and the brake torque can further be made small.

Figure 20:
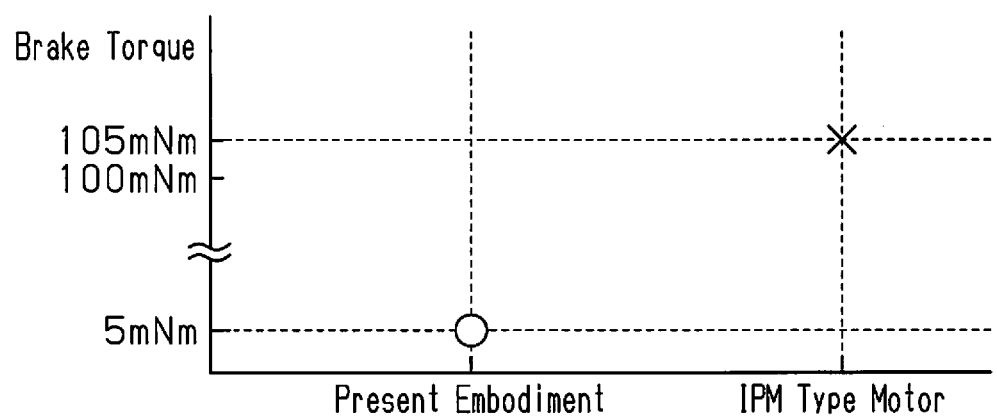
FIG. 20 is a chart comparing brake torque in the brushless motor of FIG. 17 and the conventional IPM type brushless motor.

FIG. 20 is a point graph showing a comparison of brake torque of the consequent pole type brushless motor M of the SPM type of the present embodiment and the IPM type brushless motor with eight poles and twelve slots, that is obtained by an experiment. The experiment was carried out under the same condition as the experiment shown in FIG. 19 above.

Further, "x" mark in FIG. 20 indicates the brake torque of the IPM type brushless motor. "○" indicates braking force torque of the consequent pole type brushless motor M of the SPM type of the present embodiment.

As is apparent from the point graph, it can be understood that the consequent pole type brushless motor M of the SPM type of the present embodiment, has smaller brake torque than the brake torque of the IPM type brushless motor.

Accordingly, the brake torque becomes small even if the brushless motor M becomes inoperable due to an abnormality having occurred in an electric power steering device 1, the steering is made lighter, and the steering becomes easier.

Next, advantages of the fifth embodiment will be described below.

(12) According to the present embodiment, the brushless motor M is a consequent pole type brushless motor of the SPM type. Thus, effective magnetic flux becomes large by the magnets 144 being exposed at the surface, and the assist force during activation may be increased. Further, since a length of the magnets 144 in the circumferential direction with respect to a circumference becomes halved, the brake torque may be small upon the inoperable state of the motor.

(13) According to the present embodiment, by the divergence θ1 of the magnets 144 being set larger than the divergence θ2 of the salient pole iron cores 143, the amount of magnetic flux from the magnets 144 can further be increased, and with the magnetic flux density being increased by the salient pole iron cores 143 becoming small, the output torque during activation can further be made large.

(14) According to the present embodiment, by having formed the spaces 145 between both side surfaces 144c of each magnet 144 in the circumferential direction and both side surfaces 143a of each salient pole iron core 143 in the circumferential direction, the magnet torque is further decreased, and the brake torque may be small.

Figure 21:
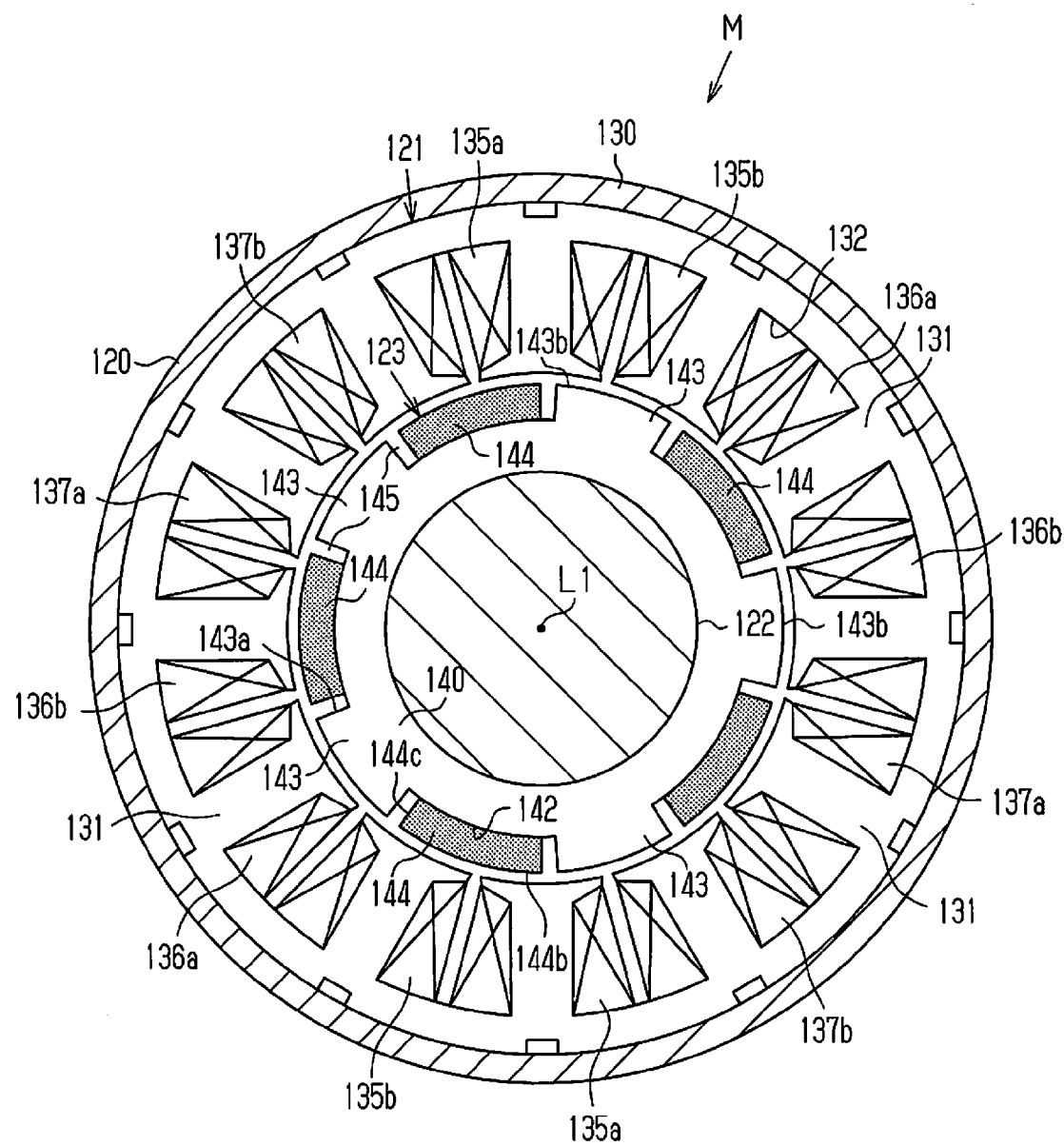
FIG. 21 is a cross-sectional view showing a brushless motor of another example of FIG. 17.

In the fifth embodiment, although the brushless motor M had eight poles and twelve slots, the present invention may be adapted to a brushless motor M with ten poles and twelve slots as shown in FIG. 21. In this case, similar advantages as the fifth embodiment may be obtained.

Meanwhile, the brushless motor M with ten poles and twelve slots as shown in FIG. 21 includes five slots 142 formed on a rotor core 140. Accordingly, the number of salient pole iron cores 143 is five, which is identical to the slots 142. Further, by arranging five magnets 144 in the five slots 142, a rotor of the present embodiment is formed as a rotor 123 (motor) of the SPM type, and being the consequent pole type with ten magnetic poles.

In this case, the salient pole iron cores 143 and the magnets 144 are set so that a divergence θ1 of the magnets 144 is set to be larger than a divergence θ2 of the salient pole iron cores 143. Further, spaces 145 are formed between both side surfaces 144c of each magnet 144 in a circumferential direction and both side surfaces 143a of each salient pole iron core 143 in the circumferential direction.

Coils are wound around a stator 121 of a brushless motor M with the slots shown in FIG. 21 with concentrated winding different from the fifth embodiment. The coils are wound on the teeth 131 in an order of a U-phase coil 135a of an original winding, a U-phase coil 135b of a reverse winding, a V-phase coil 136a of the original winding, a V-phase coil 136b of the reverse winding, a W-phase coil 137a of the original winding, and a W-phase coil 137b of the reverse winding in a clockwise direction, with the teeth 131 being shifted by one. That is, the coils 135a, 136a, 137a of the original winding and the coils 135b, 136b, 137b of the reverse winding, each having the same phase, are wound between adjacent teeth 131.

Further, magnetic fields in opposite directions are generated respectively in the U-phase coil 135a of the original winding and the U-phase coil 135b of the reverse winding, the V-phase coil 136a of the original winding and the V-phase coil 136b of the reverse winding, and the W-phase coil 137a of the original winding and the W-phase coil 137b of the reverse winding by electric conduction.

Figure 22:
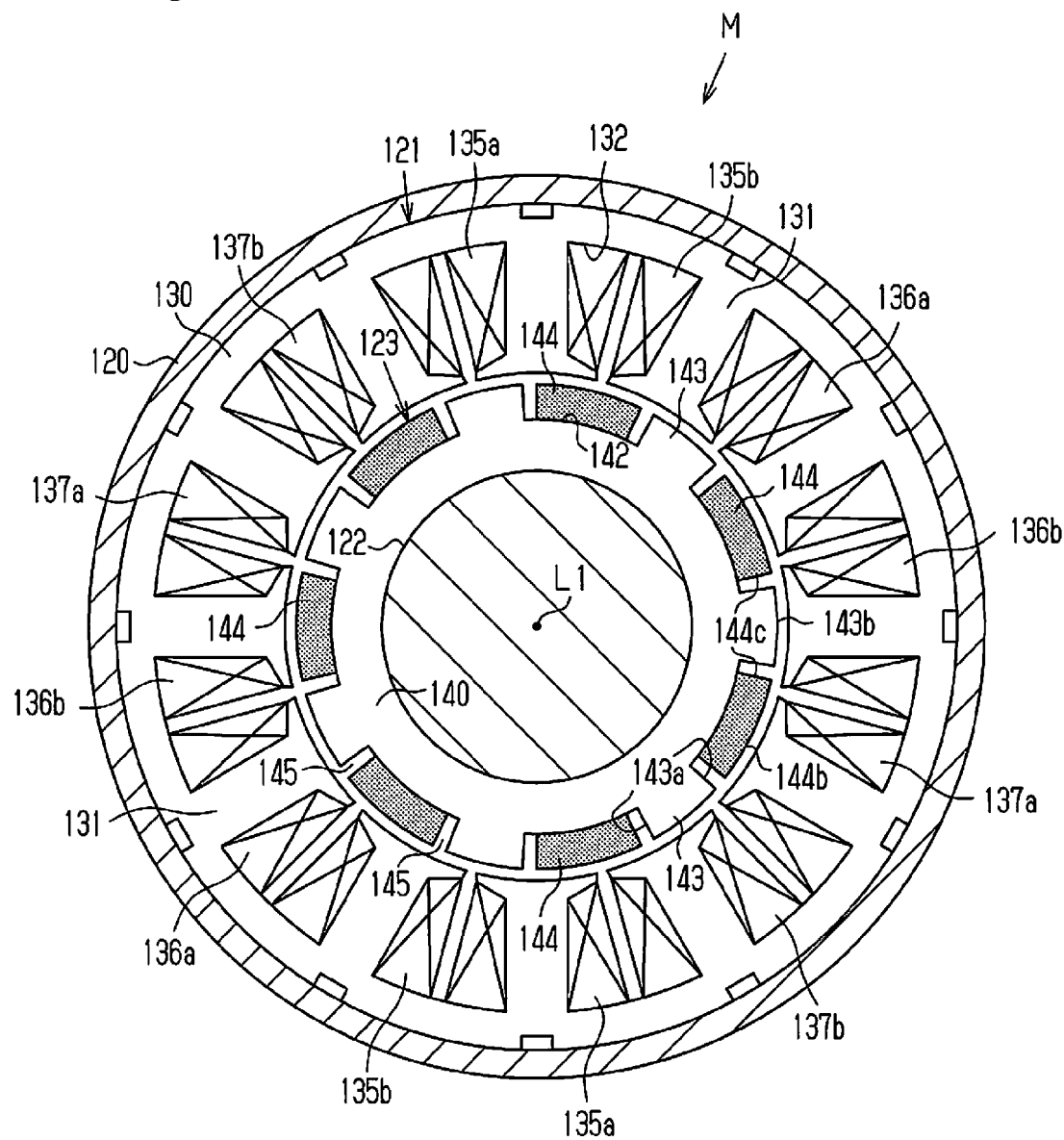
FIG. 22 is a cross-sectional view showing a brushless motor of another example of FIG. 17.

Further, the present invention may be adapted to a brushless motor M with fourteen poles and twelve slots as shown in FIG. 22. In this case, the same advantages as the fifth embodiment may be obtained.

Incidentally, the brushless motor M with fourteen poles and twelve slots as shown in FIG. 22 includes seven slots 142 formed on a rotor core 140. Accordingly, the number of salient pole iron cores 143 becomes seven, which is identical to the slots 142. Further, by arranging seven magnets 144 in the seven slots 142, a rotor of the present embodiment is formed as a rotor 123 (motor) of the SPM type, and being the consequent pole type with fourteen magnetic poles.

In this case, the salient pole iron cores 143 and the magnets 144 are set so that a divergence θ1 of the magnets 144 is set to be larger than a divergence θ2 of the salient pole iron cores 143. Further, spaces 145 are formed between both side surfaces 144c of each magnet 144 in a circumferential direction and both side surfaces 143a of each salient pole iron core 143 in the circumferential direction.

Further, on a stator 121 of a brushless motor M with the slots shown in FIG. 22, respective coils are wound on teeth 131 in a similar winding method as in FIG. 21, in an order of a U-phase coil 135a of an original winding, a U-phase coil 135b of a reverse winding, a V-phase coil 136a of the original winding, a V-phase coil 136b of the reverse winding, a W-phase coil 137a of the original winding, and a W-phase coil 137b of the reverse winding.

Accordingly, magnetic fields in opposite directions are generated respectively in the U-phase coil 135a and the U-phase coil 135b, the V-phase coil 136a and the V-phase coil 136b, and the W-phase coil 137a and the W-phase coil 137b by electric conduction.

Sixth Embodiment

Next, a sixth embodiment of the present invention will now be described with reference to FIG. 23 and FIG. 24. The present embodiment differs in a winding method of coils wound on a stator from the brushless motor M of the fifth embodiment. Thus, the characteristic portion thereof will be described in detail, and common portions are omitted for the sake of convenience of explanation.

Figure 23:
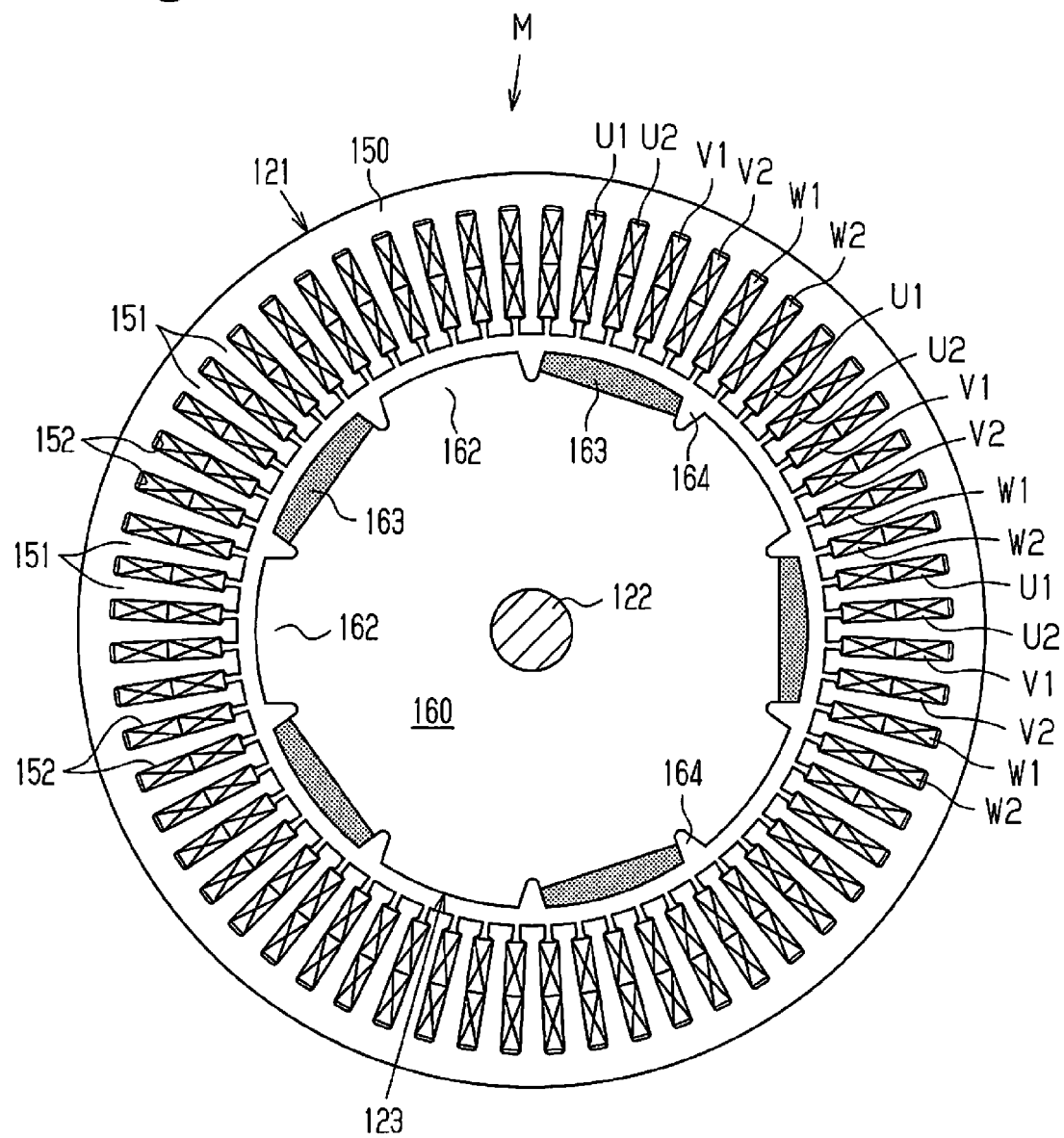
FIG. 23 is a cross-sectional view showing a three-phase brushless motor of a sixth embodiment.
Figure 24:
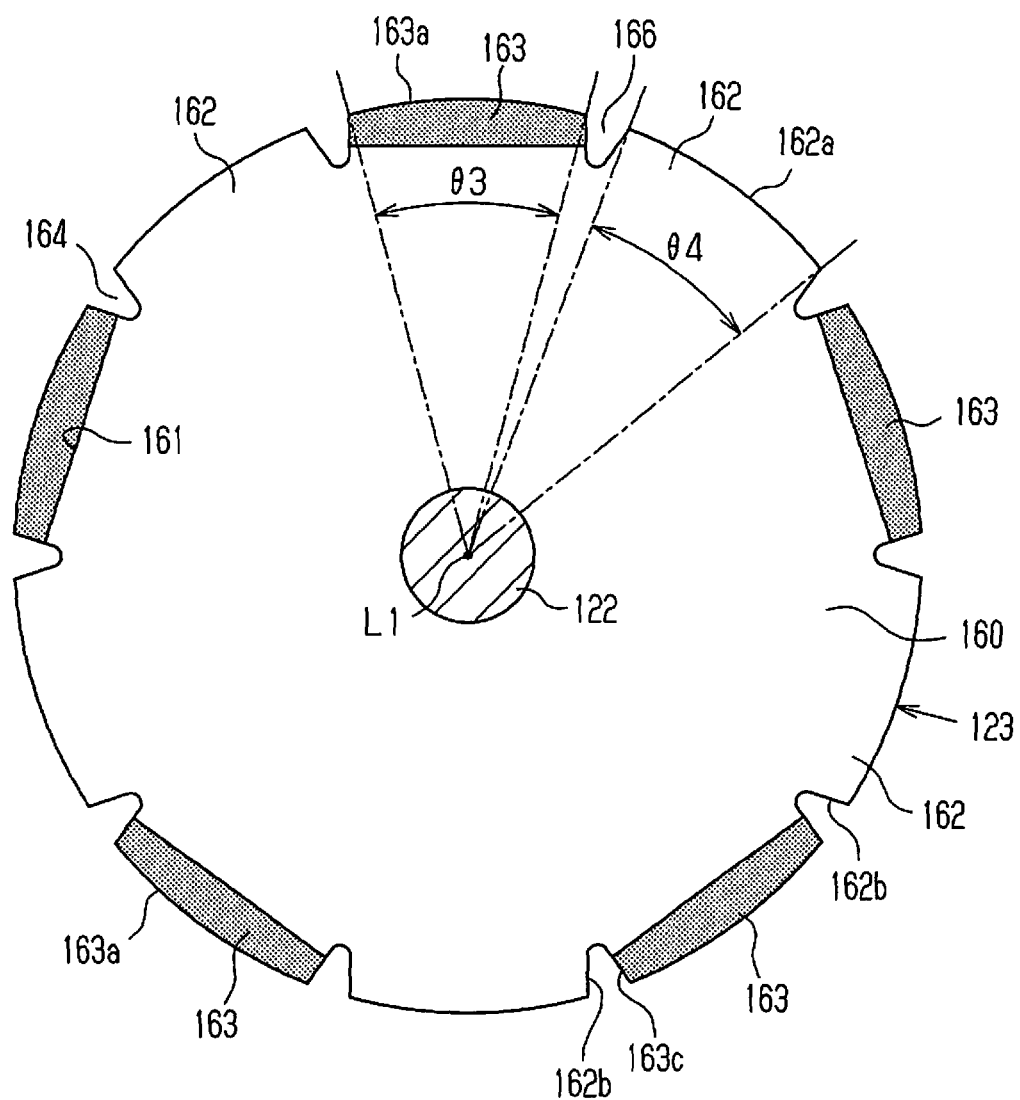
FIG. 24 is a partially enlarged cross-sectional view showing a rotor of FIG. 23.

As shown in FIG. 23, on a stator core 150 of a stator 121 fixed to an inner circumferential surface of a motor housing (not shown) has sixty teeth 151 formed to extend toward an inner side in a radial direction. Accordingly, sixty slots 152 are formed between the teeth 151, and the sixty stator-side slots 152 are formed at an equiangular pitch as viewed from a center axis L1 of a rotary shaft 122.

Further, the sixty teeth 151 have two three-phase coils of U-phase, V-phase, and W-phase, that is, a first system three-phase coil and a second system three-phase coil formed thereon in a clockwise direction.

Further, the first system three-phase coil and the second system three-phase coil wound on the stator core 150 of the present embodiment are distributed windings, and are wound in an order of a first system U-phase coil U1, a second system U-phase coil U2, a first system V-phase coil V1, a second system V-phase coil V2, a first system W-phase coil W1, and a second system W-phase coil W2 in a clockwise direction. More specifically, the first system U-phase coil U1, the second system U-phase coil U2, the first system V-phase coil V1, the second system V-phase coil V2, the first system W-phase coil W1, and the second system W-phase coil W2 are wound in an order with six teeth 151 as one set, with the teeth 151 being shifted by one.

Here, the respective phase coils U1, V1, W1 in the first system and the respective phase coils U2, V2, W2 of the second system wound by the distributed winding are wound in each slot 152 with adjacent coils of the same phase being wound.

Three-phase power voltages having 30° phase difference from one another are applied to the first system three-phase coil and the second system three-phase coil. That is, U-phase power voltages with 30° phase difference are applied to the first system U-phase coil U1 and the second system U-phase coil U2, V-phase power voltages with 30° phase difference are applied to the first system V-phase coil V1 and the second system V-phase coil V2, and W-phase power voltages with 30° phase difference are applied to the first system W-phase coil W1 and the second system W-phase coil W2.

The rotor 123 arranged on an inner side of the stator 121 includes a round columnar-shaped rotor core 160 into which the rotary shaft 122 is inserted and fixed. As shown in FIG. 24, a plurality of slots 161 arranged at equal pitches in a circumferential direction is arranged along an axial direction on an outer circumferential surface of the rotor core 160. An inner bottom surface of each slot 161 is a flat surface having its center position in the circumferential direction vertically intersecting a radial line extending from the center axis L1 of the rotary shaft 122.

Further, by forming the plurality of slots 161, a salient pole iron core 162 is formed between a slot 161 and a slot 161. Here, both side surfaces 162b in the circumferential direction of each salient pole iron core 162 are flat surfaces that extend toward the center axis L1 of the rotary shaft 122. Further, a width of the slots 161 in the circumferential direction is formed to be larger than a width of the salient pole iron cores 162 in the circumferential direction.

In the present embodiment, the number of the slots 161 is five. Accordingly the number of the salient pole iron cores 162 is five, which is identical to the slots 161.

Each slot 161 has a magnet 163 formed of an Neodymium magnet fitted therein, respectively. Each of the magnets 163 is fixed with its magnet inner side surface adhered by an adhesive to the inner bottom surface of the slot 161, and further, a magnet outer circumferential surface 163a is exposed to directly oppose the stator 121 (SPM type structure).

The magnet outer circumferential surface 163a of each of the magnets 163 forms an arcuate surface that becomes leveled in the circumferential direction with an outer circumferential surface 162a of the salient pole iron core 162 that is an arcuate surface having the center axis L1 of the rotary shaft 122 as a center, with an identical curvature radius. A magnetized direction of each of the magnets 163 is set so that an outer side in the radial direction is an S pole, and an inner side in the radial direction is an N pole. That is, magnets with only one magnetic pole are arranged.

Thus, each of the salient pole iron cores 162 arranged between a magnet 163 and a magnet 163 functions as the N pole as the other magnetic pole differing from one magnetic pole of the magnets 163, and the rotor of the present embodiment is a rotor 123 (motor) of a so-called consequent pole type having ten magnetic poles. Accordingly, as described above, since the brushless motor M of the present embodiment has the structure in which the magnets 163 are adhered to the slots 161 so that the magnet outer circumferential surfaces 163a are exposed toward the stator 121, it becomes a consequent pole type motor of the SPM type.

The salient pole iron cores 162 and the magnets 163 are set so that a divergence θ3 of the magnets 163 becomes larger than a divergence θ4 of the salient pole iron cores 162. Here, as shown in FIG. 24, the divergence θ3 of the magnets 163 is an angle formed between both ends of the magnet outer circumferential surface 163a of the magnet 163 in the circumferential direction with the center axis L1 of the rotary shaft 122 as a center. As shown in FIG. 24, the divergence θ4 of the salient pole iron cores 162 is an angle formed between both ends of the outer circumferential surface 162a of the salient pole iron core 162 in the circumferential direction with the center axis L1 of the rotary shaft 122 as a center.

Further, the divergence θ3 of the magnets 163 and the divergence θ4 of the salient pole iron cores 162 are set to sizes by which spaces 164 are formed between both side surfaces 163c of each magnet 163 in the circumferential direction and both side surfaces 162b of each salient pole iron core 162 in the circumferential direction.

Next, the operation of the brushless motor M of the sixth embodiment described above will be described.

The brushless motor M of the present embodiment is of a consequent pole type motor, despite being of the distributed winding. Accordingly, in the same manner as the fifth embodiment, assist torque is increased than an IPM type brushless motor during activation due to being the SPM type motor, and the assist torque is higher than the IPM type brushless motor after activation due to being the consequent pole type motor, and reluctance torque being added.

Moreover, since the divergence θ3 of the magnets 163 is set to be larger than the divergence θ4 of the salient pole iron cores 162, a magnetic flux amount from the magnets 163 can further be increased, and a magnetic flux density can be increased by the salient pole iron cores 143 being small, whereby output torque during activation may be increased.

As a result, compared to the IPM type brushless motor having its build being large, a build may be small, and high responsiveness can be achieved.

Further, when the brushless motor M becomes inoperable, since the brushless motor M is the consequent pole type motor, that is, since the salient pole iron cores 162 are arranged between the magnets 163, magnet torque is decreased and brake torque drops than in the IPM type brushless motor.

In addition, since the spaces 164 are formed between both side surfaces 163c of each magnet 163 in the circumferential direction and both side surfaces 162b of each salient pole iron core 162 in the circumferential direction, the magnet torque is further decreased, and the brake torque can further be made small.

Accordingly, the brake torque becomes small even if the brushless motor M becomes inoperable due to an abnormality having occurred in an electric power steering device 1, the steering is made lighter, and the steering becomes easier.

As described above, according to the present embodiment, even if a method of coiling is changed to the distributed wiring, the same advantages as the advantages described in the fifth embodiment may be obtained.

Figure 25:
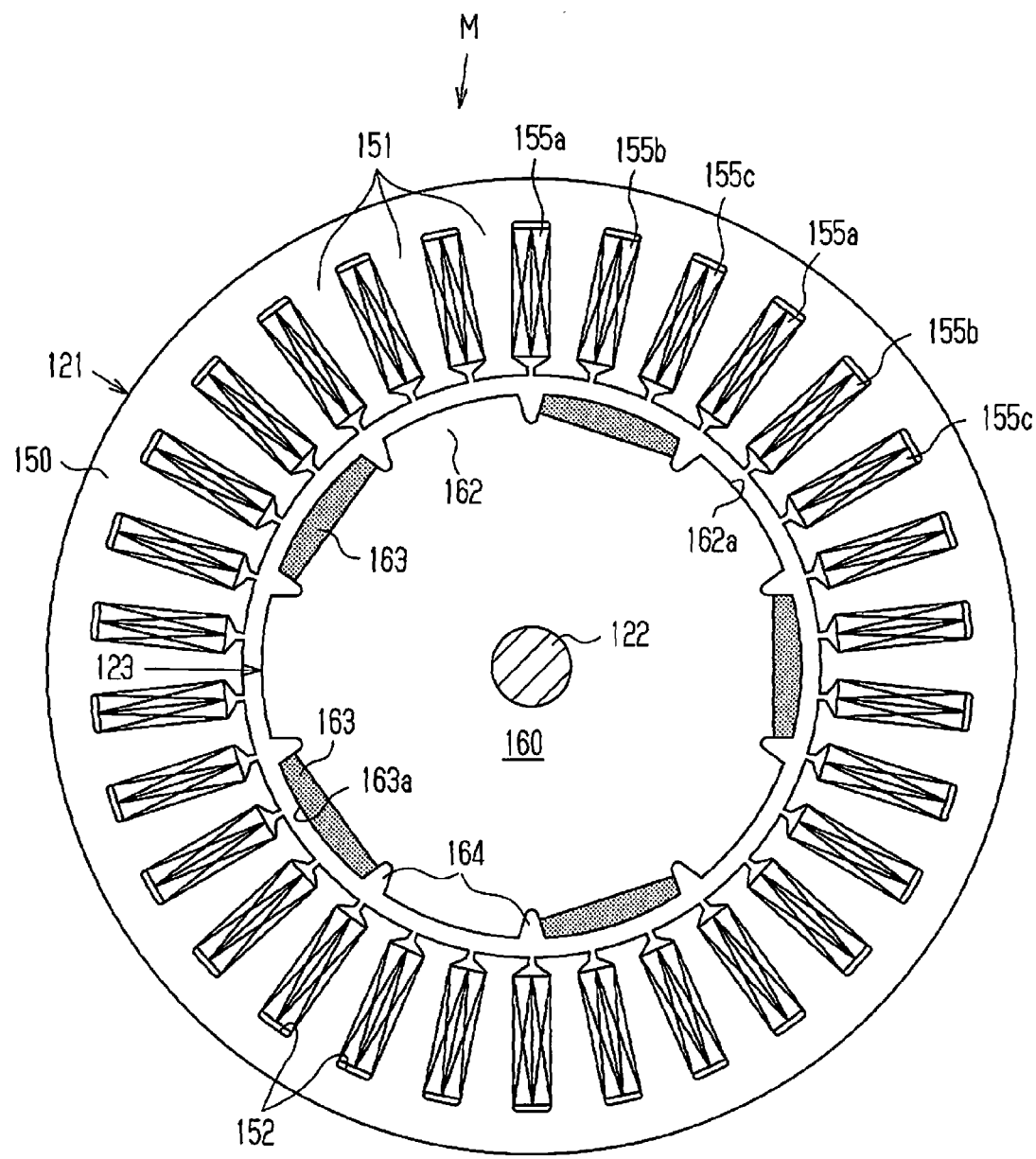
FIG. 25 is a cross-sectional view showing a brushless motor of another example of FIG. 23.

In the sixth embodiment, the present invention is adapted to the brushless motor M with ten poles and sixty slots, however, the present invention may be adapted to a brushless motor M with ten poles and thirty slots as shown in FIG. 25. In this case, the same advantages as the sixth embodiment may be obtained.

Incidentally, in the brushless motor M with ten poles and thirty slots shown in FIG. 25, although a configuration of a rotor core 160 is similar to the second embodiment, the number of slots 152 formed on a stator core 150 is different. Further, a coiling method for winding around teeth 151 is distributed winding, however, one three-phase coils of U-phase, V-phase, and W-phase is formed in a clockwise direction.

That is, a U-phase coil 155a, a V-phase coil 155b, and a W-phase coil 155c are wound in an order in the clockwise direction with three teeth 151 as one set, by having the teeth 151 shifted in order by one. Here, with the respective phase coils 155a, 155b, 155c wound by the distributed winding, adjacent coils of the same phase are wound respectively in each slot 152.

Seventh Embodiment

Next, a seventh embodiment of the present invention will now be described with reference to FIG. 26 to FIG. 28. The present embodiment differs from the brushless motor M of the fifth embodiment in a configuration of a rotor 123. Thus, the characteristic portion thereof will be described in detail, and common portions are omitted for the sake of convenience of explanation.

Figure 26:
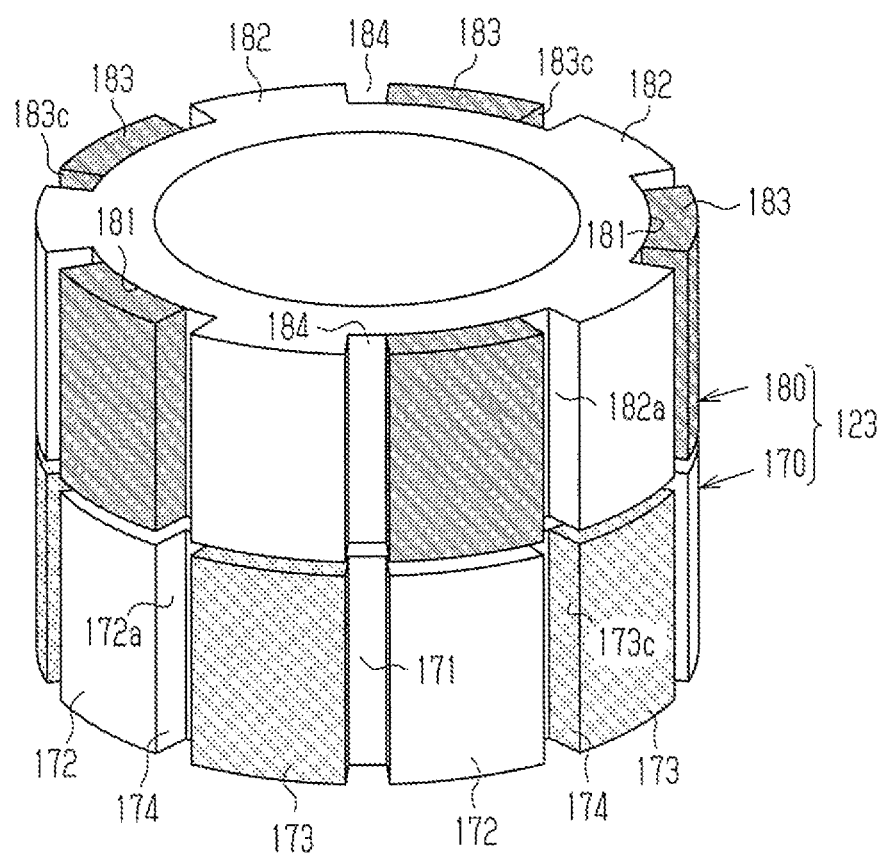
FIG. 26 is a perspective view showing a rotor of a three-phase brushless motor of a seventh embodiment.

As shown in FIG. 26, the rotor 123 of a brushless motor M of the present embodiment is formed of a tandem structure rotor configured by a first rotor core part 170 and a second rotor core part 180 are stacked in an axial direction.

Figure 27:
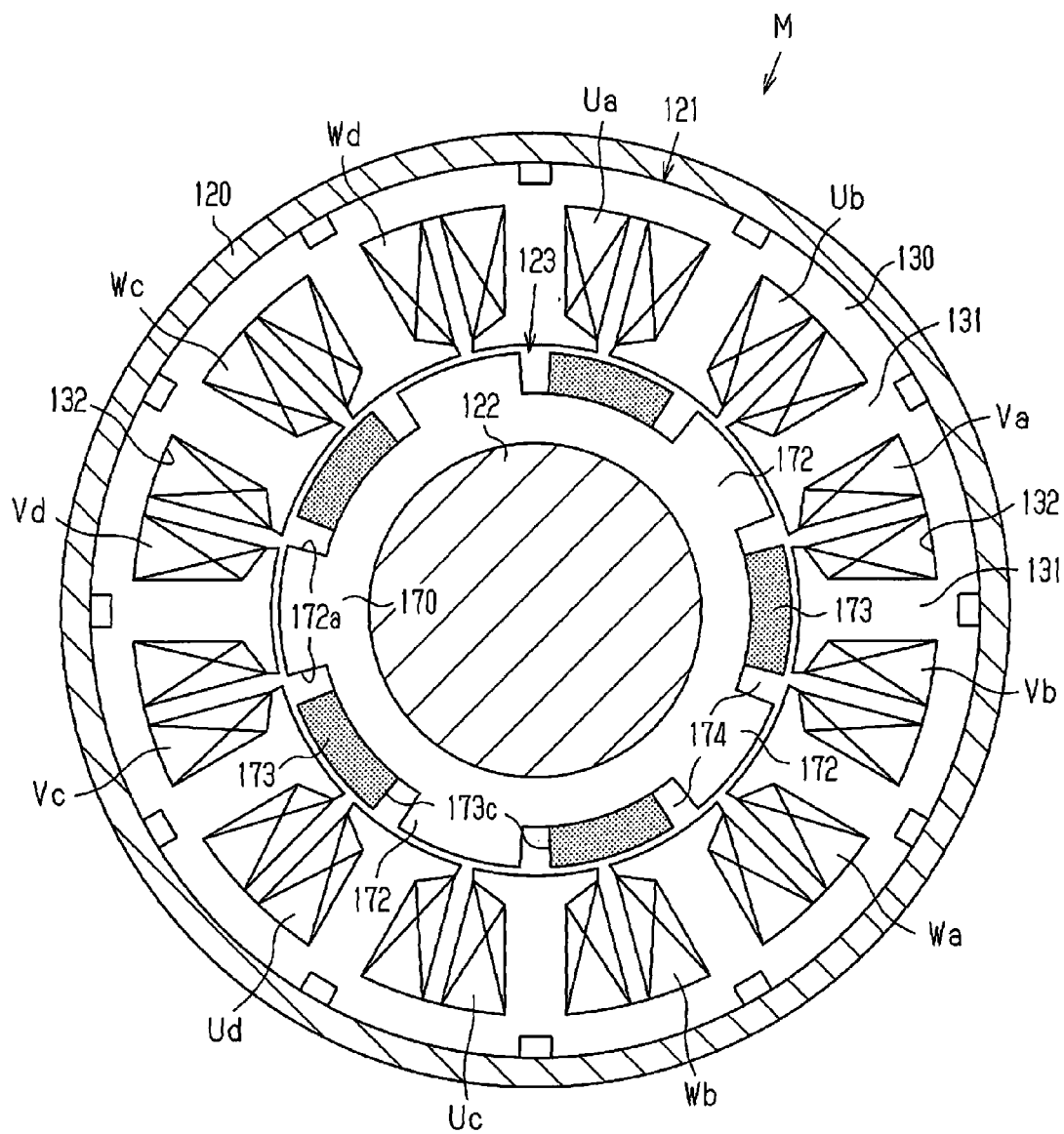
FIG. 27 is a cross-sectional view showing the rotor of FIG. 26.

As shown in FIG. 26 and FIG. 27, the first rotor core part 170 has identical configuration as the rotor core 140 shown in FIG. 21, and has five primary slots 171 arranged at equal pitches on an outer circumferential surface thereof. Accordingly, the number of primary salient pole iron cores 172 formed between the primary slot 171 and the primary slot 171 is five, which is identical to the primary slots 171.

Further, primary magnets 173 formed of five Neodymium magnets are arranged in the five primary slots 171, and the first rotor core part 170 includes a SPM structure. Here, in the present embodiment, a divergence of the primary magnets 173 and a divergence of the primary salient pole iron cores 172 are set to be same. Further, in the same manner as the fifth embodiment, primary spaces 174 are formed between both side surfaces 173c of each primary magnet 173 in a circumferential direction and both side surfaces 172a of each primary salient pole iron core 172 in the circumferential direction. Moreover, a magnetized direction of the primary magnets 173 is set so that an outer side in a radial direction is an S pole, and an inner side in the radial direction is an N pole. Thus, each of the primary salient pole iron cores 172 arranged between the primary magnet 173 and the primary magnet 173 functions as the N pole, so the rotor core part of the present embodiment is the consequent pole type first rotor core part 170 having ten magnetic poles.

Figure 28:
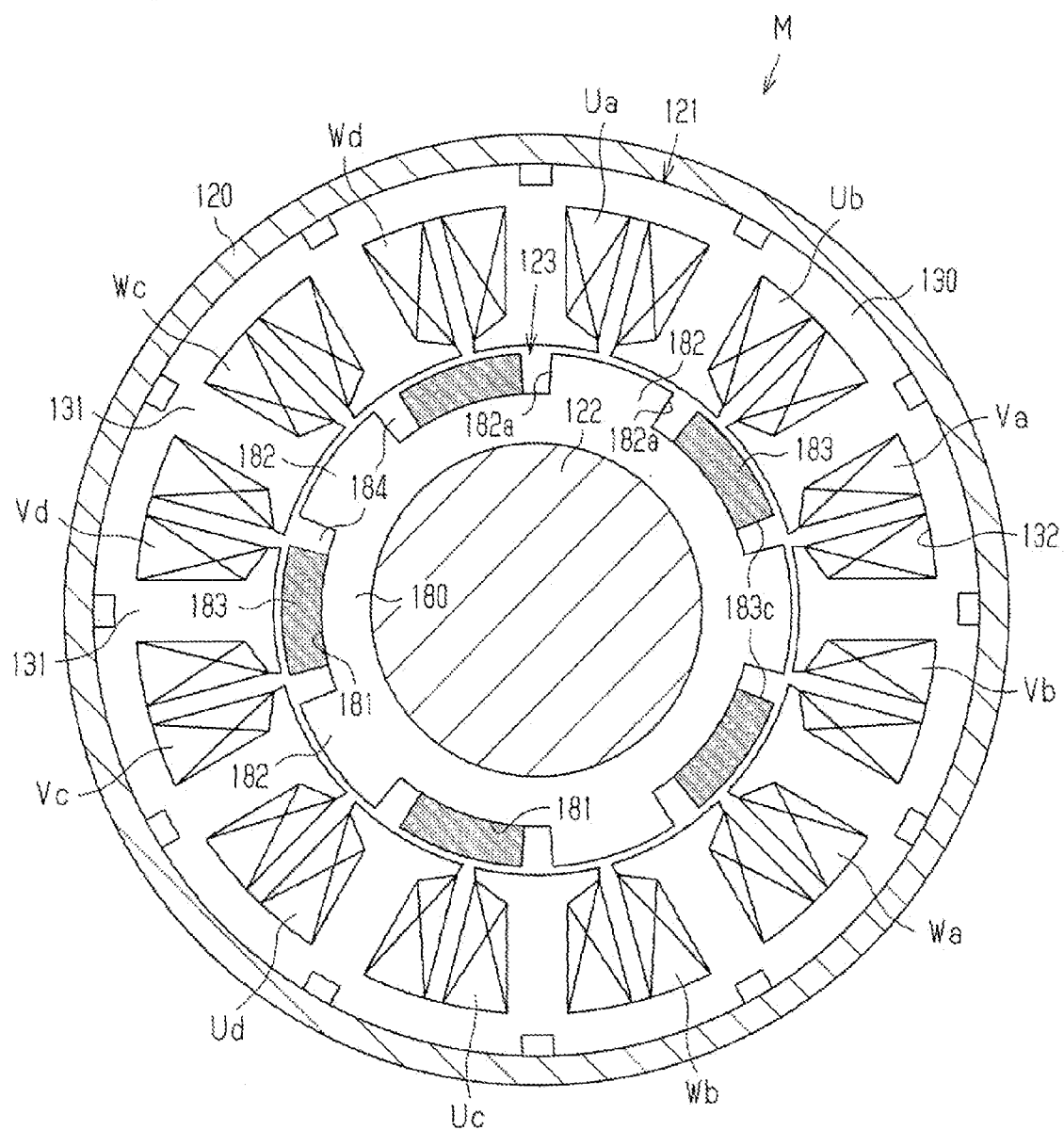
FIG. 28 is a cross-sectional view showing the rotor of FIG. 26.

As shown in FIG. 26 and FIG. 28, the second rotor core part 180 has an identical shape as the first rotor core part 170, and has five secondary slots 181 arranged at equal pitches. Thus, the number of secondary salient pole iron cores 182 formed between the secondary slots 181 and the secondary slots 181 is five, which is identical to the secondary slots 181. Moreover, the secondary salient pole iron cores 182 and the primary salient pole iron cores 172 are of an identical shape, and the secondary slots 181 and the primary slots 171 are of an identical shape.

Further, secondary magnets 183 formed of five Neodymium magnets are arranged in the five secondary slots 181, and the second rotor core part 180 of the SPM structure is configured. Here, in the present embodiment, a divergence of the primary magnets 173 and a divergence of the primary salient pole iron cores 172 become identical. Further, in the same manner as first rotor core part 170, secondary spaces 184 are formed between both side surfaces 183c of each secondary magnet 183 in the circumferential direction and both side surfaces 182a of each secondary salient pole iron core 182 in the circumferential direction. Moreover, a magnetized direction of the secondary magnets 183 is different from the magnetized direction of the primary magnets 173, and is magnetized so that an outer side of the secondary magnets 183 in the radial direction is an N pole, and an inner side in the radial direction is an S pole. Thus, each of the secondary salient pole iron cores 182 arranged between the secondary magnet 183 and the secondary magnet 183 functions as the S pole, so the rotor core part of the present embodiment is the consequent pole type second rotor core part 180 having ten magnetic poles.

Further, one rotor 123 formed by stacking the first rotor core part 170 and the second rotor core part 180 formed as above in the axial direction is fixed to a rotary shaft 122.

Here, relative positions of the first rotor core part 170 and the second rotor core part 180 in the circumferential direction are displaced in the circumferential direction by one pitch. More specifically, they are stacked so that the primary salient pole iron cores 172 (primary slots 171) of the first rotor core part 170 and the secondary slots 181 (secondary salient pole iron cores 182) of the second rotor core part 180 are juxtaposed in an axial direction.

That is, the primary salient pole iron cores 172 functioning as the N poles and the secondary magnets 183 of which portions on the outer side in the radial direction function as the N poles are arranged along the axial direction, and the primary magnets 173 of which portions on the outer side in the radial direction function as the S poles are arranged with the secondary salient pole iron cores 182 functioning as the S poles along the axial direction.

A stator 121 fixed to a motor housing 120 has a stator core 130 like the fifth embodiment. Accordingly, teeth 131 formed on the stator core 130 is twelve, and the number of slots 132 formed between the teeth 131 and the teeth 131 is twelve.

As shown in FIG. 27 and FIG. 28, a coil wound around the twelve teeth 131 includes four each of U-phase coils Ua to Ud, V-phase coils Va to Vd, and W-phase coils Wa to Wb, and is wound on each tooth 131 by concentrated winding. Further, the U-phase coils Ua, Ub, the V-phase coils Va, Vb, the W-phase coils Wa, Wb, the U-phase coils Uc, Ud, the V-phase coils Vc, Vd, and the W-phase coils Wc, Wb are wound on the teeth 131 in a clockwise direction in an order with the teeth 131 being shifted by one.

Here, the U-phase coils Ua, Ud, the V-phase coils Vb, Vc, the W-phase coils Wa, Wd, are of original winding, and the U-phase coils Ub, Uc, the V-phase coils Va, Vd, and the W-phase coils Wb, Wc are of reverse winding. That is, opposite magnetic fields are generated in the U-phase coils Ua, Ud and the U-phase coils Ub, Uc, the V-phase coils Vb, Vc and the V-phase coils Va, Vd, and the W-phase coils Wa, Wd and the W-phase coils Wb, Wc by electric conduction.

The seventh embodiment described above has the following advantages in addition to the advantages of the fifth embodiment.

According to the present embodiment, the rotor 123 includes the first rotor core part 170 and the second rotor core part 180. Further, the first rotor core part 170 and the second rotor core part 180 are stacked so that the primary salient pole iron cores 172 functioning as the N poles and the secondary magnets 183 having the outer side in the radial direction as the N poles are arranged along the axial direction, and the primary magnets 173 having the outer side in the radial direction functioning as the S poles are arranged with the secondary salient pole iron cores 182 functioning as the S poles along the axial direction.

Accordingly, in the rotor 123 formed by the first rotor core part 170 and the second rotor core part 180, since the primary salient pole iron cores 172 and the secondary salient pole iron cores 182 are arranged alternately in the circumferential direction consecutively over 360°, brake torque can further be reduced.

Eighth Embodiment

Next, an eighth embodiment according to the present invention will now be described with reference to the drawings.

Figure 29:
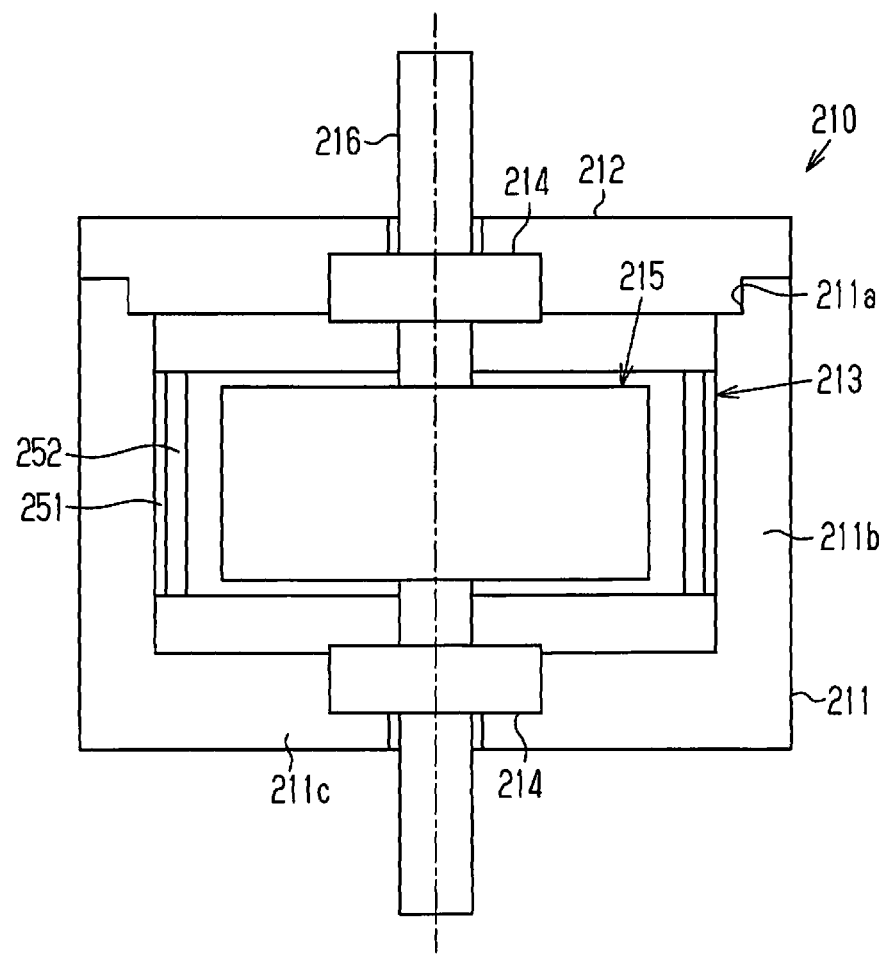
FIG. 29 is a schematic diagram of a brushless motor of an eighth embodiment.

As shown in FIG. 29, a slotless motor 210 of the present embodiment includes a bottomed cylindrical yoke housing 211 (hereafter referred to simply as a yoke 211), and a disk-shaped end plate 212 that closes an opening end portion 211a of the yoke 211. A substantially cylindrical-shaped stator 213 is fixed to an inner circumferential surface of a cylindrical portion 211b of the yoke 211. At an inner side of the stator 213, a rotor 215 rotatably supported by bearings 214 respectively fixed at a center portion of the bottom portion 211c of the yoke 211 and a center portion of the end plate 212 is provided.

Figure 30:
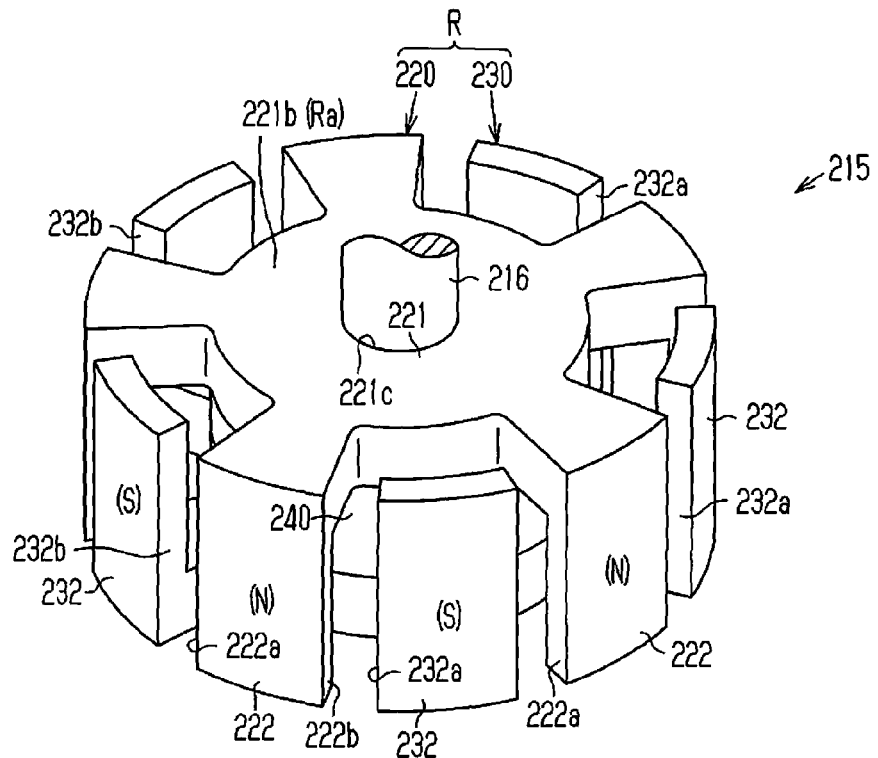
FIG. 30 is a perspective view of a rotor of FIG. 29.
Figure 31:
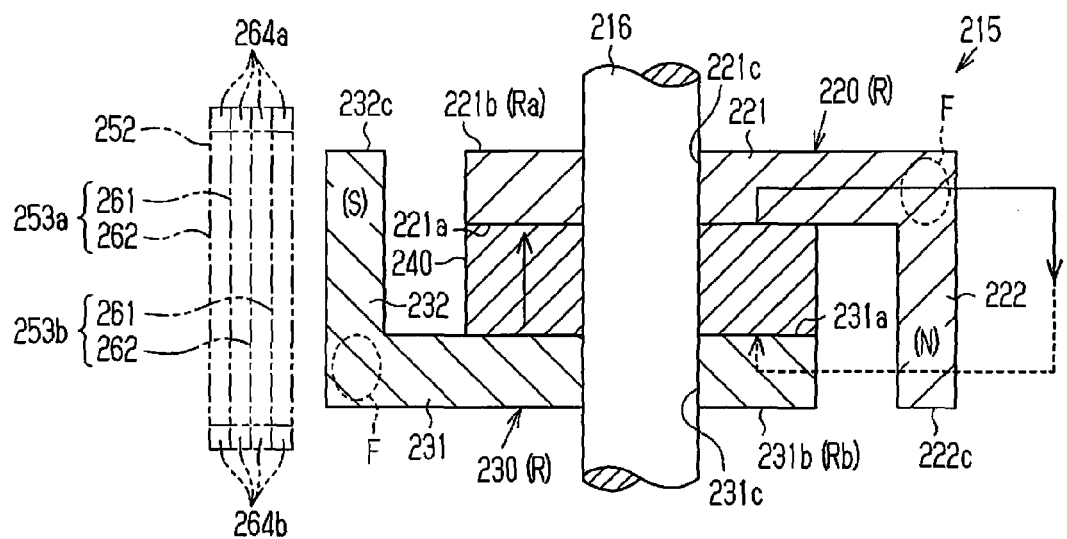
FIG. 31 is a cross-sectional view of the rotor of FIG. 29.
Figure 32:
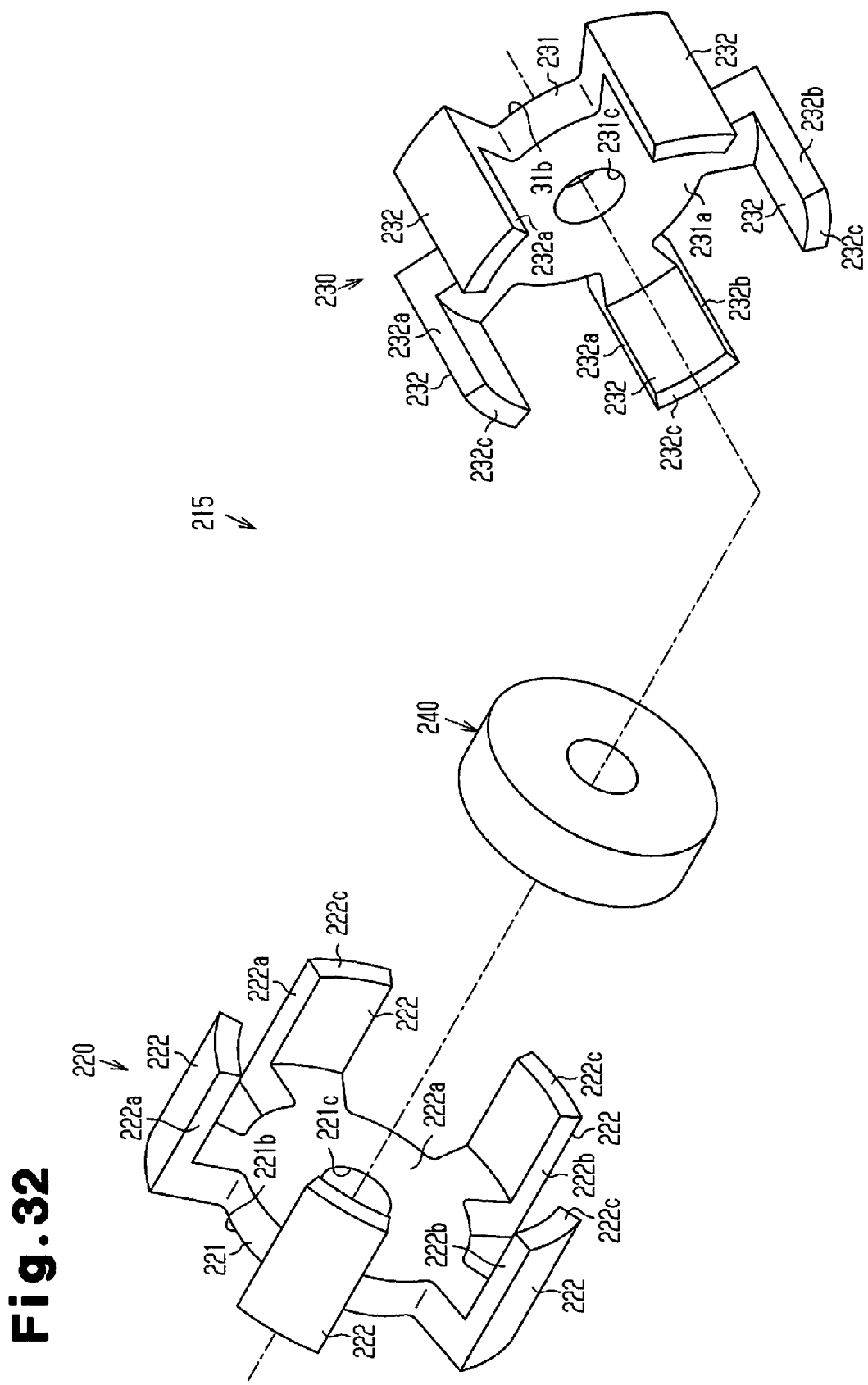
FIG. 32 is an exploded perspective view of the rotor of FIG. 29.

As shown in FIG. 30, FIG. 31, and FIG. 32, the rotor 215 includes a rotary shaft 216 axially supported by the respective bearings 214, a rotor core R formed by a first core member 220 and a second core member 230, and a ring magnet 240 as a field magnet member.

The first core member 220 includes a substantially disk-shaped first core base 221. An insertion hole 221c into which the rotary shaft 216 is inserted is penetratingly formed in an axial direction at a center portion of the first core base 221. The rotary shaft 216 is press fitted and fixed in the insertion hole 221c. Thus, the first core member 220 and the rotary shaft 216 are enabled to rotate integrally.

A plurality of (five in the present embodiment) primary cog-shaped magnetic poles 222 is arranged at equal intervals on an outer peripheral portion of the first core base 221. Each of the primary cog-shaped magnetic poles 222 is projected toward an outer side in a radial direction, and is projected in the axial direction. End surfaces 222a, 222b of each primary cog-shaped magnetic pole 222 in a circumferential direction are formed of flat surfaces extending in the radial direction (not being inclined in the radial direction when as viewed from the axial direction), and the primary cog-shaped magnetic pole 222 has a cross-section in a direction vertically intersecting an axis in a shape of a sector. An angle of each of the primary cog-shaped magnetic poles 222 in the circumferential direction, that is, an angle between the end surfaces 222a, 222b in the circumferential direction is set smaller than an angle of a space between the primary cog-shaped magnetic poles 222 that are adjacent in the circumferential direction.

As shown in FIG. 31 and FIG. 32, the second core member 230 has an identical shape as the first core member 220, and an insertion hole 231c into which the rotary shaft 216 is inserted is formed at a center portion of a substantially disk-shaped second core base 231. The rotary shaft 216 is press fitted and fixed in the insertion hole 231c. Thus, the second core member 230 and the rotary shaft 216 are enabled to integrally rotate.

Further, a plurality of secondary cog-shaped magnetic poles 232 is arranged at equal intervals on an outer peripheral portion of the second core base 231. Each of the secondary cog-shaped magnetic poles 232 is projected toward the outer side in the radial direction, and is projected in the axial direction. End surfaces 232a, 232b of each secondary cog-shaped magnetic pole 232 in the circumferential direction are formed of flat surfaces extending in the radial direction, and the secondary cog-shaped magnetic pole 232 has a cross-section in the direction vertically intersecting the axis in the shape of a sector. An angle of each of the secondary cog-shaped magnetic poles 232 in the circumferential direction, that is, an angle between the end surfaces 232a, 232b in the circumferential direction is set smaller than an angle of a space between the secondary cog-shaped magnetic poles 232 that are adjacent in the circumferential direction.

Further, the second core member 230 is coupled to the first core member 220 so that each of the secondary cog-shaped magnetic poles 232 is arranged between the corresponding ones of primary cog-shaped magnetic poles 222.

More specifically, one end surface 222a of the primary cog-shaped magnetic pole 222 in the circumferential direction and the other end surface 232b of the secondary cog-shaped magnetic pole 232 in the circumferential direction are formed to be parallel along the axial direction, whereby the space between the end surfaces 222a, 232b is formed in a substantially linear shape along the axial direction. Further, in the same manner, the other end surface 222b of the primary cog-shaped magnetic pole 222 in the circumferential direction and one end surface 232a of the secondary cog-shaped magnetic pole 232 in the circumferential direction are formed to be parallel along the axial direction, whereby the space between the end surfaces 222b, 232a is formed in a substantially linear shape along the axial direction.

The ring magnet 240 is arranged (sandwiched) between the first core base 221 and the second core base 231 in the axial direction. The ring magnet 240 forms a circular ring shape, and the rotary shaft 216 penetrates a central portion thereof. The ring magnet 240 is respectively in close contact with an end surface 221a of the first core base 221 on an inner side in the axial direction and an end surface 231a of the second core base 231 on the inner side in the axial direction. The end surfaces 221a, 231a of the respective core bases 221, 331 on the inner side in the axial direction and both end surfaces of the ring magnet 240 in the axial direction form a flat plane shape that is vertical to an axis of the rotary shaft 216.

The primary cog-shaped magnetic poles 222 are caused to be apart in the radial direction from an outer circumferential surface of the second core base 231 and an outer circumferential surface of the ring magnet 240, and distal end surfaces 222c of the primary cog-shaped magnetic poles 222 are configured to be leveled with the outer end surface 231b of the second core base 231 in the axial direction. Further, in the same manner, the secondary cog-shaped magnetic poles 232 are caused to be apart in the radial direction from an outer circumferential surface of the first core base 221 and an outer circumferential surface of the ring magnet 240, and distal end surfaces 232c of the secondary cog-shaped magnetic poles 232 are configured to be leveled with the outer end surface 221b of the first core base 221 in the axial direction.

The ring magnet 240 is magnetized in the axial direction to cause the primary cog-shaped magnetic poles 222 to function as primary magnetic poles (N poles in the present embodiment), and cause the secondary cog-shaped magnetic poles 232 to function as secondary magnetic poles (S poles in the present embodiment). Accordingly, the rotor 215 of the present embodiment is a rotor with a so-called Randell type structure using the ring magnet 240 as a field magnet. The rotor 215 has the primary cog-shaped magnetic poles 222 to be the N poles and the secondary cog-shaped magnetic poles 232 to be the S poles arranged alternately in the circumferential direction, and has the number of magnetic poles of ten poles (the number of pole pairs being five). Here, since the number of pole pairs is an odd number that is three or more, a shape is formed that is stable against magnetic vibration since the cog-shaped magnetic poles of the same polarity are not positioned to be opposed in 180° in the circumferential direction when seen in units of the core members 220, 230. Accordingly, in the rotor 215 having the Randell type structure, since the numbers of the primary and secondary cog-shaped magnetic poles 222, 232 formed on the respective core members 220, 230 (total number thereof) becomes the number of the poles, an advantage can be achieved in that the number of the poles can easily be changed simply by changing the numbers of the primary and secondary cog-shaped magnetic poles 222, 232, which is advantageous especially in multipolarization.

As shown in FIG. 29, the stator 213 includes a core part 251 formed of a cylindrical magnetic body fixed to an inner circumferential surface of the cylindrical portion 211b of the yoke 211, and a substantially cylindrical armature coil 252 arranged on an inner side of the core part 251, and has a slotless structure that does not have slots (teeth) where a coil is to be wound. The armature coil 252 is adhered and fixed to an inner circumferential surface of the core part 251 to surround an outer periphery of the rotor 215, and an inner circumferential surface of the armature coil 252 is configured to oppose an outer circumferential surface of the rotor 215 (outer side surfaces of the respective cog-shaped magnetic poles 222, 232) in the radial direction.

Figure 33A:
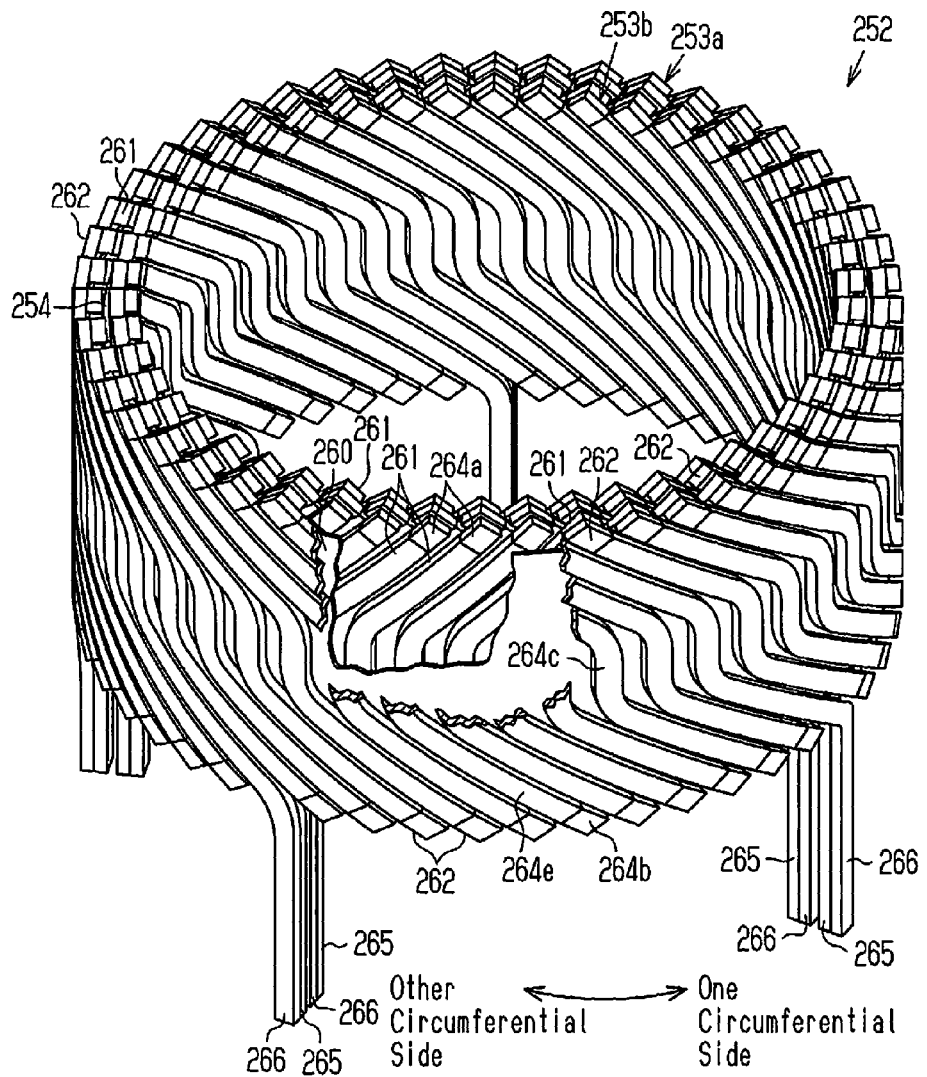
FIG. 33A is a perspective view of an armature coil of FIG. 29.
Figure 33B:
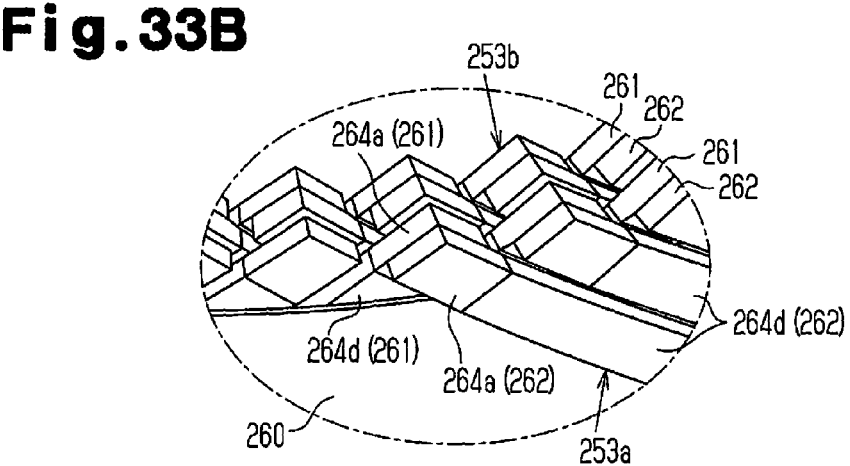
FIG. 33B is a partially enlarged diagram of FIG. 33A.

As shown in FIGS. 33A and 33B, the armature coil 252 includes a first coil body 253a and a second coil body 253b, each of which has a cylindrical shape, and a cylindrical insulating member 254 intervened between the respective coil bodies 253a, 253b in the radial direction. The second coil body 253b is formed with a diameter that is somewhat smaller than the first coil body 253a, and is fixed to an inner circumferential side of the first coil body 253a by the insulating member 254. That is, the first and second coil bodies 253a, 253b are integrally configured in a manner of sandwiching the insulating member 254 in the radial direction, and are electrically insulated from one another by the insulating member 254. Further, an inner circumferential surface of the second coil body 253b opposes the outer circumferential surface of the rotor 215 in the radial direction. The first and second coil bodies 253a, 253b are set with lengths in the axial direction of the rotary shaft 216 that are substantially equal to one another.

Next, the configurations of the first and second coil bodies 253a, 253b will now be described in detail. Since the second coil body 253b has similar configuration as the first coil body 253a other than its diameter being different, only the first coil body 253a will be described in detail below, and detailed explanation of the second coil body 253b will be omitted by giving similar reference signs as the first coil body 253a.

The first coil body 253a includes a cylinder member 260 having a cylindrical shape, a plurality of primary conductors 261 fixed to an inner circumferential surface of the cylinder member 260, and a plurality of secondary conductors 262 fixed to an outer circumferential surface of the cylinder member 260. The cylinder member 260 is formed of a resin material such as plastic, and is formed thin in the radial direction. Forty-eight of the primary conductors 261 and the secondary conductors 262 are respectively juxtaposed annularly along the side surfaces of the cylinder member 260. That is, the first and second coil bodies 253a, 253b are respectively formed by ninety-six conductors 261, 262, and an entirety of the armature coil 252 includes hundred and ninety-two conductors.

Figure 34A:
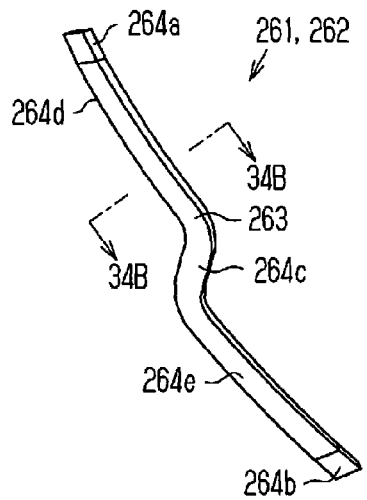
FIG. 34A is a perspective view of primary and secondary conductors of FIG. 33A.
Figure 34B:
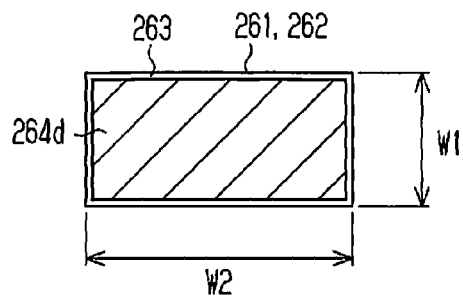
FIG. 34B is a cross-sectional taken along line 34B-34B in FIG. 34A.

The primary and secondary conductors 261, 262 have identical configuration as one another. As shown in FIGS. 34A and 34B, each of the conductors 261, 262 is formed of a metal wire having conductivity, and a surface of its portion other than both end portions in a longitudinal direction (intermediate portion in the longitudinal direction) is covered by an insulative film 263. Further, both end portions of each of the conductors 261, 262 in the longitudinal direction are respectively a first connecting portion 264a and a second connecting portion 264b where the metal is exposed. As shown in FIG. 34B, each of the conductors 261, 262 has a rectangular cross-sectional shape in which width Wr in the radial direction is narrower than a width Wp in the circumferential direction.

As shown in FIGS. 33A and 33B, the primary and secondary conductors 261, 262 are respectively arranged at equal intervals in the circumferential direction (7.5° interval in the present embodiment). Each of the primary and secondary conductors 261, 262 includes a parallel portion 264c that is parallel to the axial direction of the cylinder member 260 at a central portion thereof in the longitudinal direction, and is configured so that positions of the parallel portion 264c of each of the primary conductors 261 and the parallel portion 264c of each of the secondary conductors 262 in the circumferential direction are in conformance with one another. Further, the parallel portions 264c of the respective conductors 261, 262 of the first coil body 253a and the parallel portions 264c of the respective conductors 261, 262 of the second coil body 253b are also configured so that their positions in the circumferential direction are in conformance. That is, the armature coil 252 is configured so that the parallel portions 264c of the four conductors 261, 262 (conductors 261, 262 of the respective coil bodies 253a, 253b) align in the radial direction.

Further, each of the conductors 261, 262 includes a first inclined portion 264d extending from the parallel portion 264c to one side in the axial direction of the cylinder member 260 (upper side in the figure), and a second inclined portion 264e extending from the parallel portion 264c to the other side in the axial direction (lower side in the figure). The first inclined portions 264d of the primary conductors 261 incline with respect to the parallel portions 264c toward one side in the circumferential direction (counter clockwise direction in the figure), and the second inclined portions 264e of the primary conductors 261 incline with respect to the parallel portions 264c toward the other side in the circumferential direction. The first inclined portions 264d of the secondary conductors 262 incline with respect to the parallel portions 264c toward the other side in the circumferential direction, and the second inclined portions 264e of the secondary conductors 262 incline with respect to the parallel portions 264c toward the one side in the circumferential direction. That is, the primary conductors 261 and the secondary conductors 262 are configured so that the inclined directions of the first and second inclined portions 264d, 264e with respect to the parallel portions 264c become opposite of one another. In the respective conductors 261, 262, the first and second inclined portions 264d, 264e are parallel to one another. Further, the respective conductors 261, 262 are configured so that positioning of the adjacent conductors 261, 262 is performed by bent portions formed by the parallel portions 264c and the respective inclined portions 264d, 264e.

The first inclined portion 264d of each of the conductors 261, 262 is extended to a position where a distal portion of the first inclined portion 264d projects to the upper side in the axial direction from one end portion in the axial direction of the cylinder member 260 (upper end portion in FIG. 33A), and the first connecting portion 264a is formed at the distal portion of the first inclined portion 264d projecting from the cylinder member 260. Further, the second inclined portion 264e of each of the conductors 261, 262 is extended to a position where a distal portion of the second inclined portion 264e projects to the lower side in the axial direction from the other end portion in the axial direction of the cylinder member 260 (lower end portion in FIG. 33A), and the second connecting portion 264b is formed at the distal portion of the second inclined portion 264e projecting from the cylinder member 260. Further, in the primary and secondary conductors 261, 262, the first connecting portions 264a are connected to each other and the second connecting portions 264b are connected to each other in a predetermined manner that will be described later.

Copper wire terminals 265, 266, six each, extend along the axial direction of the cylinder member 260 in the first coil body 253a. The copper wire terminals 265, 266 are electrically connected to the second connecting portions 264b of the predetermined conductors 261, 262, and power supplied from a controller 300 (see FIG. 39) is supplied to the first coil body 253a through the copper wire terminals 265, 266.

Figure 35:
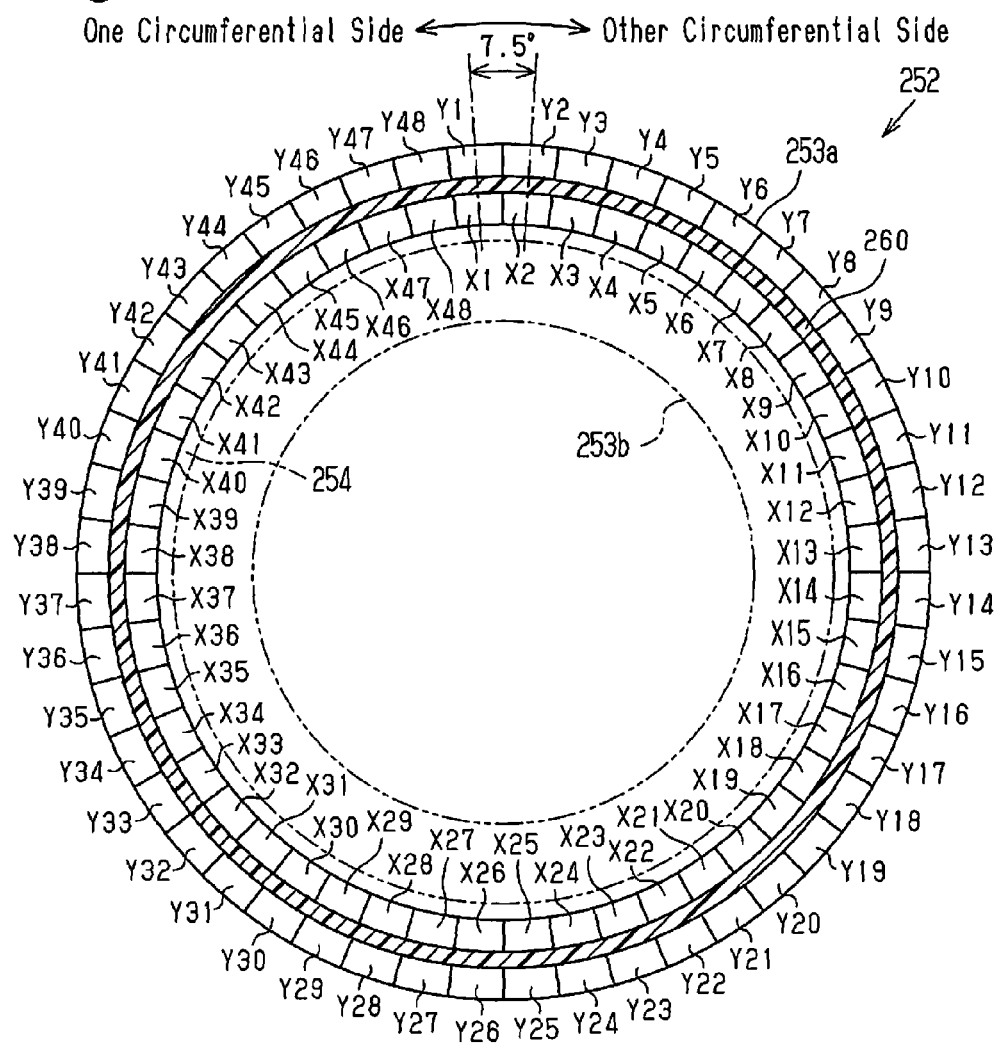
FIG. 35 is a schematic diagram showing the armature coil of FIG. 33A.
Figure 36:
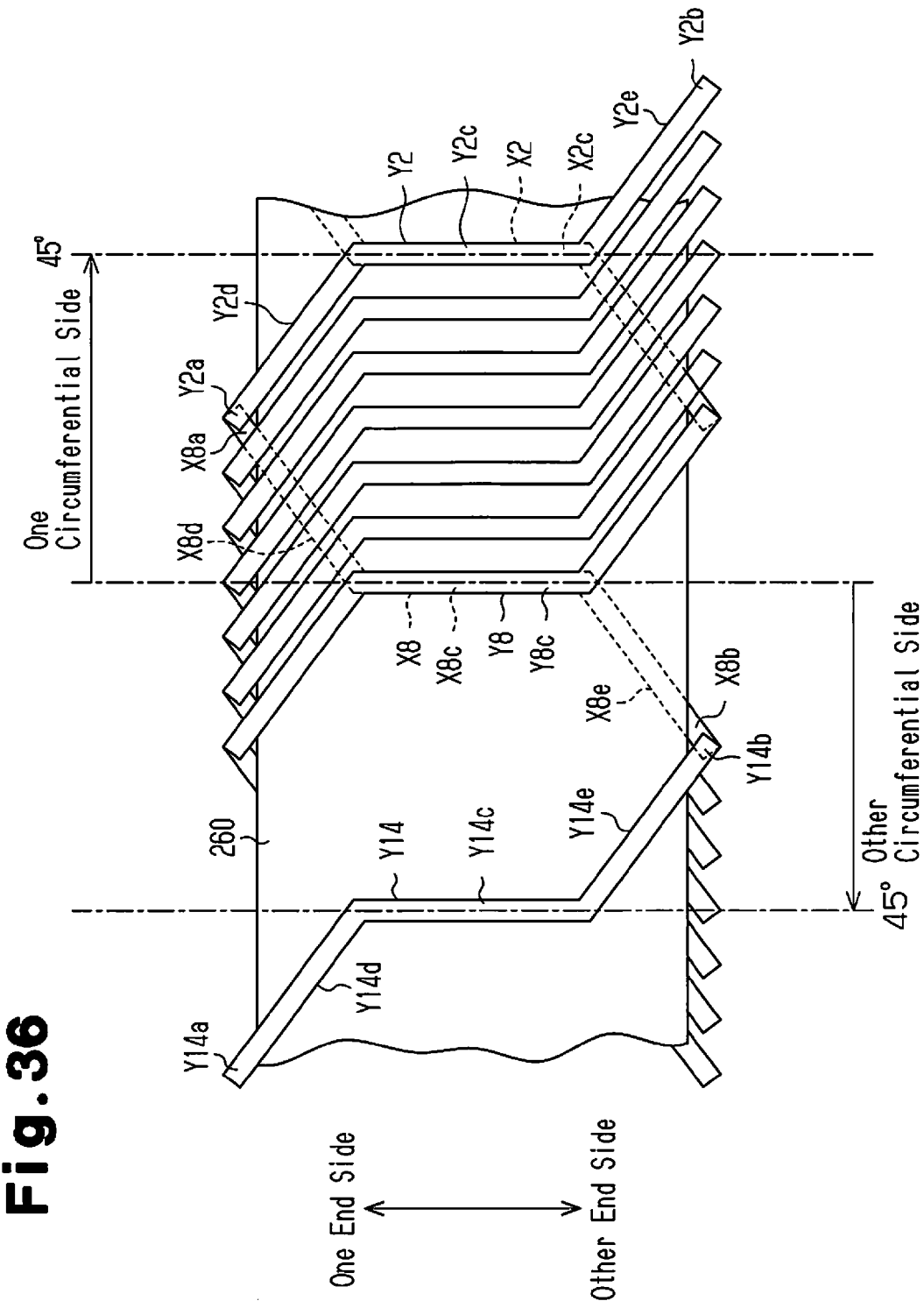
FIG. 36 is a schematic diagram showing a connecting manner of the primary and secondary conductors in the armature coil of FIG. 35.
Figure 37:
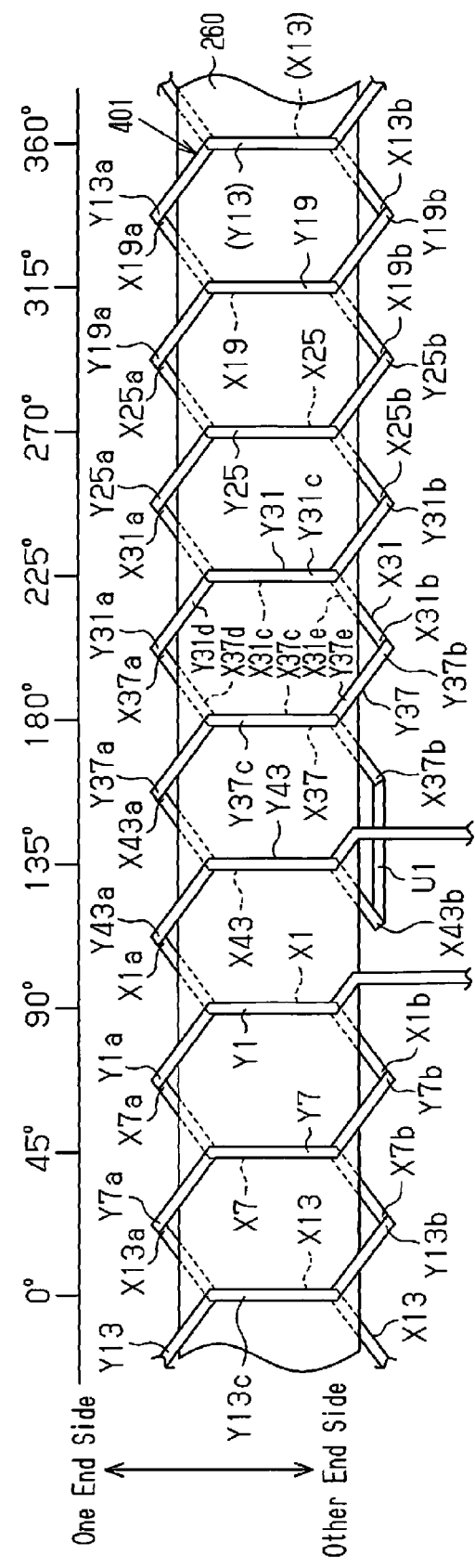
FIG. 37 is a schematic diagram showing the connecting manner of the primary and secondary conductors in the armature coil of FIG. 35.

FIG. 35 to FIG. 37 show schematic diagrams of the armature coil 252. In the schematic diagrams, the forty-eight primary conductors 261 of the first coil body 253a are referred to as the first primary conductor X1 to the forty-eighth primary conductor X48 in the clockwise direction. Further, in the secondary conductors 262 of the first coil body 253a, one of which parallel portion 264c aligns with the parallel portion 264c of the first primary conductor X1 in the radial direction is referred to as the first secondary conductor Y1, and the second secondary conductor Y2 to the forty-eighth secondary conductor Y48 are sequentially arranged in the clockwise direction.

Further, the first connecting portions 264a, the second connecting portions 264b, the parallel portions 264c, the first inclined portions 264d, and the second inclined portions 264e of the aforementioned respective conductors 261, 262 are, for example in the first primary conductor X1, referred to as the first connecting portion X1a, the second connecting portion X1b, the parallel portion X1c, the first inclined portion X1d, and the second inclined portion X1e. Further, for example in the first secondary conductor Y1, they are referred to as the first connecting portion Y1a, the second connecting portion Y1b, the parallel portion Y1c, the first inclined portion Y1d, and the second inclined portion Y1e. The parallel portions X1c to X48c of the first primary conductor X1 to the forty-eighth primary conductor X48 and the parallel portions Y1c to Y48c of the first secondary conductor Y1 to the forty-eighth secondary conductor Y48 are respectively arranged in the radial direction.

The first and second connecting portions 264a, 264b of each of the primary conductors 261 oppose the first and second connecting portions 264a, 264b of the secondary conductor 262 with which an interval between the parallel portions 264c becomes 45°, in the radial direction respectively, and are pressed and fixed together. For example, as shown in FIG. 36, the first connecting portion X8a of the eighth primary conductor X8 is pressed in a radial direction together with the first connecting portion Y2a of the second secondary conductor Y2 that has the parallel portion Y2c arranged at a position spaced by 45° toward one side in the circumferential direction (right side in the figure) from the parallel portion X8c of the primary conductor X8. The second connecting portion X8b of the eighth primary conductor X8 is pressed in a radial direction together with the second connecting portion Y14b of the fourteenth secondary conductor Y14 that has the parallel portion Y14c arranged at a position spaced by 45° toward the other side in the circumferential direction (left side in FIG. 36) from the parallel portion X8c of the primary conductor X8.

Thus, the cylinder member 260 has six coils 401 to 406 (see FIG. 39) respectively formed by eight of the first primary conductor X1 to the forty-eighth primary conductor X48 and eight of the first secondary conductor Y1 to the forty-eighth secondary conductor Y48, which in total are sixteen conductors, wound along the circumferential direction of the cylinder member 260 by being shifted by 7.5°.

As shown in FIG. 37, the first coil 401 is configured by the eight primary conductors X1, X7, X13, X19, X25, X31, X37, X43 and the eight secondary conductors Y1, Y7, Y13, Y19, Y25, Y31, Y37, Y43 being connected as one string. In FIG. 37, right side thereof is the one side in the circumferential direction of the cylinder member 260, and left side thereof is the other side in the circumferential direction.

More specifically, the first connecting portion Y1a of the first secondary conductor Y1 (connecting portion on the one end side in the axial direction in FIG. 37) is connected to the first connecting portion X7a of the seventh primary conductor X7. The second connecting portion X7b of the seventh primary conductor X7 (connecting portion on the other end side in the axial direction in FIG. 37) is connected to the second connecting portion Y13b of the thirteenth secondary conductor Y13. The first connecting portion Y13a of the thirteenth secondary conductor Y13 is connected to the first connecting portion X19a of the nineteenth primary conductor X19. The second connecting portion X19b of the nineteenth primary conductor X19 is connected to the second connecting portion Y25b of the twenty-fifth secondary conductor Y25. The first connecting portion Y25a of the twenty-fifth secondary conductor Y25 is connected to the first connecting portion X31a of the thirty-first primary conductor X31. The second connecting portion X31b of the thirty-first primary conductor X31 is connected to the second connecting portion Y37b of the thirty-seventh secondary conductor Y37. The first connecting portion Y37a of the thirty-seventh secondary conductor Y37 is connected to the first connecting portion X43a of the forty-third primary conductor X43.

Moreover, the second connecting portion X43b of the forty-third primary conductor X43 is connected to the second connecting portion X37b of the thirty-seventh primary conductor X37 by a U-phase connecting portion UC. That is, the conductor that was wound to the other side in the circumferential direction of the cylinder member 260 is folded back to the one side in the circumferential direction at the U-phase connecting portion UC, and is connected in order to the one side in the circumferential direction in the similar manner as above therefrom.

That is, the first connecting portion X37a of the thirty-seventh primary conductor X37 is connected to the first connecting portion Y31a of the thirty-first secondary conductor Y31. The second connecting portion Y31b of the thirty-first secondary conductor Y31 is connected to the second connecting portion X25b of the twenty-fifth primary conductor X25. The first connecting portion X25a of the twenty-fifth primary conductor X25 is connected to the first connecting portion Y19a of the nineteenth secondary conductor Y19. The second connecting portion Y19b of the nineteenth secondary conductor Y19 is connected to the second connecting portion X13b of the thirteenth primary conductor X13. The first connecting portion X13a of the thirteenth primary conductor X13 is connected to the first connecting portion Y7a of the seventh secondary conductor Y7. The second connecting portion Y7b of the seventh secondary conductor Y7 is connected to the second connecting portion X1b of the first primary conductor X1. Further, the first connecting portion X1a of the first primary conductor X1 is connected to the first connecting portion Y43a of the forty-third secondary conductor Y43.

As described above, eight primary conductors X1, X7, X13, X19, X25, X31, X37, X43 and eight secondary conductors Y1, Y7, Y13, Y19, Y25, Y31, Y37, Y43, which in total are sixteen conductors, are connected to configure the coil 401. Further, by being connected in the above manner, a plurality of portions where the conductors substantially form a ring shape as viewed from the radial direction is formed in the coil 401. For example, a substantially hexagonal ring-shaped conductor is formed by the first inclined portion Y31d of the thirty-first secondary conductor Y31, the parallel portion Y31c thereof (and the parallel portion X31c of the thirty-first primary conductor X31), the second inclined portion X31e of the thirty-first primary conductor X31, the second inclined portion Y37e of the thirty-seventh secondary conductor Y37, the parallel portion Y37c thereof (and the parallel portion X37c of the thirty-seventh primary conductor X37), and the first inclined portion X37d of the thirty-seventh primary conductor X37.

Accordingly, the ring-shaped conductor is formed by the primary conductors 261 arranged at the 45° interval in the circumferential direction (for example, the primary conductor X31 and the primary conductor X37) and the secondary conductors 262 arranged at the 45° interval in the circumferential direction (for example, the secondary conductor Y31 and the secondary conductor Y37). Thus, the coil 401 includes eight ring-shaped conductors arranged along the circumferential direction that are formed by the primary conductors X1, X7, X13, X19, X25, X31, X37, X43 and the secondary conductors Y1, Y7, Y13, Y19, Y25, Y31, Y37, Y43. Moreover, by current being flown through the respective ring-shaped conductors, magnetic poles that differ from one another are formed in the ring-shaped conductors that are adjacent in the circumferential direction. That is, the primary conductors X1, X7, X13, X19, X25, X31, X37, X43 and the secondary conductors Y1, Y7, Y13, Y19, Y25, Y31, Y37, Y43 connected as above form the coil 401 having the eight magnetic poles arranged at equal intervals along the circumferential direction.

The second coil 402 (see FIG. 39) has a configuration shifted by 7.5° in the circumferential direction with respect to the first coil 401 (corresponding to one interval between the conductors 261, 262). That is, the second coil 402 is configured by eight primary conductors X2, X8, X14, X20, X26, X32, X38, X44 and eight secondary conductors Y2, Y8, Y14, Y20, Y26, Y32, Y38, Y44 connected in a similar manner as the first coil 401.

Further, the third coil 403 (see FIG. 39) has a configuration shifted by 7.5° in the circumferential direction with respect to the second coil 402. That is, the third coil 403 is configured by eight primary conductors X3, X9, X15, X21, X27, X33, X39, X45 and eight secondary conductors Y3, Y9, Y15, Y21, Y27, Y33, Y39, Y45 connected in a similar manner as the first coil 401.

Further, the fourth coil 404 (see FIG. 39) has a configuration shifted by 7.5° in the circumferential direction with respect to the third coil 403. That is, the fourth coil 404 is configured by eight primary conductors X4, X10, X16, X22, X28, X34, X40, X46 and eight secondary conductors Y4, Y10, Y16, Y22, Y28, Y34, Y40, Y46 connected in a similar manner as the first coil 401.

Further, the fifth coil 405 (see FIG. 39) has a configuration shifted by 7.5° in the circumferential direction with respect to the fourth coil 404. That is, the fifth coil 405 has eight primary conductors X5, X11, X17, X23, X29, X35, X41, X47 and eight secondary conductors Y5, Y11, Y17, Y23, Y29, Y35, Y41, Y47 connected in a similar manner as the first coil 401.

Further, the sixth coil 406 (see FIG. 39) has a configuration shifted by 7.5° in the circumferential direction with respect to the fifth coil 405. That is, the sixth coil 406 has eight primary conductors X6, X12, X18, X24, X30, X36, X42, X48 and eight secondary conductors Y6, Y12, Y18, Y24, Y30, Y36, Y42, Y48 connected in a similar manner as the first coil 401.

Accordingly, the cylinder member 260 has six coils 401 to 406 respectively formed by sixteen conductors wound around by being shifted by 7.5° along the circumferential direction of the cylinder member 260.

Figure 39:
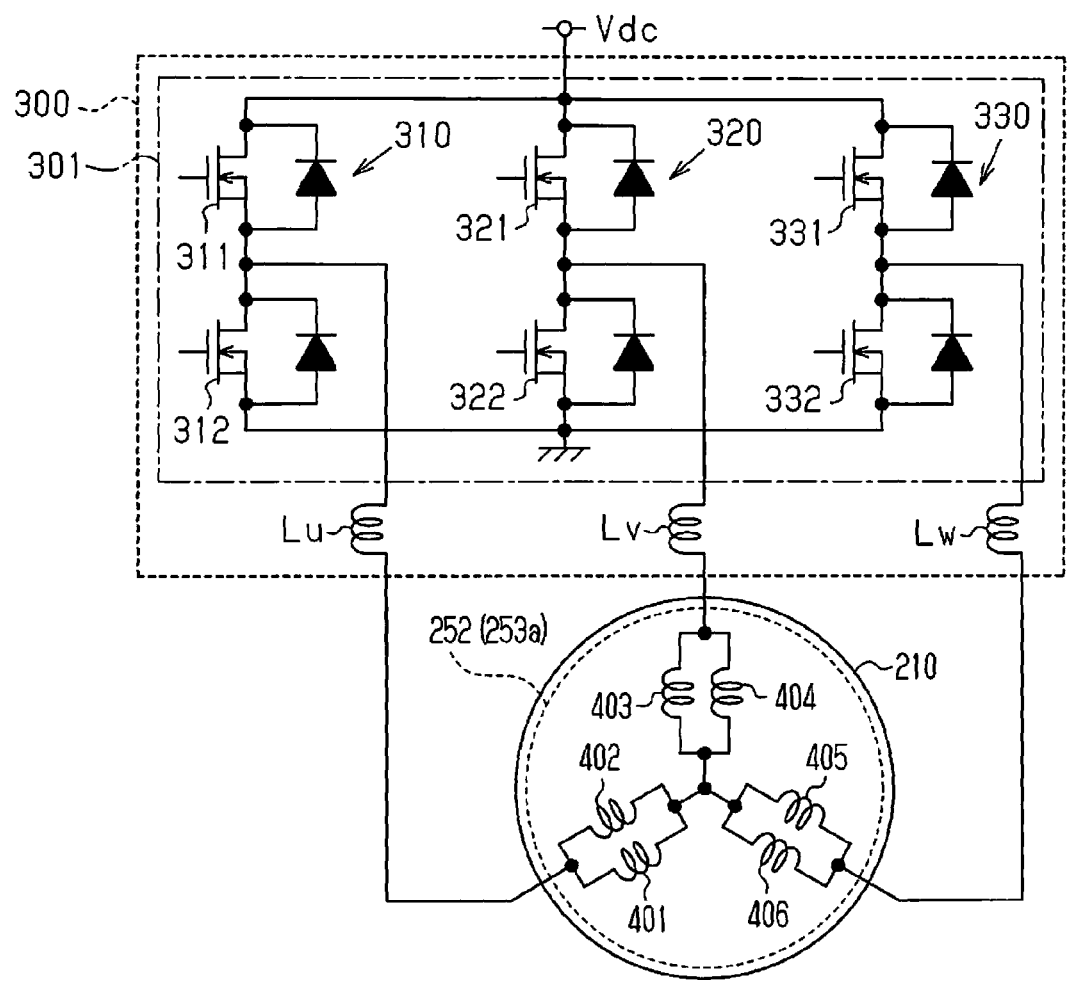
FIG. 39 is a schematic diagram of a controller for the armature coil of FIG. 35.

As shown in FIG. 39, the coils that are adjacent in the circumferential direction (the coil 401 and the coil 402, the coil 403 and the coil 404, the coil 405 and the coil 406) are connected to be of same phase, respectively. That is, the U-phase coil includes two coils 401, 402 that are connected in parallel, the V-phase coil includes two coils 403, 404 that are connected in parallel, and the W-phase coil includes two coils 405, 406 that are connected in parallel.

Figure 38:
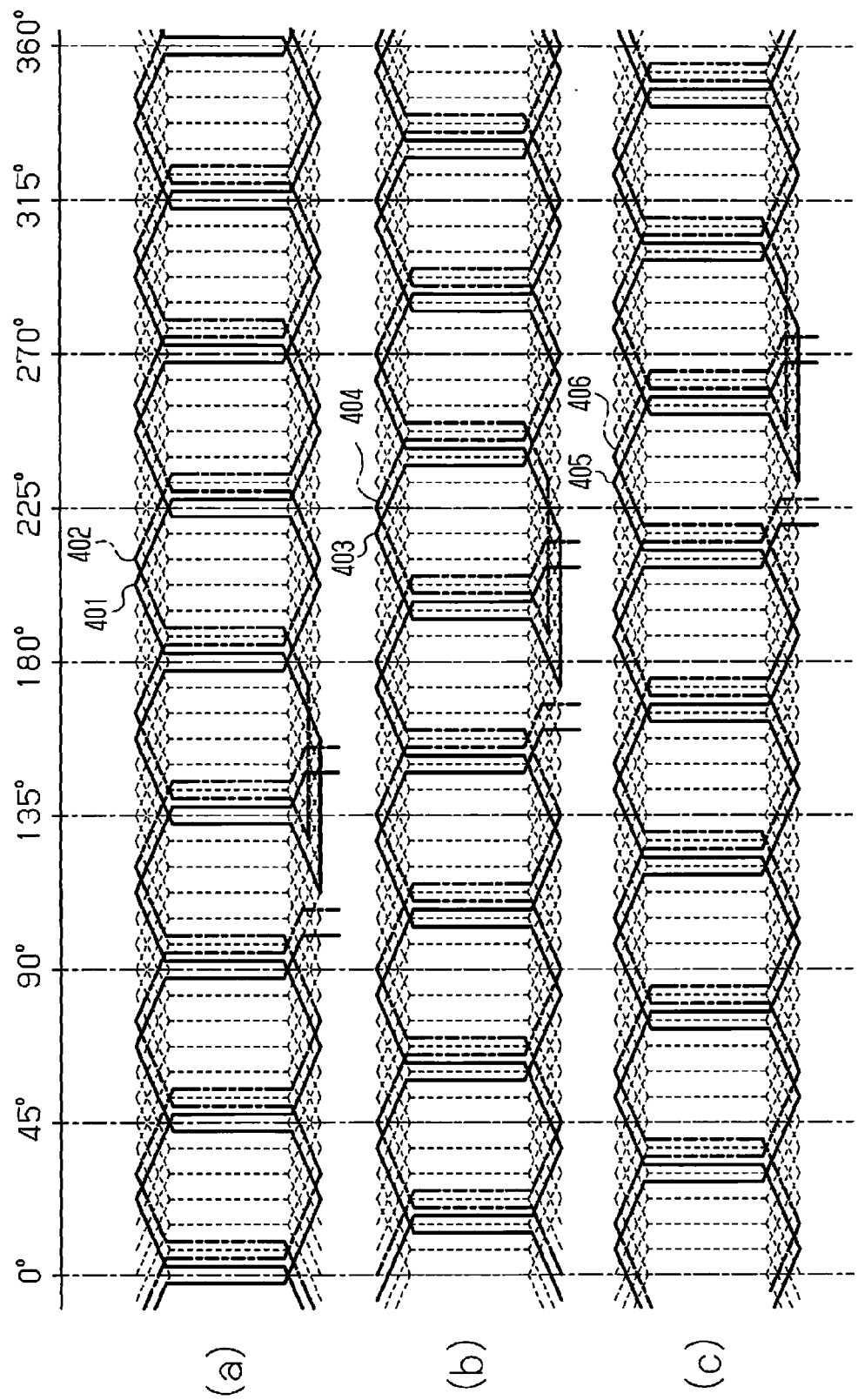
FIG. 38 is a connection diagram of the armature coil of FIG. 35.

Accordingly, as shown in items (a) to (c) of FIG. 38, each phase of U, V, and W is arranged by being shifted by 15° along the circumferential direction of the cylinder member 260. Further, each phase of U, V, and W is respectively formed of sixteen primary conductors 261 (the first primary conductor X1 to the forty-eighth primary conductor X48) and sixteen secondary conductors 262 (the first secondary conductor Y1 to the forty-eighth secondary conductor Y48), which in total are thirty two conductors.

A manner of electrical conduction of the armature coil 252 described above is determined in accordance with rotation amount of the rotor 215 by the controller 300 shown in FIG. 39.

More specifically, the controller 300 includes a driving circuit 301 connected to a pulse width modulation circuit as a controller circuit not shown, that is, a PWM (Pulse Width Modulation) circuit. Carrier frequency of the PWM is set at about 10 kHz to 40 kHz.

The driving circuit 301 includes three (three-phase) parallel circuits (U-phase electric conduction circuit 310, V-phase electric conduction circuit 320, and W-phase electric conduction circuit 330) having one side connected to a power source Vdc and the other side grounded. Each of the parallel circuits 310, 320, 330 respectively includes primary switching elements 311, 321, 331, and secondary switching elements 312, 322, 332 serially connected to the primary switching elements 311, 321, 331. A control signal output from the PWM circuit is input to each of the switching elements 311, 312, 321, 322, 331, 332.

Further, in each of the circuits 310, 320, 330, the armature coil 252 of the slotless motor 210 is connected between the primary switching elements 311, 321, 331 and the secondary switching elements 312, 322, 332. Further, driving current is supplied to the slotless motor 210 with the switching elements 311, 312, 321, 322, 331, 332 being turned on and off based on the control signal output from the PWM circuit. Accordingly, due to the controller 300, the rotating magnetic field is generated by an electric conduction state of the armature coil 252 being switched, and the rotor 215 is rotated.

External inductances Lu, Lv, Lw are connected between the driving circuit 301 and the armature coil 252 of the slotless motor 210. These external inductances Lu, Lv, Lw are formed by coils, and values of the external inductances Lu, Lv, Lw are set to be several ten to several hundred μH (microhenry), which is about ten to hundred times a value of inductance of the armature coil 252, which is several μH (microhenry).

As shown in FIG. 33A, in the armature coil 252 of the present embodiment, positions in the axial direction of upper side end portions in the axial direction of the respective conductors 261, 262 of each of the coil bodies 253a, 253b (that is, the first connecting portions 264a) are in conformance with one another. Further, positions in the axial direction of lower side end portions in the axial direction of the respective conductors 261, 262 of each of the coil bodies 253a, 253b (that is, the second connecting portions 264b) are in conformance with one another. Further, as shown in FIG. 31, each of the first connecting portions 264a and each of the second connecting portions 264b are respectively arranged on an outer side in the axial direction than a first end surface Ra of the rotor core R in the axial direction (more specifically, the outer end surface 221b of the first core base 221 in the axial direction) and a second end surface Rb in the axial direction (more specifically, the outer end surface 231b of the second core base 231 in the axial direction). In other words, each of the first connecting portions 264a projects to the one side (upper side) in the axial direction than the first end surface Ra of the rotor core R in the axial direction, and each of the second connecting portions 264b projects to the other side (lower side) in the axial direction than the second end surface Rb of the rotor core R in the axial direction.

Next, the operation of the eighth embodiment will be described.

The slotless motor 210 of the present embodiment includes the rotor 215 of the Randell type structure, and the stator 213 of the slotless structure having the armature coil 252 formed in the cylindrical shape surrounding an outer periphery of the rotor 215. The rotor 215 of the Randell type structure has its outer circumferential surface shape in a concavo-convex shape that is projected by the cog-shaped magnetic poles 222, 232, and is recessed between the cog-shaped magnetic poles 222, 232. Thus, magnetic flux distribution in the circumferential direction on an outer circumferential side of the rotor 215 is made scarce. Here, when forming the stator with a structure having slots as in the conventional configuration (that is, the structure in which coils are wound on teeth), the magnetic flux distribution in the circumferential direction on a stator inner circumferential side by the concavo-convex shape on the stator inner circumferential surface formed by the teeth shape becomes scarce, whereby cogging torque is increased, by being together with the magnetic flux distribution in the rotor 215. In this regard, in the present embodiment, since the stator 213 has the slotless structure not having any teeth, the magnetic flux distribution in the circumferential direction on the inner circumferential side of the stator 213 can be brought to be nearly even. Thus, the cogging torque can be reduced even if the magnetic flux distribution in the circumferential direction on the outer circumferential side of the rotor 215 is scarce, which as a result can suppress an occurrence of vibration of a motor 210.

Further, as shown in FIG. 31, in the rotor 215 of the Randell type structure, the magnetic flux that flows in the respective cog-shaped magnetic poles 222, 232 through the respective core bases 221, 231 contributes to the generation of torque in the rotor 215 among the magnetic flux of the ring magnet 240, however, the magnetic flux tends to accumulate at portions in the respective cog-shaped magnetic poles 222, 232 that bend toward the axial direction (bent portions F). That is, the magnetic flux of the ring magnet 240 can be said as likely to accumulate at the end portions of the outer circumferential surface of the rotor core R in the axial direction. Here, in the present embodiment, each of the first connecting portions 264a and each of the second connecting portions 264b are respectively arranged on the outer side in the axial direction than the first end surface Ra of the rotor core R in the axial direction and the second end surface Rb in the axial direction. Thus, the respective coil bodies 253a, 253b of the armature coil 252 are configured longer than the rotor core R in the axial direction, and a configuration by which the magnetic flux accumulated at the end portions of the outer circumferential surface of the rotor 215 in the axial direction (bent portions F) can more surely be utilized is obtained. As a result, an output of the slotless motor 210 is improved.

Next, characteristic advantages of the eighth embodiment will be described.

(15) The motor 210 includes the ring-shaped stator 213 and the rotor 215 arranged on the inner side of the stator 213. The rotor 215 is of the Randell type structure. The stator 213 is of the slotless structure having the cylindrical armature coil 252 surrounding the outer circumference of the rotor 215. Thus, since the stator 213 is configured not to have the teeth opposed to the rotor 215 in the radial direction and onto which the coils are wound (slotless structure), the magnetic flux distribution in the circumferential direction on the inner circumferential side of the stator 213 can be brought to be nearly even. Thus, the cogging torque can be reduced even by using the rotor 215 of the Randell type structure, which as a result enables to suppress the occurrence of the vibration in the motor 210.

Further, since the stator 213 of the slotless structure does not have any teeth, it becomes easy to change the number of poles. Thus, the numbers of poles in both the rotor 215 and the stator 213 can easily be changed, and designing of the motor 210 becomes easy. Further, this is advantageous especially in multipolarization.

(16) The armature coil 252 includes the plurality of conductors 261, 262 (X1 to X48, Y1 to Y48). Each of the plurality of conductors 261, 262 (X1 to X48, Y1 to Y48) forms a linear shape, and includes the end portions in the axial direction provided with the first and second connecting portions 264a, 264b (X1a to X48a, X1b to X48b, Y1a to Y48a, Y1b to Y48b). The armature coil 252 is formed by the plurality of conductors 261, 262 (connecting portions X1a to X48a, X1b to X48b, Y1a to Y48a, Y1b to Y48b of X1 to X48, Y1 to Y48) being connected to one another. The first and second connecting portions 264a, 264b (X1a to X48a, X1b to X48b, Y1a to Y48a, Y1b to Y48b) are arranged on the outer side in the axial direction than the end portions of the rotor core R in the axial direction. Thus, the magnetic flux accumulated at the end portions of the outer circumferential surface of the rotor 215 in the axial direction can more surely be utilized, which as a result can improve the output of the motor 210.

Ninth Embodiment

Next, a ninth embodiment according to the present invention will now be described with reference to FIG. 40 to FIG. 44.

Figure 40:
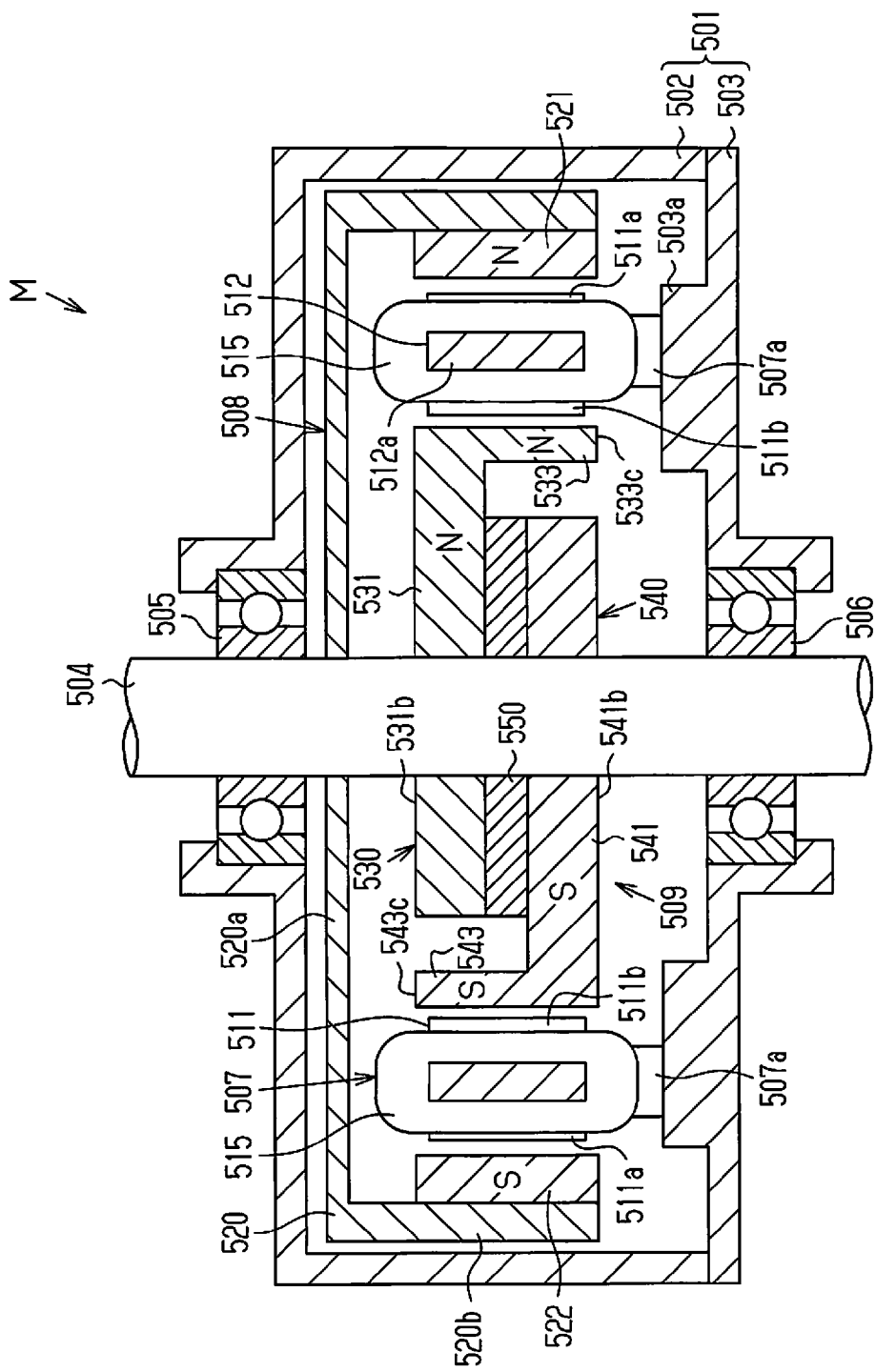
FIG. 40 is an axial direction cross-sectional view of a brushless motor of a ninth embodiment.

As shown in FIG. 40, a motor casing 501 of a brushless motor (hereafter simply referred to as a motor) M includes a cylindrical motor housing 502 with a cover, and the cover 503 that closes an opening of the motor housing 502. The motor casing 501 rotatably supports a rotary shaft 504 that penetrates a space formed by the motor housing 502 and the cover 503 in an up and down direction in FIG. 40 (center axial direction of the motor housing 502) by a bearing 505 provided in the motor housing 502 and a bearing 506 provided in the cover 503. Further, inside the motor casing 501, a stator 507 supported and fixed to the cover 503, and an outer rotor 508 and an inner rotor 509 fixed to the rotary shaft 504 are provided.

Figure 41:
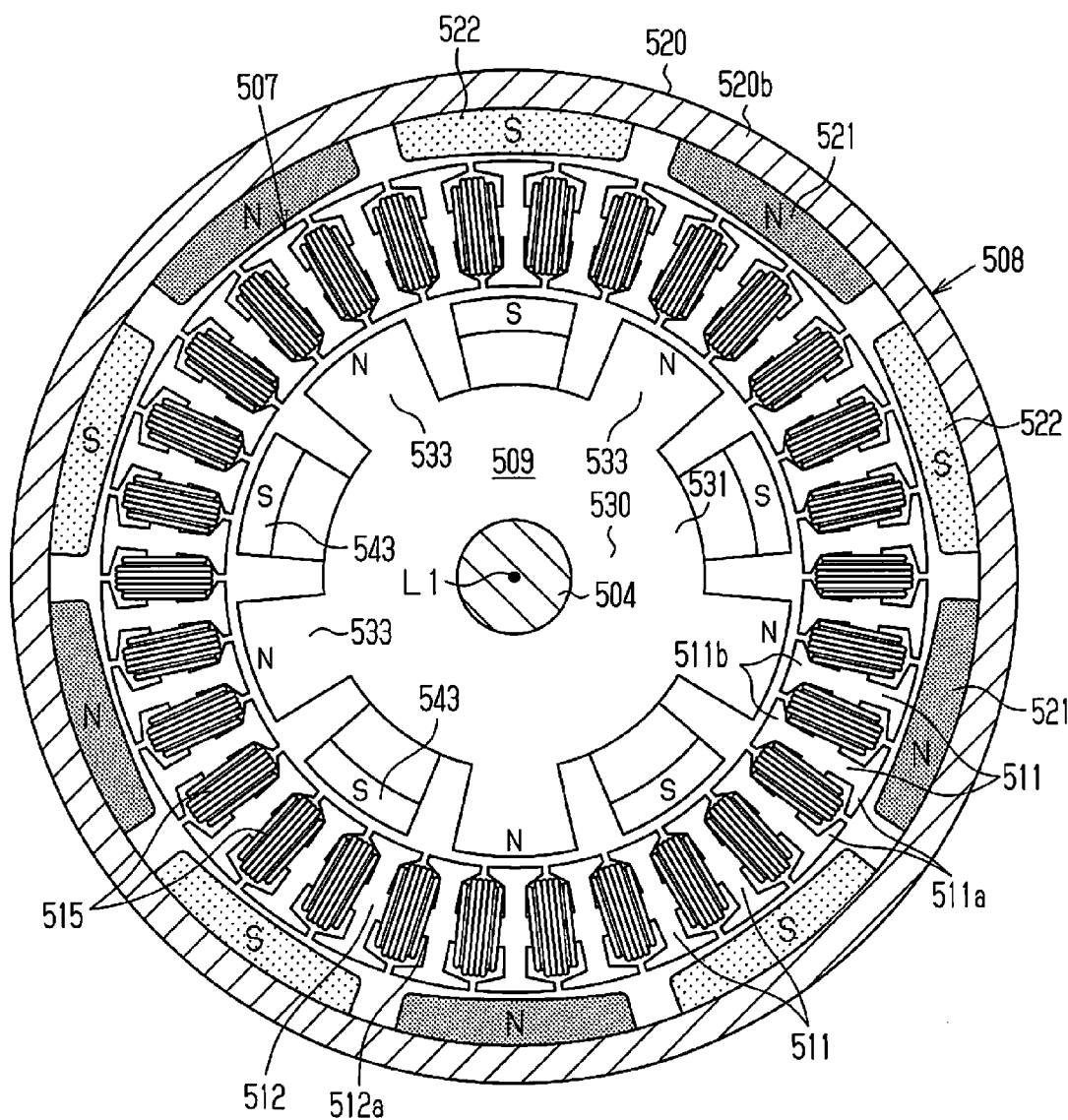
FIG. 41 is a radial direction cross-sectional view of a stator and a rotor of FIG. 40.

As shown in FIG. 41, the stator 507 includes a plurality of teeth portions 511, and a ring portion 512 that couples the respective teeth portions 511 in a ring shape so that the plurality of teeth portions 511 extends in a radial direction with a center axis L1 of the rotary shaft 504 as a center and are arranged at an equiangular interval in a circumferential direction.

The ring portion 512 includes coupling portions 512a that couple between the teeth portions 511 and the teeth portions 511. Each of the coupling portions 512a is coupled to intermediate portions of the teeth portions 511 in the radial direction. Further, each of the teeth portions 511 includes an outer tooth 511a extending to an outer side in the radial direction and an inner tooth 511b extending to an inner side in the radial direction from the coupling portion 512a of the ring portion 512. Further, coils 515 are wound on each of the coupling portions 512a of the ring portion 512 (troidal winding), and the coils 515 are connected either by three-phase star connection or delta connection.

In the ninth embodiment, the number of the teeth portions 511 (outer teeth portions 511a and inner teeth portions 511b) is thirty, and the number of the coupling portions 512a of the ring portion 512 is thirty, which is identical to the number of the teeth portions 511.

Further, the teeth portions 511 coupled in the ring shape by the ring portion 512 respectively have an end portion 507a that opposes the cover 503. The end portions 507a are projected toward the cover 503, and are supported and fixed by a ring-shaped supporting portion 503a formed on an inner side of the cover 503. Thus, the stator 507 is fixed to the cover 503.

The outer rotor 508 and the inner rotor 509 are fixed to the rotary shaft 504.

As shown in FIG. 40, the outer rotor 508 includes a cylindrical outer rotor core 520 with a cover. The rotary shaft 504 penetrates at a center position of the cover portion 520a of the outer rotor core 520, and the cover portion 520a is fixed to the rotary shaft 504. A cylindrical wall 520b of the outer rotor core 520 is arranged between the motor housing 502 and the stator 507. That is, an inner circumferential surface of the cylindrical wall 520b of the outer rotor core 520 opposes the outer teeth 511a in the radial direction.

As shown in FIG. 41, the inner circumferential surface of the cylindrical wall 520b has five primary permanent magnets 521 and five secondary permanent magnets 522 adhered alternately in the circumferential direction. Each of the primary permanent magnets 521 and each of the secondary permanent magnets 522 extend along the axial direction. The primary permanent magnets 521 are magnetized so that their inner side in the radial direction is an N pole, and their outer side in the radial direction is an S pole. The secondary permanent magnets 522 are magnetized so that their inner side in the radial direction is an S pole, and their outer side in the radial direction is an N pole, contrary to the primary permanent magnets 521.

Accordingly, the outer rotor 508 becomes an SPM type rotor due to having the primary permanent magnets 521 and the secondary permanent magnets 522 adhered alternately in the circumferential direction on the inner circumferential surface of the cylindrical wall 520b. In addition, since the outer rotor 508 of the ninth embodiment has the primary permanent magnets 521 to be the N poles and the secondary permanent magnets 522 to be the S poles arranged alternately in the circumferential direction, the number of magnetic poles becomes ten poles (the number of pole pairs being five).

As shown in FIG. 40, the inner rotor 509 is fixed to the rotary shaft 504 to be positioned on the inner side of the stator 507 in the radial direction. Accordingly, a surface of the inner rotor 509 on the outer side in the radial direction opposes the inner teeth 511b in the radial direction.

The inner rotor 509 includes a first rotor core 530, a second rotor core 540 arranged opposed to the first rotor core 530, and a disk magnet (field magnet member) 550 arranged between the first rotor core 530 and the second rotor core 540.

Figure 42:
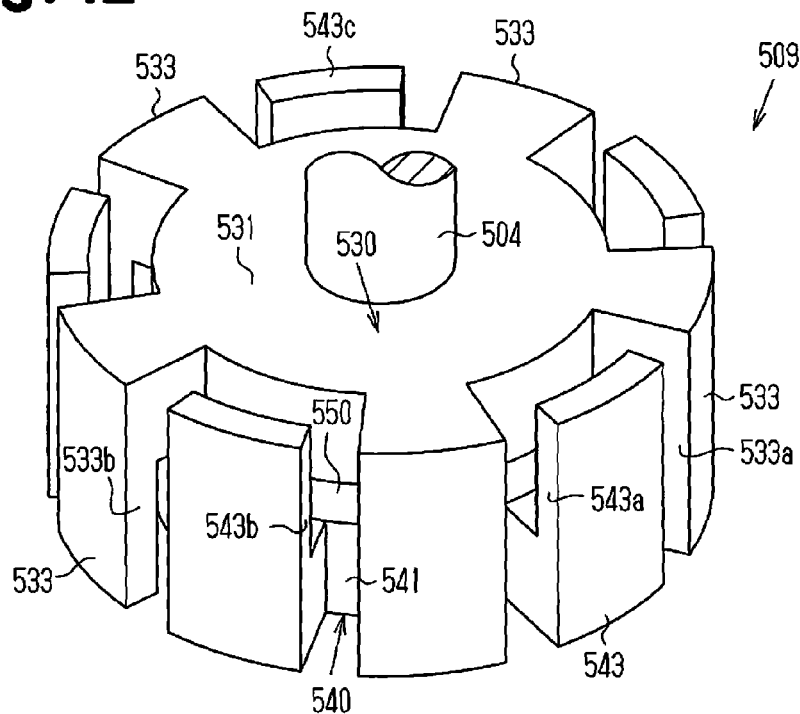
FIG. 42 is an overall perspective view of an inner rotor of FIG. 40.
Figure 43:
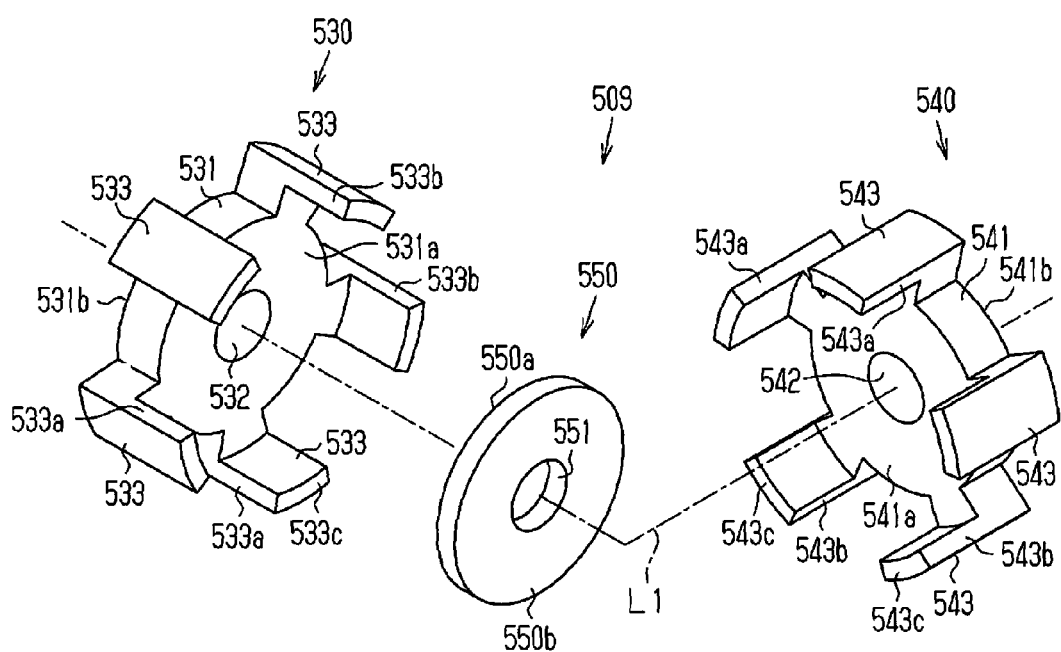
FIG. 43 is an exploded perspective view of the inner rotor of FIG. 42.

As shown in FIG. 42 and FIG. 43, the first rotor core 530 includes a first core base 531 formed in a substantially disk-shaped. A through hole 532 for inserting and fixing the rotary shaft 504 is formed at a central position of the first core base 531. Further, a plurality (five in the present embodiment) of primary projecting pieces 533 is arranged at equal intervals on an outer circumferential surface of the first core base 531. Each of the primary projecting pieces 533 is projected to the outer side in the radial direction from the first core base 531, and a distal end thereof is bent and projected toward one side in the axial direction, that is, toward the second rotor core 540.

End surfaces 533a, 533b of the primary projecting piece 533 in the circumferential direction are flat surfaces extending in the radial direction (not being inclined with respect to the radial direction when as viewed from the axial direction), and the primary projecting piece 533 is formed with a cross-section in a direction vertically intersecting an axis in a sector shape.

An angle of each of the primary projecting pieces 533 in the circumferential direction, that is, an angle formed between the end surfaces 533a, 533b in the circumferential direction and a center axis L1 of the rotary shaft 504 is set smaller than an angle of a space between adjacent primary projecting piece 533 and primary projecting piece 533.

As shown in FIG. 42 and FIG. 43, the second rotor core 540 includes a second core base 541 having the same shape as the first rotor core 530 and is substantially disk-shaped. A through hole 542 for inserting and fixing the rotary shaft 504 is formed at a central position of the second core base 541. Further, a plurality (five in the present embodiment) of secondary projecting pieces 543 is arranged at equal intervals on an outer circumferential surface of the second core base 541. Each of the secondary projecting pieces 543 is projected to the outer side in the radial direction, and a distal end thereof is bent and projected toward the other side in the axial direction, that is, toward the first rotor core 530.

End surfaces 543a, 543b of the secondary projecting piece 543 in the circumferential direction are flat surfaces extending in the radial direction, and the secondary projecting piece 543 is formed with a cross-section in the direction vertically intersecting the axis in a sector shape.

An angle of each of the secondary projecting pieces 543 in the circumferential direction, that is, an angle formed between the end surfaces 543a, 543b in the circumferential direction and the center axis L1 of the rotary shaft 504 is set smaller than an angle of a space between adjacent secondary projecting piece 543 and secondary projecting piece 543.

Further, the second rotor core 540 is configured to be arranged and fixed with respect to the first rotor core 530 so that the secondary projecting pieces 543 of the second rotor core 540 are positioned between the primary projecting pieces 533 of the first rotor core 530 respectively as viewed from the axial direction. Here, the second rotor core 540 is coupled to the first rotor core 530 so that the disk magnet 550 is arranged between the first rotor core 530 and the second rotor core 540 in the axial direction.

More specifically, as shown in FIG. 40 and FIG. 42, the disk magnet 550 is sandwiched between a surface of the first core base 531 opposing the second core base 541 (opposing surface 531a) and a surface of the second core base 541 opposing the first core base 531 (opposing surface 541a).

Here, since the one end surfaces 533a of the primary projecting pieces 533 in the circumferential direction and the other end surfaces 543a of the secondary projecting pieces 543 in the circumferential direction are formed to be parallel along the axial direction, spaces between both end surfaces 533a, 543b are formed in a substantially linear shape in the axial direction. Further, since the other end surfaces 533b of the primary projecting pieces 533 in the circumferential direction and the one end surfaces 543b of the secondary projecting pieces 543 in the circumferential direction are formed to be parallel along the axial direction, spaces between both end surfaces 533b, 543a are formed in a substantially linear shape in the axial direction.

The disk magnet 550 is a disk-shaped permanent magnet, and as shown in FIG. 43, a through hole 551 for penetrating the rotary shaft 504 is formed at a central position thereof. Further, one side surface 550a of the disk magnet 550 contacts the opposing surface 531a of the first core base 531, and the other side surface 550b of the disk magnet 550 contacts the opposing surface 541a of the second core base 541 respectively, and the disk magnet 550 is sandwiched and fixed between the first rotor core 530 and the second rotor core 540.

An outer diameter of the disk magnet 550 is set to in conformance with an outer diameter of the first and second core bases 531, 541, and a thickness thereof is set to a predetermined thickness.

That is, when the disk magnet 550 is arranged between the first rotor core 530 and the second rotor core 540, distal end surfaces 533c of the primary projecting pieces 533 and an opposed surface 541b of the second core base 541 become leveled, and distal end surfaces 543c of the secondary projecting pieces 543 and an opposed surface 531b of the first core base 531 become leveled.

The disk magnet 550 is magnetized along the axial direction so that a portion on a first rotor core 530 side becomes an N pole, and a portion on a second rotor core 540 side becomes an S pole. Accordingly, due to the disk magnet 550, the primary projecting pieces 533 of the first rotor core 530 function as N poles (primary magnetic poles), and the secondary projecting pieces 543 of the second rotor core 540 function as S poles (secondary magnetic poles).

As a result, the inner rotor 509 becomes a rotor with a so-called Randell type structure using the disk magnet 550. Further, in the inner rotor 509 of the ninth embodiment, since the primary projecting pieces 533 to be the N poles and the secondary projecting pieces 543 to be the S poles are alternately arranged in the circumferential direction, it becomes a rotor with the number of the magnetic poles being ten poles (the number of pole pairs being five).

The outer rotor 508 and the inner rotor 509 are arranged relatively in the circumferential direction so that the primary permanent magnets 521 (N poles) of the outer rotor 508 and the primary projecting pieces 533 (N poles) of the inner rotor 509 are opposed in the radial direction, and the secondary permanent magnets 522 (S poles) of the outer rotor 508 and the secondary projecting pieces 543 (S poles) of the inner rotor 509 are opposed in the radial direction.

Figure 44:
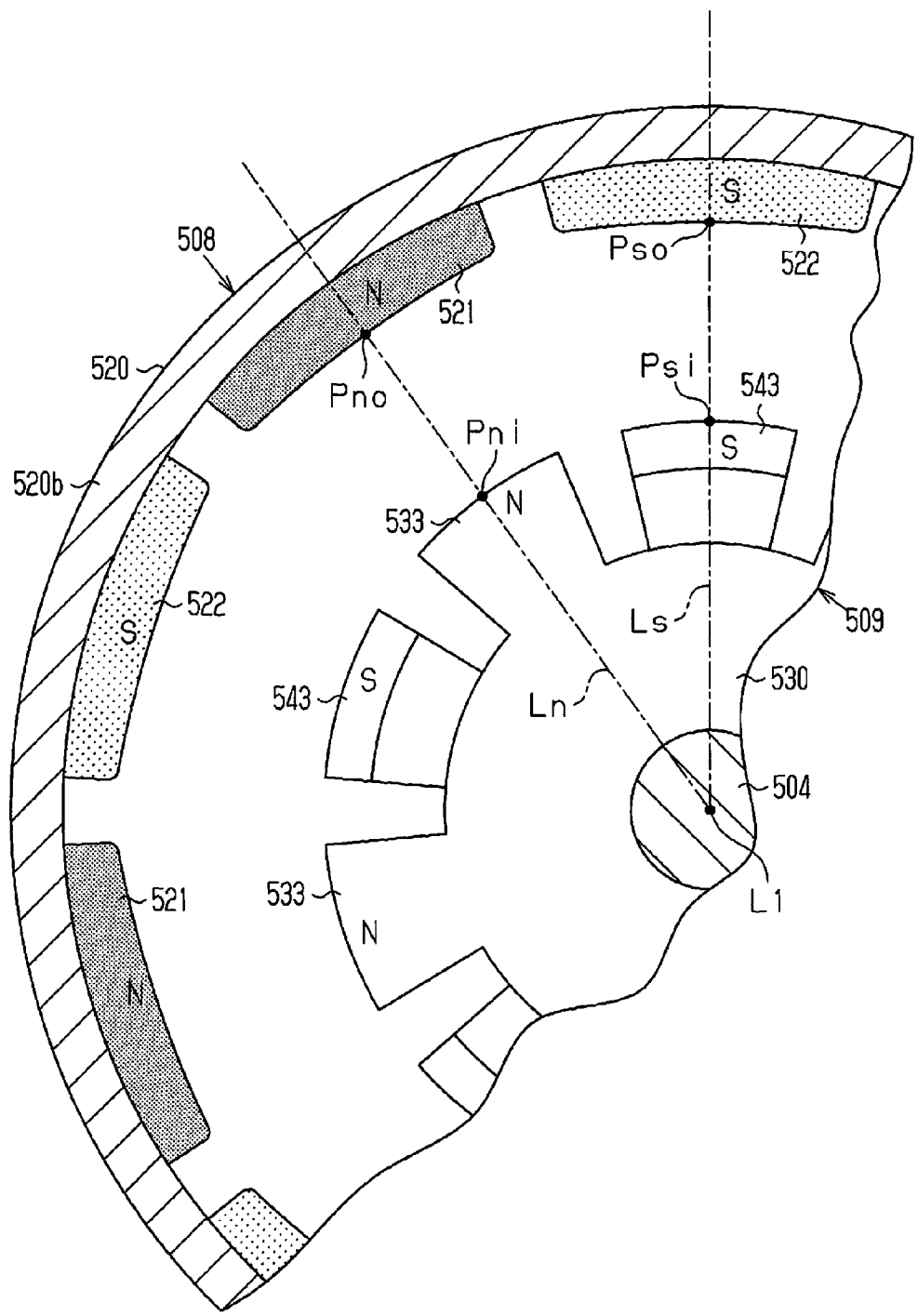
FIG. 44 is a partially enlarged cross-sectional view showing an outer rotor and the inner rotor of FIG. 41.

More specifically, as shown in FIG. 44, the outer rotor 508 and the inner rotor 509 are relatively arranged in the circumferential direction so that center positions Pno of the primary permanent magnets 521 in the circumferential direction and center positions Pni of the primary projecting pieces 533 in the circumferential direction are positioned on radial lines Ln extending from the center axis L1 of the rotary shaft 504 in a radial direction. In the same manner, as shown in FIG. 44, the outer rotor 508 and the inner rotor 509 are relatively arranged in the circumferential direction so that center positions Pso of the secondary permanent magnets 522 in the circumferential direction and center positions Psi of the secondary projecting pieces 543 in the circumferential direction are positioned on radial lines Ls extending from the center axis L1 of the rotary shaft 504 in a radial direction.

Next, the operation of a motor M described above will be described.

Now, when a three-phase alternating current is applied to the coils 515 that are wound on the stator 507 in a troidal manner, rotating magnetic fields are generated respectively in the outer teeth 511a and the inner teeth 511b of the teeth portions 511.

Further, the outer rotor 508 of the SPM structure is rotated by the rotating magnetic field by the outer teeth 511a. Further, the inner rotor 509 of the Randell type structure is rotated by the rotating magnetic field by the inner teeth 511b.

Further, since the Randell type structure can easily be subjected to multipolarization, the inner rotor 509 can easily be changed to inner rotors 509 of various numbers of magnetic poles.

Next, advantages of the ninth embodiment described above will be described below.

(17) According to the ninth embodiment, by having configured the inner rotor 509 with the Randell type structure, the disk magnet 550 is the only permanent magnet required for the inner rotor 509; thus, manufacturing cost can be reduced.

Further, since the Randell type structure can easily be subjected to multipolarization, the inner rotor 509 can easily be adapted to inner rotors of various numbers of magnetic poles.

(18) According to the ninth embodiment, the primary projecting pieces 533 function as the N poles and the secondary projecting pieces 543 function as the S poles by one disk magnet 550, whereby the inner rotor 509 is rotated. Thus, a high power motor can be realized by the above in addition to the outer rotor 508.

(19) According to the ninth embodiment, the disk magnet 550 is sandwiched in the axial direction by the first core base 531 and the second core base 541 respectively fixed to the rotary shaft 504. That is, since the disk magnet 550 is positioned close to a rotation center, centrifugal force applied to the disk magnet 550 is small, and the disk magnet 550 is prevented from flying off to the outer side by the centrifugal force.

Tenth Embodiment

A tenth embodiment according to the present invention will now be described with reference to FIG. 48 to FIG. 50.

Figure 48:
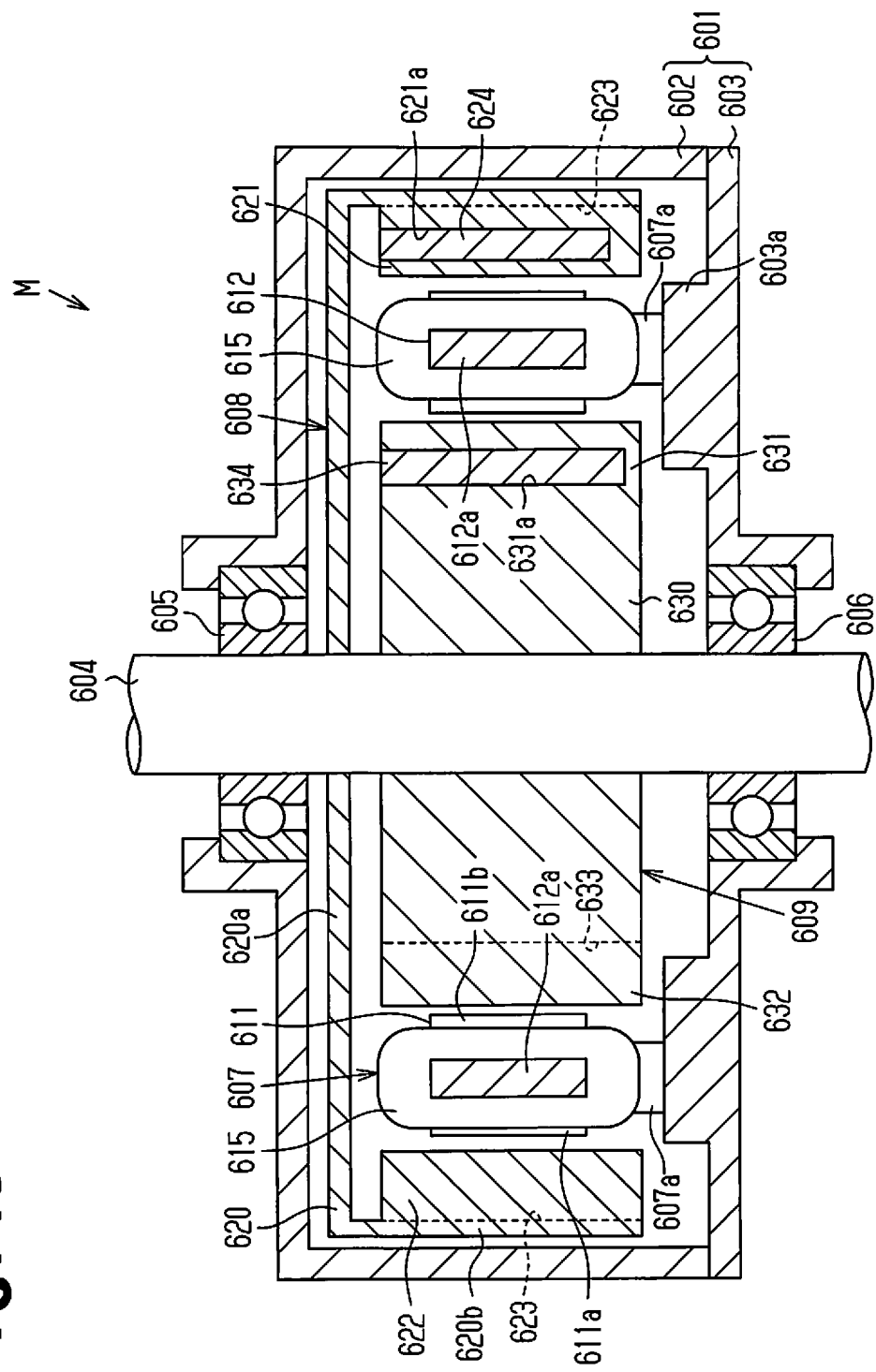
FIG. 48 is an axial direction cross-sectional view of a brushless motor of a tenth embodiment.

As shown in FIG. 48, a motor casing 601 of a brushless motor (hereinbelow simply referred to as a motor) M includes a cylindrical motor housing 602 with a cover, and the cover 603 that closes an opening of the motor housing 602. The motor casing 601 rotatably supports a rotary shaft 604 that penetrates a space formed by the motor housing 602 and the cover 603 in an up and down direction in FIG. 48 (center axial direction of the motor housing 602) by a bearing 605 provided in the motor housing 602 and a bearing 606 provided in the cover 603. Further, inside the motor casing 601, a stator 607 supported and fixed to the cover 603, and an outer rotor 608 and an inner rotor 609 fixed to the rotary shaft 604 are provided.

Figure 49:
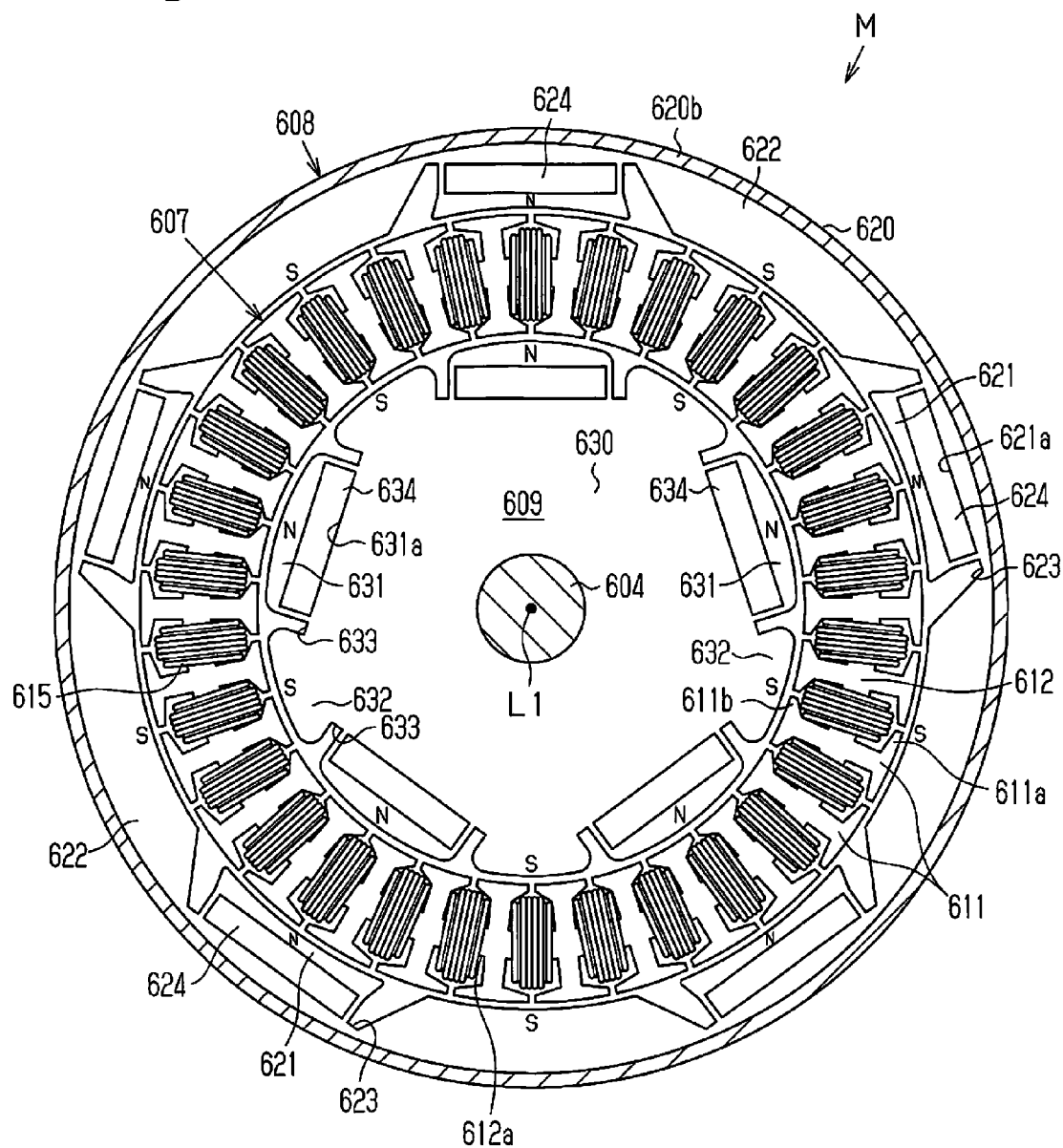
FIG. 49 is a radial direction cross-sectional view of a stator and a rotor of FIG. 48.

As shown in FIG. 48 and FIG. 49, the stator 607 of the tenth embodiment has a similar configuration as the stator 507 of the ninth embodiment as shown in FIG. 41, FIG. 42, FIG. 45, and FIG. 46. Accordingly, detailed explanation of the stator 607 will be omitted.

The outer rotor 508 includes a cylindrical outer rotor core 620 with a cover. The rotary shaft 604 penetrates at a center position of the cover portion 620a of the outer rotor core 620, and the cover portion 620a is fixed to the rotary shaft 604. A cylindrical wall 620b of the outer rotor core 620 is arranged between the motor housing 602 and the stator 607. That is, an inner circumferential surface of the cylindrical wall 620b of the outer rotor core 620 opposes outer teeth 611a in a radial direction.

Five outer magnet magnetic pole portions 621 and five outer iron core portions 622 are formed by the cylindrical wall 620b being divided by outer grooves 623 extending in an axial direction. The five outer magnet magnetic pole portions 621 and the five outer iron core portions 622 align alternately along a circumferential direction and extend respectively in the axial direction. Further, the outer grooves 623 are respectively formed at both ends of the outer iron core portions 622 along the circumferential direction. Thus, the outer iron core portions 622 are formed in a tapered shape so that an interval (length) between both end surfaces of each outer iron core portion 622 becomes shorter toward an inner side in a radial direction. Further, as shown in FIG. 50, an interval (length) Bo of each of the outer magnet magnetic pole portions 621 in the circumferential direction is set to be shorter than an interval (length) Ao (>Bo) of each of the outer iron core portions 622.

An embedding hole 621a with a rectangular cross-section extending along the axial direction is formed in each of the outer magnet magnetic pole portions 621 by the cylindrical wall 620b, and an outer permanent magnet 624 is embedded in the embedding hole 621a.

Each of the outer permanent magnets 624 embedded in the outer magnet magnetic pole portions 621 is magnetized so that a portion on an inner side (magnetic pole of the magnet) becomes an N pole and a portion on an outer side becomes an S pole in the radial direction. Accordingly, the outer iron core portions 622 formed between the respective outer permanent magnets 624 function as the magnetic poles of the S pole. As a result, in an inner circumferential surface of the cylindrical wall 620b of the outer rotor 608, the N poles and the S poles are arranged alternately in the circumferential direction, and the number of pole pairs is set to five. That is, the outer rotor 608 becomes a consequent pole type rotor with ten magnetic poles.

Further, by having embedded the outer permanent magnet 624 in each of the outer magnet magnetic pole portions 621, the outer rotor 608 becomes an IPM type rotor.

The inner rotor 609 includes a cylindrical columnar shaped inner rotor core 630. The rotary shaft 604 penetrates a center position of the inner rotor core 630, and the inner rotor core 630 is fixed to the rotary shaft 604. The round columnar shaped inner rotor core 630 is positioned on the inner side in the radial direction of the stator 607, and an outer circumferential surface of the inner rotor core 630 opposes respective inner teeth 611b in the radial direction.

Five inner magnet magnetic pole portions 631 and five inner iron core portions 632 are formed by the outer circumferential surface of the inner rotor core 630 being divided along the circumferential direction by inner grooves 633 extending in the axial direction. The five inner magnet magnetic pole portions 631 and the five inner iron core portions 632 align alternately along the circumferential direction and extend respectively in the axial direction.

Further, the inner grooves 633 are respectively formed at both ends of the inner iron core portions 632 along the circumferential direction. Thus, the inner iron core portions 632 are formed in a tapered shape so that an interval (length) between both end surfaces of each inner iron core portions 632 becomes shorter toward an inner side in a radial direction.

Figure 50:
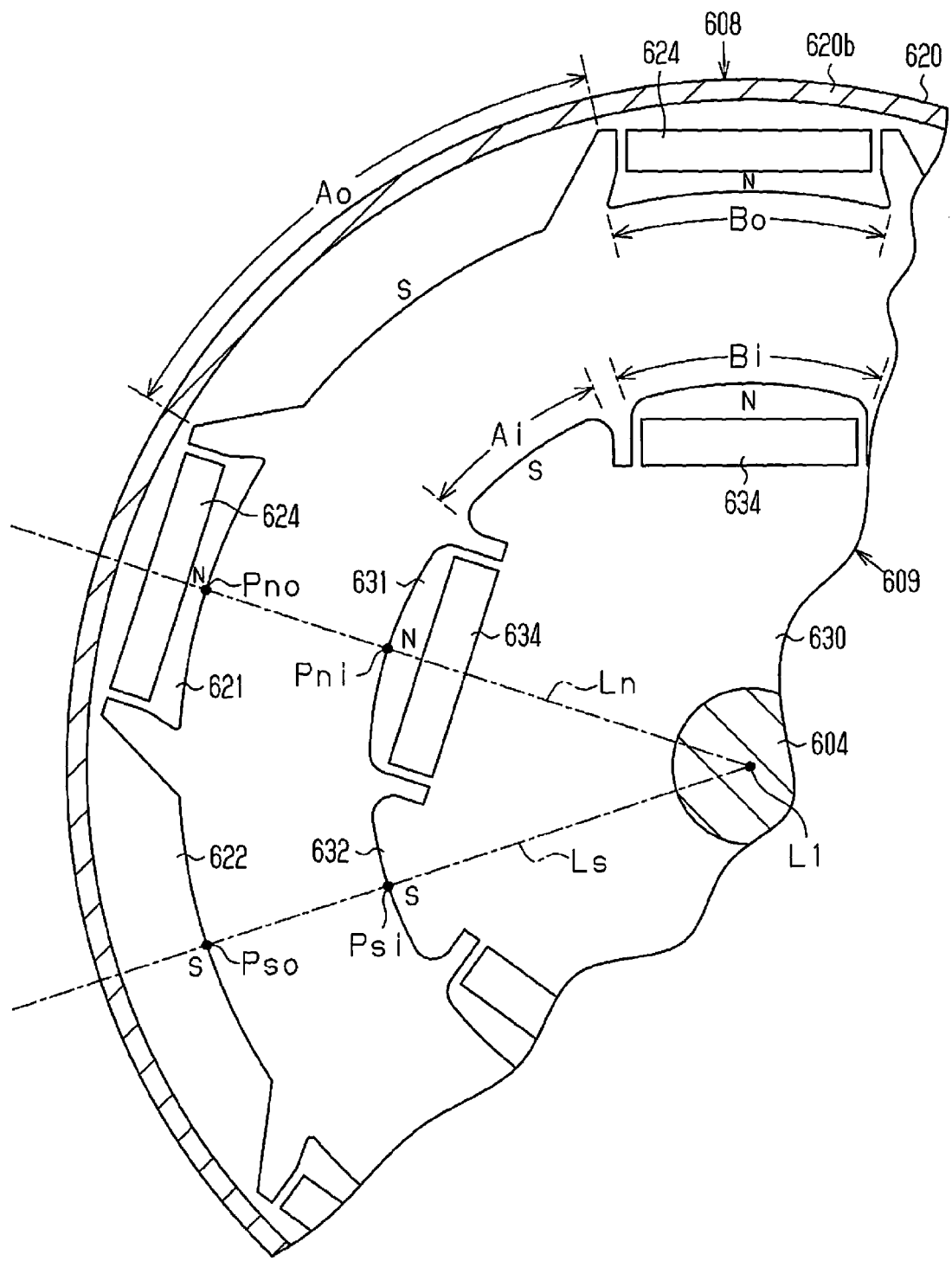
FIG. 50 is a partially enlarged cross-sectional view showing an outer rotor and an inner rotor of FIG. 49.

Further, as shown in FIG. 50, an interval (length) Bi of each of the inner magnet magnetic pole portions 631 in the circumferential direction is set to be longer than an interval (length) Ai (<Bi) of each of the inner iron core portions 632. That is, in the present embodiment settings are made to realize Ao/Bo>Ai/Bi.

An embedding hole 631a with a rectangular cross-section extending along the axial direction is formed in each of the inner magnet magnetic pole portions 631, and an inner permanent magnet 634 is embedded in the embedding hole 631a.

Each of the inner permanent magnets 634 embedded in the inner magnet magnetic pole portions 631 is magnetized so that a portion on the outer side (magnetic pole of the magnet) becomes the N pole and a portion on the inner side becomes the S pole in the radial direction. Accordingly, the inner iron core portions 632 formed between the respective inner permanent magnets 634 function as the magnetic poles of the S pole. As a result, in an outer circumferential surface of the inner rotor 609, the N poles and the S poles are arranged alternately in the circumferential direction, and the number of pole pairs is set to five. That is, the inner rotor 609 becomes a consequent pole type rotor with ten magnetic poles.

Further, by having embedded the inner permanent magnet 634 in each of the inner magnet magnetic pole portions 631, the inner rotor 609 becomes an IPM type rotor.

Further, as shown in FIG. 50, the outer rotor 620 and the inner rotor 630 are relatively arranged in the circumferential direction so that center positions Pno of the outer magnet magnetic pole portions 621 (outer permanent magnets 624) in the circumferential direction and center positions Pni of the inner magnet magnetic pole portions 631 (inner permanent magnets 634) in the circumferential direction are positioned on radial lines Ln extending from a center axis L1 of the rotary shaft 604. Accordingly, as shown in FIG. 50, center positions Pso of the outer iron core portions 622 in the circumferential direction and center positions Psi of the inner iron core portions 632 in the circumferential direction also are positioned on radial lines Ls extending from the center axis L1 of the rotary shaft 604.

Thus, the magnetic pole of the outer magnet magnetic pole portions 621 (outer permanent magnets 624) and the magnetic pole of the inner magnet magnetic pole portions 631 (inner permanent magnets 634) opposing in the radial direction become of the same polarity. In the same manner, the magnetic pole of the outer iron core portions 622 and the magnetic pole of the inner iron core portions 632 opposing in the radial direction become of the same polarity.

Further, as shown in FIG. 48, teeth portions 611 of the stator 607 has a length in the axial direction that is shorter than the lengths of the outer permanent magnets 624 of the outer rotor 608, and the inner permanent magnets 634 and the inner iron core portions 632 of the inner rotor 609 in the axial direction.

Next, the operation of a motor M described above will be described.

Now, when a three-phase alternating current is applied to coils 615 that are wound on the stator 607 in a troidal manner, rotating magnetic fields are generated respectively in the outer teeth 611a and the inner teeth 611b of the teeth portions 611.

The outer rotor 608 is rotated by the rotating magnetic field by the outer teeth 611a of the respective teeth portions 611. Further, the inner rotor 609 is rotated by the rotating magnetic field by the inner teeth 611b of the respective teeth portions 611. Accordingly, the motor M is rotated with high power due to the outer rotor 608 and the inner rotor 609 being rotated and driven, and also with reluctance torque being added due to the outer rotor 608 and the inner rotor 609 being of the consequent pole type.

Next, advantages of the tenth embodiment will be described below.

(20) According to the tenth embodiment, by having configured the outer rotor 608 and the inner rotor 609 with the consequent pole type structure, numbers of the outer permanent magnets 624 and the inner permanent magnets 634 can be halved, whereby a manufacturing cost reduction can be achieved.

(21) According to the tenth embodiment, since the outer rotor 608 and the inner rotor 609 are formed by the consequent pole type structure, the reluctance torque is added respectively in the outer rotor 608 and the inner rotor 609, whereby the output power increase in the motor M can be realized.

(22) According to the tenth embodiment, the respective outer permanent magnets 624 of the outer rotor 608 and the respective inner permanent magnets 634 of the inner rotor 609 are arranged to oppose in the radial direction. Further, the outer permanent magnets 624 and the inner permanent magnets 634 are magnetized so that the vicinities of opposing surfaces of the outer permanent magnets 624 and the inner permanent magnets 634 become N poles of the same polarity. Accordingly, a flow of magnetic flux to the respective outer iron core portions 622 of the outer rotor 608 and a flow of magnetic flux to the respective inner iron core portions 632 of the inner rotor 609 become smooth, and a favorable magnetic balance of the magnet magnetic pole portions and the iron core portions can be achieved.

(23) According to the tenth embodiment, the outer rotor core 620 is formed so that the interval Bo of the respective outer magnet magnetic pole portions 621 in the circumferential direction becomes shorter than the interval Ao of the respective outer iron core portions 622 in the circumferential direction. Further, the outer iron core portions 622 are formed in the tapered shape so that the interval between both end surfaces of each outer iron core portion 622 becomes shorter toward the inner side in the radial direction.

Accordingly, even more favorable magnetic balance can be achieved for the outer magnet magnetic pole portions 621 and the outer iron core portions 622.

(24) According to the tenth embodiment, the inner rotor core 630 is formed so that the interval Bi of the respective inner magnet magnetic pole portions 631 in the circumferential direction becomes longer than the interval Ai of the respective inner iron core portions 632 in the circumferential direction. Further, the inner iron core portions 632 are formed in the tapered shape so that the interval between both end surfaces of each inner iron core portion 632 becomes shorter toward the inner side in the radial direction.

Accordingly, even more favorable magnetic balance can be achieved for the inner magnet magnetic pole portions 631 and the inner iron core portions 632.

Eleventh Embodiment

Next, an eleventh embodiment of the present invention will now be described with reference to FIG. 51 and FIG. 52. The present embodiment differs from the tenth embodiment in relative positions of an outer rotor 608 and an inner rotor 609 in a circumferential direction, and a magnetized direction of inner permanent magnets 634. Accordingly, detailed description will be omitted for portions in common with the tenth embodiment for the sake of convenience of explanation, and portions that differ will now be described in detail.

Figure 51:
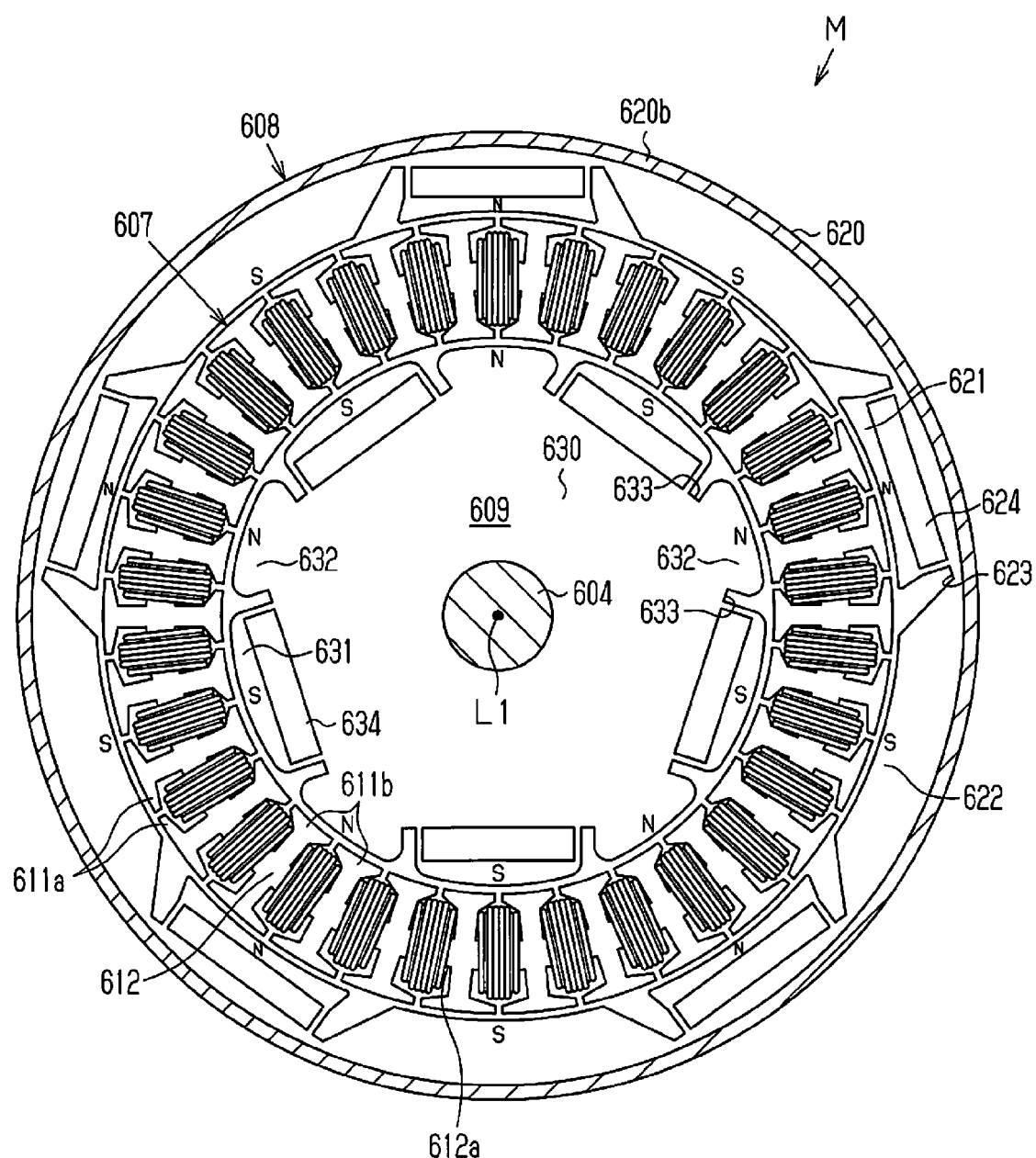
FIG. 51 is a radial direction cross-sectional view of a stator and a rotor in a brushless motor of an eleventh embodiment.

As shown in FIG. 51, each of outer permanent magnets 624 embedded in outer magnet magnetic pole portions 621 formed in an outer rotor core 620 is magnetized so that a portion on an inner side (magnetic pole magnet) is an N pole, and a portion on an outer side is an S pole in a radial direction in the same manner as the tenth embodiment. In this regard, each of inner permanent magnets 634 embedded in inner magnet magnetic pole portions 631 formed in an inner rotor core 630 is magnetized so that a portion on the outer side (magnetic pole magnet) is the S pole, and a portion on the inner side is the N pole in the radial direction.

Accordingly, the inner iron core portions 632 formed between the respective inner permanent magnets 634 of the eleventh embodiment function as magnetic poles of the N pole.

Figure 52:
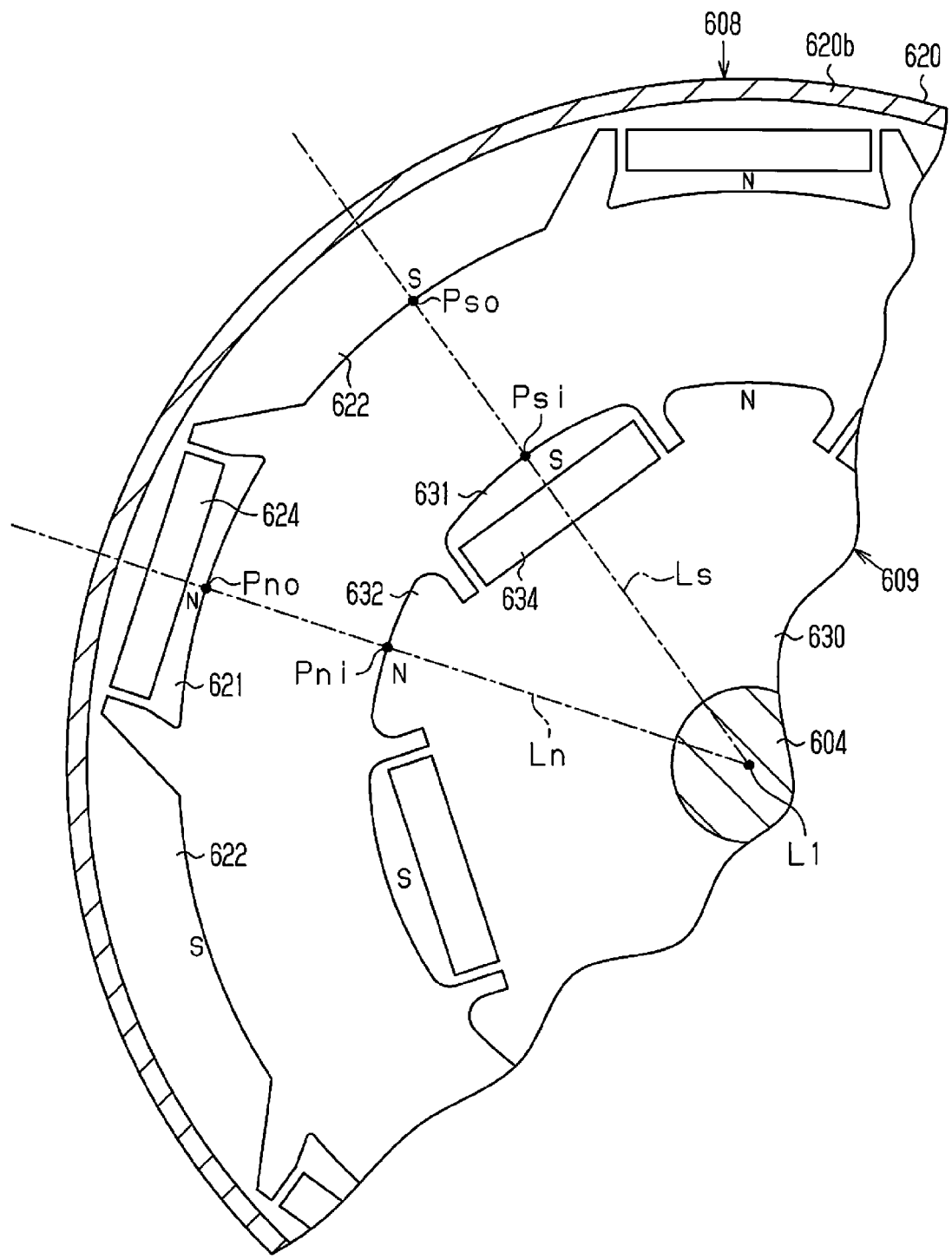
FIG. 52 is a partially enlarged cross-sectional view showing an outer rotor and an inner rotor of FIG. 51.

Further, as shown in FIG. 52, in the eleventh embodiment, the outer rotor core 620 and the inner rotor core 630 are relatively arranged in the circumferential direction so that center positions Pno of the outer magnet magnetic pole portions 621 (outer permanent magnets 624) in the circumferential direction and the center positions Pni of the inner iron core portions 632 are positioned on radial lines Ln extending from a center axis L1 of the rotary shaft 604 in a radial direction. Accordingly, as shown in FIG. 52, center positions Pso of the outer iron core portions 622 in the circumferential direction and center positions Psi of the inner magnet magnetic pole portions 631 (inner permanent magnets 634) in the circumferential direction are positioned on radial lines Ls extending from the center axis L1 of the rotary shaft 604 in the radial direction.

Thus, the magnetic poles of the outer magnet magnetic pole portions 621 (outer permanent magnets 624) and the magnetic poles of the inner iron core portions 632 opposed in the radial direction become of the same polarity. In the same manner, the magnetic poles of the outer iron core portions 622 and the magnetic poles of the inner magnet magnetic pole portions 631 (inner permanent magnets 634) opposed in the radial direction become of the same polarity.

Similar to the tenth embodiment, in the eleventh embodiment, when a three-phase alternating current is applied to the coils 615 that are wound on the stator 607 in a troidal manner, rotating magnetic fields are generated respectively in outer teeth 611a and inner teeth 611b of teeth portions 611. Further, the outer rotor 608 is rotated by the rotating magnetic field by the outer teeth 611a of the respective teeth portions 611. Further, the inner rotor 609 is rotated by the rotating magnetic field by the inner teeth 611b of the respective teeth portions 611. Accordingly, the motor M is rotated with high power due to the outer rotor 608 and the inner rotor 609 being rotated and driven, and also with reluctance torque being added due to the outer rotor 608 and the inner rotor 609 being of the consequent pole type.

As described above, the eleventh embodiment has advantages as described below in addition to the advantages (20), (21), (23), and (24) of the tenth embodiment.

(25) According to the eleventh embodiment, the respective outer magnet magnetic pole portions 621 of the outer rotor 608 and the respective inner iron core portions 632 of the inner rotor 609 are arranged to oppose in the radial direction. Further, the respective outer iron core portions 622 of the outer rotor 608 and the respective inner magnet magnetic pole portions 631 of the inner rotor 609 are arranged to oppose in the radial direction. Moreover, the outer permanent magnets 624 are magnetized so that the vicinities of opposing surfaces of the outer magnet magnetic pole portions 621 and the inner iron core portions 632 become N poles of the same polarity as one another, and the inner iron core portions 632 are caused to function as magnetic poles. Further, the outer iron core portions 622 are caused to function as magnetic poles, and the inner magnet magnetic pole portions 631 are magnetized so that the vicinities of opposing surfaces of the outer iron core portions 622 and the inner magnet magnetic pole portions 631 become S poles of the same polarity as one another.

Accordingly, a flow of magnetic flux to the respective outer iron core portions 622 of the outer rotor 608 and a flow of magnetic flux to the respective inner iron core portions 632 of the inner rotor 609 become smooth, and a favorable magnetic balance of the magnet magnetic pole portions and the iron core portions can be achieved.

Further, according to the eleventh embodiment, since the respective outer permanent magnets 624 of the outer rotor 608 and the respective inner permanent magnets 634 of the inner rotor 609 are arranged alternately in the circumferential direction as viewed from an axial direction, a motor M with a good weight balance in the circumferential direction can be provided.

Twelfth Embodiment

Next, a twelfth embodiment of the present invention will now be described with reference to FIG. 53 and FIG. 54. The twelfth embodiment differ from the tenth embodiment in relative positions of an outer rotor 608 and an inner rotor 609 in a circumferential direction, and a magnetized direction of outer permanent magnets 624. Accordingly, detailed description will be omitted for portions in common with the tenth embodiment for the sake of convenience of explanation, and portions that differ will now be described in detail.

Figure 53:
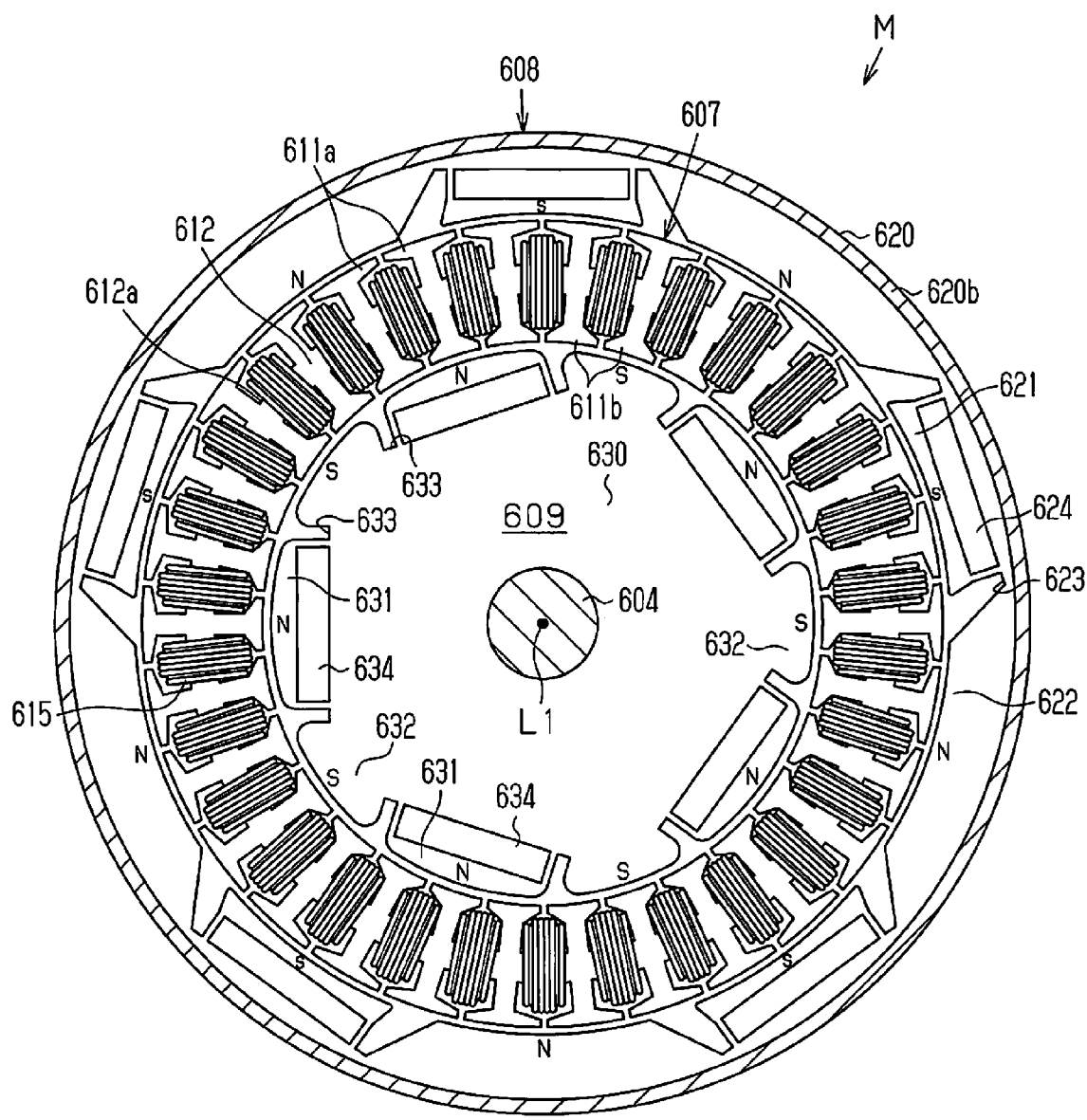
FIG. 53 is a radial direction cross-sectional view of a stator and a rotor in a brushless motor of a twelfth embodiment.

As shown in FIG. 53, each of inner permanent magnets 634 embedded in inner magnet magnetic pole portions 631 formed in an inner rotor core 630 is magnetized so that a portion on an outer side (magnetic pole magnet) is an N pole, and a portion on an inner side is an S pole in a radial direction in the same manner as the tenth embodiment. In this regard, each of outer permanent magnets 624 embedded in outer magnet magnetic pole portions 621 formed in an outer rotor core 620 is magnetized so that a portion on the inner side (magnetic pole magnet) is the S pole, and a portion on the outer side is the N pole in the radial direction.

Accordingly, the outer iron core portions 622 formed between the respective outer permanent magnets 624 of the twelfth embodiment function as magnetic poles of the N pole.

Figure 54:
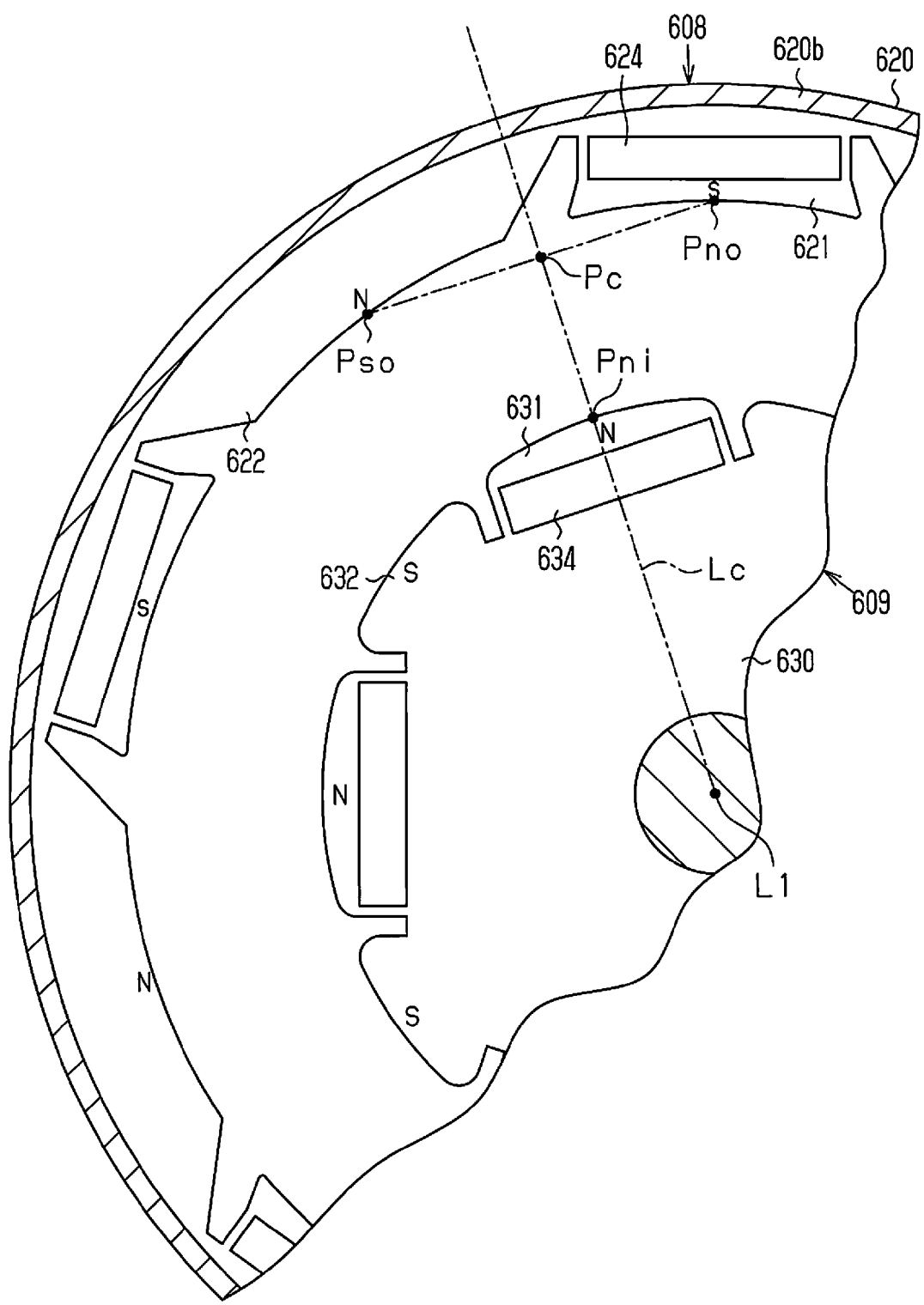
FIG. 54 is a partially enlarged cross-sectional view showing an outer rotor and an inner rotor of FIG. 53.

Further, as shown in FIG. 54, in the twelfth embodiment, the outer rotor core 620 and the inner rotor core 630 are relatively arranged so that center positions Pni of the inner magnet magnetic pole portions 631 (inner permanent magnets 634) in the circumferential direction are arranged at intermediate positions Pc in a radial direction between center positions Pno of the outer magnet magnetic pole portions 621 (outer permanent magnets 624) in the circumferential direction and center positions Pso of the outer iron core portions 622 in the circumferential direction. That is, as shown in FIG. 54, the outer rotor core 620 and the inner rotor core 630 are relatively arranged in the circumferential direction so that center positions Pni of the inner magnet magnetic pole portions 631 (inner permanent magnets 634) in the circumferential direction and the intermediate positions Pc are positioned on radial lines Lc extending from a center axis L1 of a rotary shaft 604 in the radial direction.

Similar to the tenth embodiment, in the twelfth embodiment, when a three-phase alternating current is applied to coils 615 that are wound on a stator 607 in a troidal manner, rotating magnetic fields are generated respectively in outer teeth 611a and inner teeth 611b of teeth portions 611. Further, the outer rotor 608 is rotated by the rotating magnetic field by the outer teeth 611a of the respective teeth portions 611. Further, the inner rotor 609 is rotated by the rotating magnetic field by the inner teeth 611b of the respective teeth portions 611. Accordingly, the motor M is rotated with high power due to the outer rotor 608 and the inner rotor 609 being rotated and driven, and also with reluctance torque being added due to the outer rotor 608 and the inner rotor 609 being of the consequent pole type.

As described above in detail, the twelfth embodiment has advantages described below in addition to the advantages (20), (21), (23), and (24) of the tenth embodiment.

(26) According to the twelfth embodiment, the outer rotor core 620 and the inner rotor core 630 are relatively arranged so that the center positions Pni of the inner magnet magnetic pole portions 631 in the circumferential direction are arranged at the intermediate positions Pc in the radial direction between the center positions Pno of the outer magnet magnetic pole portions 621 in the circumferential direction and the center positions Pso of the outer iron core portions 622 in the circumferential direction.

Accordingly, since the magnetic poles of the outer permanent magnets 624 and the magnetic poles of the inner permanent magnets 634 are displaced, cogging torque may be small.

Thirteenth Embodiment

A thirteenth embodiment according to the present invention will now be described with reference to the drawings.

Figure 55:
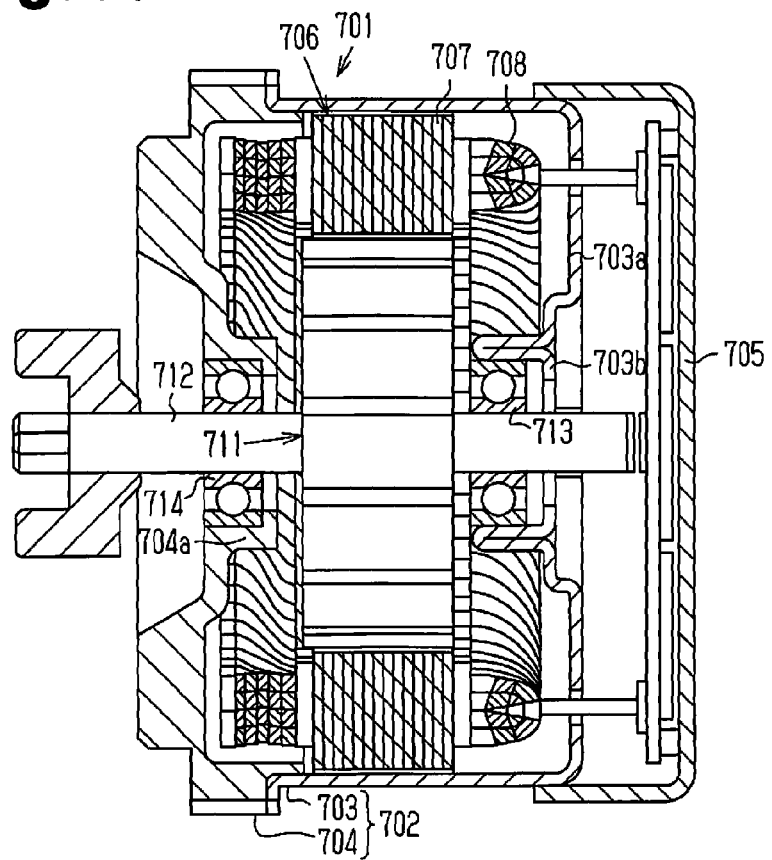
FIG. 55 is a cross-sectional view of a brushless motor of a thirteenth embodiment.
Figure 56:
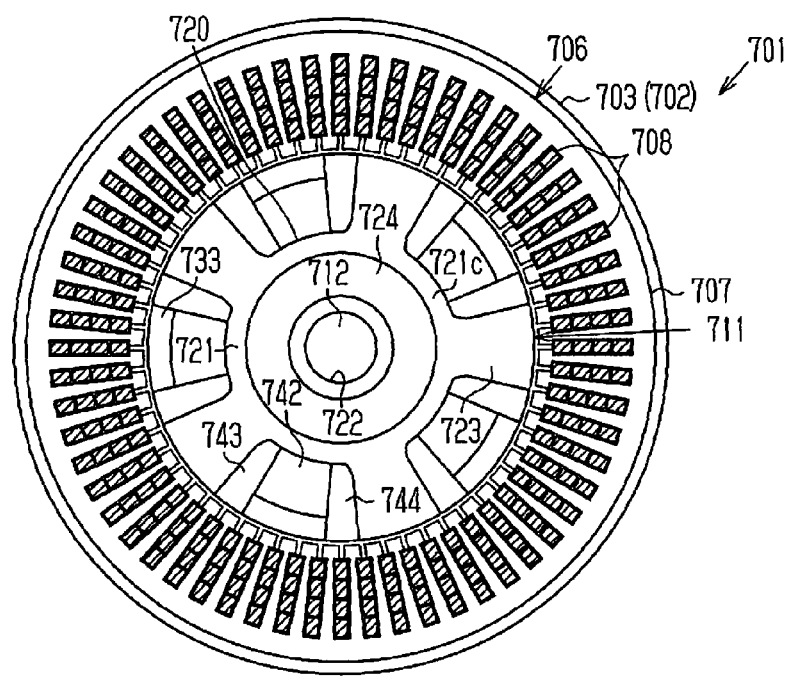
FIG. 56 is a plan view of the brushless motor of FIG. 55.

As shown in FIG. 55 and FIG. 56, a motor casing 702 of a brushless motor 701 includes a cylindrical housing 703 formed in a bottomed cylinder shape, and a front end plate 704 that closes an opening of the cylindrical housing 703 at a front side (left side in FIG. 55). Further, a circuit housing box 705 that houses power circuits such as a circuit board and the like is attached to an end portion of the cylindrical housing 703 on a rear side (right side in FIG. 55). A stator 706 is fixed to an inner circumferential surface of the cylindrical housing 703. The stator 706 includes an armature core 707 including a plurality of teeth extending to an inner side in a radial direction, and segment conductor (SC) coils 708 wound on the teeth of the armature core 707. A rotor 711 of the motor 701 includes a rotary shaft 712, and is arranged on an inner side of the stator 706. The rotary shaft 712 is a nonconductive metal shaft, and is rotatably supported by a bearing 713 housed in a bearing housing portion 703b formed on a bottom portion 703a of the cylindrical housing 703 and a bearing 714 housed in a bearing housing portion 704a formed on the front end plate 704. The respective bearing housing portions 703b, 704a are projected toward an inner side in an axial direction, and an outer diameter of the respective bearing housing portions 703b, 704a is formed substantially identical as one another.

Figure 57:
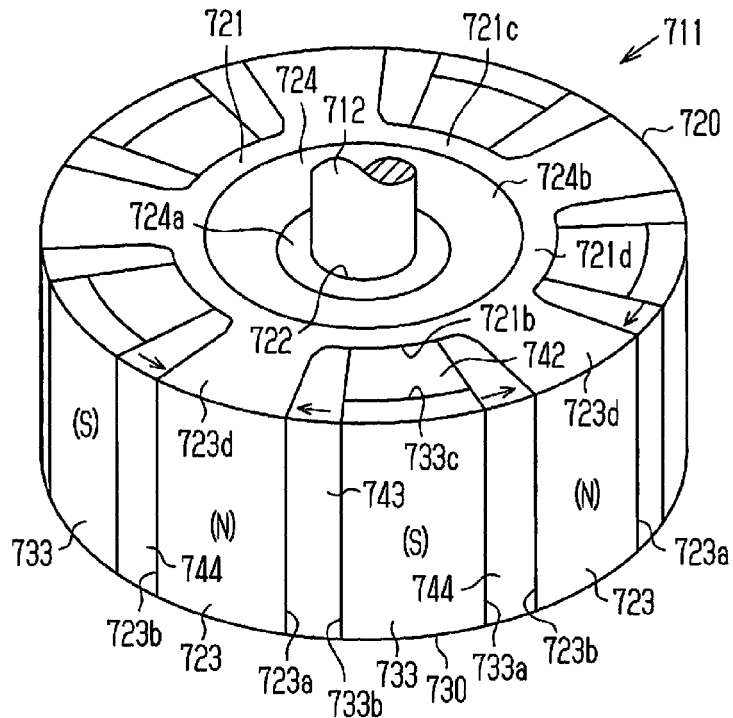
FIG. 57 is a perspective view of the rotor of FIG. 56.
Figure 58:
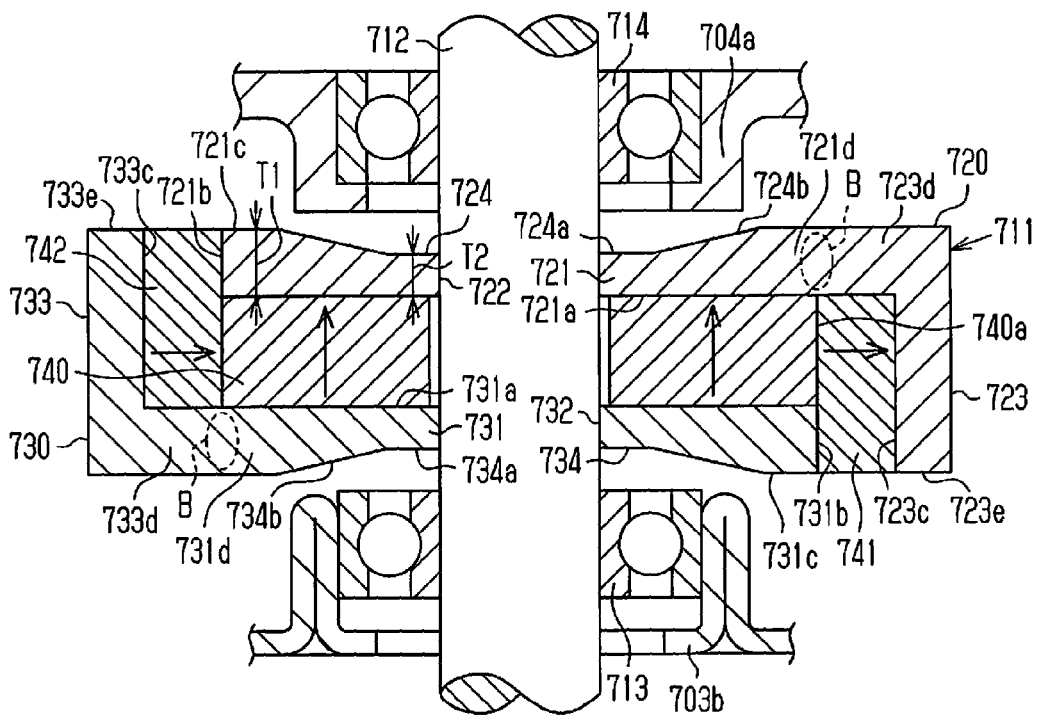
FIG. 58 is a cross-sectional view of a rotor and a bearing portion of FIG. 57.

As shown in FIG. 57 and FIG. 58, the rotor 711 includes the rotary shaft 712, first and second rotor cores 720, 730, a ring magnet 740 as a field magnet member (see FIG. 58), primary and secondary rear side auxiliary magnets 741, 742, and primary and secondary interpolar magnets 743, 744. Arrows shown in solid lines in FIG. 57 and FIG. 58 indicate magnetized directions of the ring magnet 740, the respective rear side auxiliary magnets 741, 742, and the respective interpolar magnets 743, 744 (S pole to N pole).

The first rotor core 720 includes a substantially disk-shaped first core base 721. An insertion hole 722 for inserting the rotary shaft 712 is penetratingly formed in an axial direction at a center portion of the first core base 721. The rotary shaft 712 is press fitted and fixed in the insertion hole 722. Thus, the first rotor core 720 and the rotary shaft 712 are enabled to rotate integrally.

A plurality (five in the present embodiment) of primary cog-shaped magnetic poles 723 is arranged at equal intervals on an outer circumferential portion of the first core base 721. Each of the primary cog-shaped magnetic poles 723 is projected to an outer side in the radial direction, and is extended in the axial direction to have a distal portion 723e as an end portion in the axial direction. End surfaces 723a, 723b of the primary cog-shaped magnetic pole 723 in the circumferential direction are flat surfaces extending in the radial direction (not being inclined with respect to the radial direction when seen in the axial direction), and the primary cog-shaped magnetic pole 723 has a cross-section in a direction vertically intersecting an axis in a sector shape. An angle of each of the primary cog-shaped magnetic poles 723, that is, an angle between the end surfaces 723a, 723b in the circumferential direction is set to be smaller than an angle of an interval between the primary cog-shaped magnetic poles 723 that are adjacent in the circumferential direction.

The second rotor core 730 is identical in shape as the first rotor core 720, and an insertion hole 732 for inserting the rotary shaft 712 is penetratingly formed at a center portion of a substantially disk-shaped second core base 731. The rotary shaft 712 is press fitted and fixed in the insertion hole 732. Thus, the second rotor core 730 and the rotary shaft 712 are enabled to rotate integrally.

Further, a plurality of secondary cog-shaped magnetic poles 733 is arranged at equal intervals on an outer circumferential portion of the second core base 731. Each of the secondary cog-shaped magnetic poles 733 is projected to the outer side in the radial direction, and is extended in the axial direction to have a distal portion 733e as an end portion in the axial direction. End surfaces 733a, 733b of the secondary cog-shaped magnetic pole 733 in the circumferential direction are flat surfaces extending in the radial direction, and the secondary cog-shaped magnetic pole 733 has a cross-section in the direction vertically intersecting the axis in a sector shape. An angle of each of the secondary cog-shaped magnetic poles 733, that is, an angle between the end surfaces 733a, 733b in the circumferential direction is set to be smaller than an angle of an interval between the secondary cog-shaped magnetic poles 733 that are adjacent in the circumferential direction.

Further, the second rotor core 730 is coupled to the first rotor core 720 so that the respective secondary cog-shaped magnetic poles 733 are arranged between the corresponding primary cog-shaped magnetic poles 723. More specifically, one end surfaces 723a of the primary cog-shaped magnetic poles 723 in the circumferential direction and the other end surfaces 733b of the secondary cog-shaped magnetic poles 733 in the circumferential direction are formed to be parallel along the axial direction, and due to this, an interval between the respective end surfaces 723a, 733b forms a substantially linear shape in the axial direction. Further, in the same manner, the other end surfaces 723b of the primary cog-shaped magnetic poles 723 in the circumferential direction and one end surfaces 733a of the secondary cog-shaped magnetic poles 733 in the circumferential direction are formed to be parallel in the axial direction, whereby an interval between the respective end surfaces 723b, 733a forms a substantially linear shape in the axial direction.

As shown in FIG. 58, a ring magnet 740 is arranged (sandwiched) between the first core base 721 and the second core base 731 in the axial direction. The ring magnet 740 forms a ring shape, and the rotary shaft 712 penetrates a central portion thereof. The ring magnet 740 is respectively tightly contacted with an end surface 721a of the first core base 721 on an inner side in the axial direction and an end surface 731a of the second core base 731 on the inner side in the axial direction. The end surfaces 721a, 731a of the respective core bases 721, 731 on the inner side in the axial direction and both end surface of the ring magnet 740 in the axial direction form a flat surface shape that is vertical to an axis of the rotary shaft 712.

An outer diameter of the ring magnet 740 is set identical to an outer diameter of the first and second core bases 721, 731. The ring magnet 740 is magnetized in the axial direction to cause the primary cog-shaped magnetic poles 723 to function as primary magnetic poles (N poles in the present embodiment), and cause the secondary cog-shaped magnetic poles 733 to function as secondary magnetic poles (S poles in the present embodiment). Accordingly, the rotor 711 of the thirteenth embodiment is a rotor of a so-called Randell type structure using the ring magnet 740 as a field magnet. In the rotor 711, the primary cog-shaped magnetic poles 723 to be the N poles and the secondary cog-shaped magnetic poles 733 to be the S poles are arranged alternately in the circumferential direction, and the number of magnetic poles is ten poles (the number of pole pairs being five). Here, by the number of pole pairs is an odd number that is three or more, since the cog-shaped magnetic poles of the same pole do not become arranged to oppose in the circumferential direction at 180° when seen in rotor core units, so a shape that becomes stable against magnetic vibration can be formed.

A primary rear side auxiliary magnet 741 is arranged between the back surface 723c (surface on the inner side in the radial direction) of each of the primary cog-shaped magnetic poles 723 and the outer circumferential surface 731b of the second core base 731. The primary rear side auxiliary magnets 741 have a cross-section in a direction vertically intersecting an axis in a sector shape, and are magnetized so that the vicinity of their surfaces contacting the back surfaces 723c of the primary cog-shaped magnetic poles 723 become N poles which is of the same pole as the primary cog-shaped magnetic poles 723, and their surfaces contacting the outer circumferential surface 731b of the second core base 731 become S poles which is of the same pole as the second core base 731.

Further, in the same manner as the primary cog-shaped magnetic poles 723, a secondary rear side auxiliary magnet 742 is arranged at a back surface 733c of each of the secondary cog-shaped magnetic poles 733. As the primary rear side auxiliary magnets 741 and the secondary rear side auxiliary magnets 742, ferrite magnets may be used for example. The secondary rear side auxiliary magnets 742 have a cross-section in the direction vertically intersecting the axis in a sector shape, and are magnetized so that the vicinity of their surfaces contacting the back surfaces 733c become S poles, and their surfaces contacting the outer circumferential surface 721b of the first core base 721 become N poles.

Lengths of each of the primary rear side auxiliary magnets 741 and secondary rear side auxiliary magnets 742 in the axial direction are set so that the primary rear side auxiliary magnets 741 and the secondary rear side auxiliary magnets 742 overlap one another in the axial direction at a position in the axial direction in the rotor 711 in which the ring magnet 740 is to be arranged. In other words, the lengths of each of the primary rear side auxiliary magnets 741 and secondary rear side auxiliary magnets 742 in the axial direction are set so that the primary rear side auxiliary magnets 741 and the secondary rear side auxiliary magnets 742 extend from both end surfaces of the rotor 711 in the axial direction to the position on the axial direction where the ring magnet 740 is arranged. Further, inner circumferential surfaces of the primary and secondary rear side auxiliary magnets 741, 742 contact the outer circumferential surface 740a of the ring magnet 740の outer circumferential surface 740a in the radial direction.

As shown in FIG. 57, primary and secondary interpolar magnets 743, 744 are arranged between the primary cog-shaped magnetic poles 723 and the secondary cog-shaped magnetic poles 733 in the circumferential direction. More specifically, the primary interpolar magnets 743 are fitted and fixed between a flat surface formed by the one end surfaces 723a of the primary cog-shaped magnetic poles 723 in the circumferential direction and the end surfaces of the primary rear side auxiliary magnets 741 in the circumferential direction, and a flat surface formed by the other end surface 733b of the secondary cog-shaped magnetic poles 733 in the circumferential direction and the end surfaces of the secondary rear side auxiliary magnets 742 in the circumferential direction.

Further, the secondary interpolar magnets 744 have an identical shape as the primary interpolar magnets 743, and are fitted and fixed between a flat surface formed by the other end surfaces 723b of the primary cog-shaped magnetic poles 723 in the circumferential direction and the end surfaces of the primary rear side auxiliary magnets 741 in the circumferential direction, and a flat surface formed by the one end surfaces 733a of the secondary cog-shaped magnetic poles 733 in the circumferential direction and the end surfaces of the secondary rear side auxiliary magnets 742 in the circumferential direction. The primary and secondary interpolar magnets 743, 744 are magnetized in the circumferential direction so that portions respectively having the same polarities as the primary and secondary cog-shaped magnetic poles 723, 733 are opposed, that is, the portions opposing the primary cog-shaped magnetic poles 723 become the N poles and the portions opposing the secondary cog-shaped magnetic poles 733 become the S poles.

In the above rotor 711, as shown in FIG. 58, recessed portions 724, 734 that are recessed toward the inner side in the axial direction (ring magnet 740) are respectively formed on the end surfaces 721c, 731c of the first and second core bases 721, 731 in the axial direction. The respective recessed portions 724, 734 have an identical shape as one another, and are formed in a circular shape with an axis of the rotary shaft 712 as a center. The respective recessed portions 724, 734 include bottom portions 724a, 734a that form a shape of a flat surface vertical to an axis of the rotary shaft 712. The bottom portions 724a, 734a form a circular shape with the axis of the rotary shaft 712 as a center, and insertion holes 722, 732 are respectively formed at central portions thereof.

Further, the recessed portions 724, 734 respectively include ring-shaped inclined portions 724b, 734b at outer peripheries of the bottom portions 724a, 734a. The inclined portions 724b, 734b are inclined in a tapered shape that separates from the ring magnet 740 as they extend toward an outer side in the radial direction. That is, a thickness of each of the core bases 721, 731 in the axial direction is thinnest at the bottom portions 724a, 734a, the thickness is increased gradually therefrom toward the outer side in the radial direction in the inclined portions 724b, 734b, and becomes thickest at thick portions 721d, 731d on outer circumferential portions of the inclined portions 724b, 734b. That is, a thickness T1 of the thick portions 721d, 731d in the axial direction is thicker than a thickness T2 of the bottom portions 724a, 734a.

Outer circumferential ends of the inclined portions 724b, 734b (outer circumferential ends of the recessed portions 724, 734) are formed to be positioned on the inner side in the radial direction than the outer circumferential surface 740a of the ring magnet 740 (inner circumferential surfaces of the primary and secondary rear side auxiliary magnets 741, 742) in an axial directional view. Thus, the thick portions 721d, 731d of the first and second core bases 721, 731 are configured to overlap with the ring magnet 740 in the axial direction. Further, the primary and secondary cog-shaped magnetic poles 723, 733 are extended to the outer side in the radial direction respectively from the thick portions 721d, 731d. Moreover, a thickness in the axial direction of extended portions 723d, 733d of the primary and secondary cog-shaped magnetic poles 723, 733 in the radial direction (portions that extend in the radial direction from the thick portions 721d, 731d) is equal to the thickness of the thick portions 721d, 731d in the axial direction.

The recessed portion 724 of the first core base 721 is opposed to the bearing 714 and the bearing housing portion 704a in the axial direction. The recessed portion 734 of the second core base 731 is opposed to the bearing 713 and the bearing housing portion 703b in the axial direction. An outer diameter of the respective recessed portions 724, 734 (outer diameter of the inclined surfaces 724b, 734b) is set smaller than an outer diameter of the bearing housing portions 704a, 703b. That is, the bearing housing portions 704a, 703b and the bearings 714, 713 are configured to be positioned on the inner side of the recessed portions 724, 734 in the radial direction in the axial directional view. Thus, an interval in the axial direction from each of the core bases 721, 731 to the bearing housing portions 704a, 703b (or bearings 714, 713) becomes gradually wider toward an inner diameter side of the inclined portions 724b, 734b of the recessed portions 724, 734, and is formed widest at the bottom portions 724a, 734a. Further, the thick portions 721d, 731d of the respective core bases 721, 731 are configured so as not to oppose the bearing housing portions 704a, 703b and the bearings 714, 713 in the axial direction.

Next, the operation of the motor 701 described above will be described.

When a three-phase driving current is supplied to the segment conductor (SC) coils 708 through the power circuits in the circuit housing box 705, a magnetic field for causing the rotor 711 to rotate is generated at the stator 706, and the rotor 711 is thus rotated and driven. Here, magnetic flux of the ring magnet 740 mainly acts on the primary and secondary cog-shaped magnetic poles 723, 733 through the first and second core bases 721, 731, and this magnetic flux becomes effective magnetic flux for generating a rotation force of the rotor 711. Further, part of the magnetic flux of the ring magnet 740 flows to the bearing housing portions 704a, 703b (or the bearings 714, 713) from the first and second core bases 721, 731 through spaces, and this magnetic flux becomes leaking magnetic flux that does not contribute to the torque generation of the rotor 711.

Here, in the first and second core bases 721, 731, the recessed portions 724, 734 are respectively formed at the portions opposing the bearing housing portions 704a, 703b (or the bearings 714, 713) in the axial direction. Thus, the intervals between the first and second core bases 721, 731 and the bearing housing portions 704a, 703b and the bearings 714, 713 in the axial direction are widened by the recessed portions 725, 734 even if the bearing housing portions 704a, 703b and the bearings 714, 713 are not arranged at positions that are made to be far from the first and second core bases 721, 731. Thus, the motor 701 is prevented from becoming elaborate in the axial direction, while at the same time the leaking magnetic flux to the bearings 714, 713 is decreased. As a result, the effective magnetic flux acting on the primary and secondary cog-shaped magnetic poles 723, 733 is increased, and a motor output is improved.

Further, in the rotor 711 of the Randell type structure, magnetic saturation is likely to occur at boundary portions B of the respective core bases 721, 731 and the respective cog-shaped magnetic poles 723, 733 (that is, the boundary portions B between the thick portions 721d, 731d and the extended portions 723d, 733d in the radial direction). Further, if the magnetic saturation occurs, a ratio of the leaking magnetic flux to the bearings 714, 713 is increased relative to the effective magnetic flux that flows in the cog-shaped magnetic poles 723, 733. In this respect, in the thirteenth embodiment, since a thickness in the axial direction of the boundary portions B between the thick portions 721d, 731d and the extended portions 723d, 733d in the radial direction is ensured, the occurrence of the magnetic saturation at such portions is prevented. As a result, the effective magnetic flux acting on the primary and secondary cog-shaped magnetic poles 723, 733 can further be increased.

Further, in the respective core bases 721, 731, the magnetic saturation is likely to occur at closer positions to the end portions in the outer side in the radial direction, however, in the thirteenth embodiment, the inclined portions 724b, 734b are formed corresponding thereto to have the thickness in the axial direction gradually become thicker toward the outer side in the radial direction. Thus, the occurrence of the magnetic saturation is prevented by the magnetic flux being smoothly flown in the respective core bases 721, 731.

Further, the thick portions 721d, 731d in the respective core bases 721, 731 are positioned on the outer side in the radial direction than the bearing housing portions 704a, 703b in the axial directional view, and are configured not to oppose the bearing housing portions 704a, 703b and the bearings 714, 713 in the axial direction. Thus, the intervals between the first and second core bases 721, 731 and the bearing housing portions 704a, 703b and the bearings 714, 713 in the axial direction become wider, and the leaking magnetic flux to the bearings 714, 713 is further reduced.

Next, characteristic advantages of the thirteenth embodiment will be described.

(27) The recessed portions 724, 734 recessed in the axial direction are respectively formed on the end surfaces 721c, 731c of the first and second core bases 721, 731 on the outer side in the axial direction. Thus, the intervals between the end surfaces 721c, 731c of the first and second core bases 721, 731 on the outer side in the axial direction and the bearings 714, 713 and the bearing housing portions 704a, 703b can be widened by the recessed portions 724, 734 even without providing the bearings 714, 713 for supporting the rotary shaft 712 and the bearing housing portions 704a, 703b positioned far away from the rotor cores 720, 730. Thus, the leaking magnetic flux to the bearings 714, 713 can be reduced while preventing the motor 701 from becoming large.

Further, when as viewed from another aspect, in the first rotor core 720 of the thirteenth embodiment, the extended portion 723d in the radial direction as the basal portion (bent end portion) of the primary cog-shaped magnetic pole 723 in the axial direction is configured to be positioned on the outer side in the axial direction than a shaft fixing portion (insertion hole 722) in the first core base 721 that opposes the bearing 714 in the axial direction. In the same manner, in the second rotor core 730, the extended portions 733d in the radial direction as the basal portions (bent end portions) in the axial direction of the secondary cog-shaped magnetic poles 733 are configured to be positioned on the outer side in the axial direction than the shaft fixing portion (insertion hole 732) of the second core base 731 opposing the bearing 713 in the axial direction. In the thirteenth embodiment, the extended portions 723d, 733d in the radial direction correspond to end portions in the axial direction. Thus, it becomes possible to enlarge an area of the surface opposing the stator 706 by elongating a length of the primary and secondary cog-shaped magnetic poles 723, 733 in the axial direction while maintaining the interval of the respective bearings 713, 714. Thus, the output power can be improved while preventing the motor 701 from becoming large in the axial direction.

(28) The recessed portions 724, 734 have a shape of which centers are in conformance with the axis of the rotary shaft 712. Further, the respective core bases 721, 731 includes the thick portions 721d, 731d of which thickness in the axial direction is thicker than the recessed portions 724, 734 at the outer circumferential portions of the recessed portions 724, 734, and the primary and secondary cog-shaped magnetic poles 723, 733 are extended from the thick portions 721d, 731d. That is, since the thick portions 721d, 731d are formed at the boundary portions B between the first and second core bases 721, 731 and the primary and secondary cog-shaped magnetic poles 723, 733, the occurrence of the magnetic saturation at the boundary portions B can be prevented while forming the recessed portions 724, 734 in the first and second core bases 721, 731. Thus, the leaking magnetic flux to the bearings 714, 713 can further be reduced.

(29) The inclined portions 724b, 734b are formed on the recessed portions 724, 734 so that the thickness of the respective core bases 721, 731 in the axial direction becomes thicker toward the outer side in the radial direction. Thus, the rotor 711 of the thirteenth embodiment can be configured suitable for preventing the occurrence of the magnetic saturation in the respective core bases 721, 731, and providing the intervals in the axial direction between the first and second core bases 721, 731 and the bearings 714, 713.

(30) The thick portions 721d, 731d are positioned on the outer side in the radial direction than the bearing housing portions 704a, 703b in the axial directional view. Thus, since the rotor 711 can be configured so that the thick portions 721d, 731d do not oppose the bearing housing portions 704a, 703b and the bearings 714, 713 in the axial direction, the intervals between the first and second core bases 721, 731 and the bearing housing portions 704a, 703b and the bearings 714, 713 in the axial direction can be made wider. As a result, the leaking magnetic flux to the bearings 714, 713 can further be reduced.

Fourteenth Embodiment

A fourteenth embodiment according to the present invention will now be described with reference to the drawings. The present embodiment differs from the above thirteenth embodiment in configurations of core bases and cog-shaped magnetic poles of first and second rotor cores. Accordingly, configurations similar to the thirteenth embodiment will be given the same reference signs, and detailed explanation thereof will be omitted.

Figure 65:
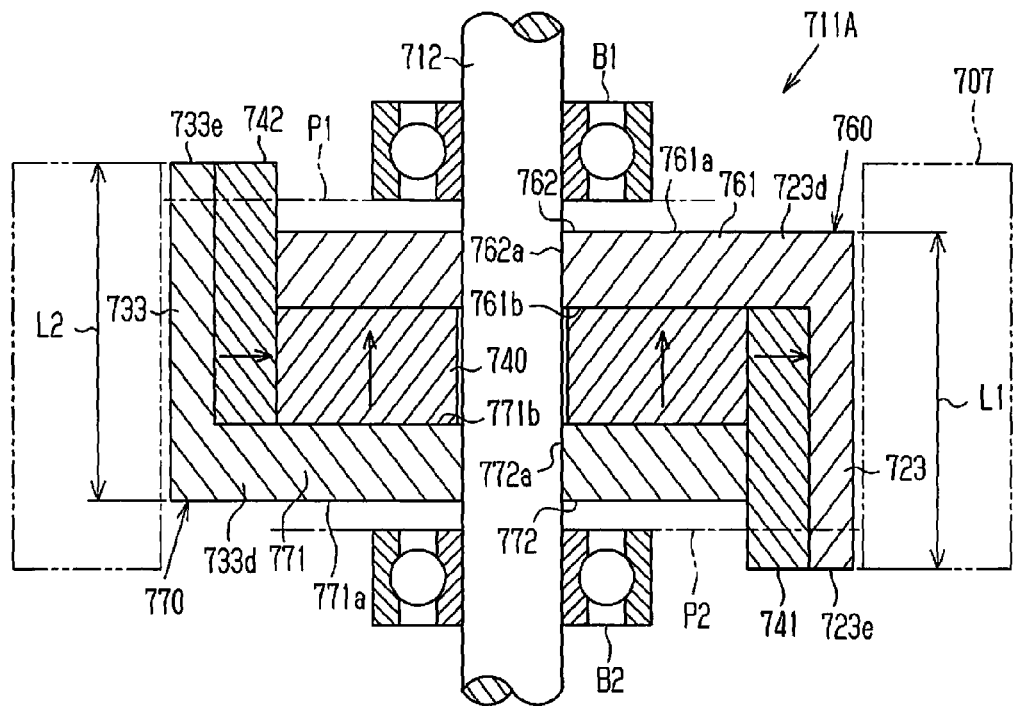
FIG. 65 is a cross-sectional view of a rotor of a fourteenth embodiment.
Figure 66:
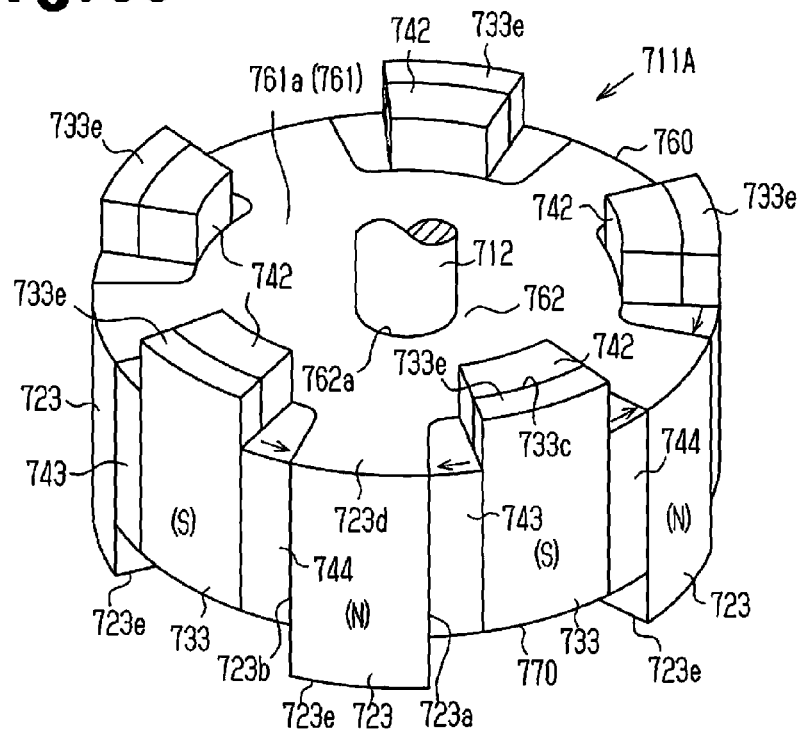
FIG. 66 is a perspective view of the rotor of FIG. 65.

As shown in FIG. 65 and FIG. 66, a rotor 711A of the fourteenth embodiment includes a rotary shaft 712 axially supported by a pair of bearings B1, B2 on both sides of the rotor 711A in an axial direction, first and second rotor cores 760, 770, a ring magnet 740 as a field magnet member, primary and secondary rear side auxiliary magnets 741, 742, and primary and secondary interpolar magnets 743, 744.

The first rotor core 760 includes a substantially disk-shaped first core base 761, and primary cog-shaped magnetic poles 723 that are substantially the same as the third embodiment are formed on an outer circumferential portion of the first core base 761. An insertion hole 762a into which the rotary shaft 712 is to be inserted is penetratingly formed in the axial direction at a shaft fixing portion 762 at a center of the first core base 761 in a radial direction. The rotary shaft 712 is press fitted and fixed in the insertion hole 762a, and the first rotor core 760 and the rotary shaft 712 are enabled to rotate integrally.

An end surface 761a on an outer side in the axial direction in the first core base 761 that opposes the bearing B1 is formed in a flat surface that is vertical to the rotary shaft 712. An end surface 761b on an inner side in the axial direction that is positioned on an opposite side of the end surface 761a on the outer side in the axial direction and that makes close contact with the ring magnet 740 is also formed in a flat surface that is vertical to the rotary shaft 712. That is, in the first core base 761, a thickness in the axial direction of a portion extending from the shaft fixing portion 762 at the center in the radial direction to an outer side in the radial direction is constant. Further, the thickness in the axial direction of the first core base 761 is equal to a thickness in the axial direction of extended portions 723d of the primary cog-shaped magnetic poles 723 in the radial direction, and the end surface 761a of the first core base 761 on the outer side in the axial direction is leveled with base end surfaces of the primary cog-shaped magnetic poles 723 in the axial direction.

The second rotor core 770 has a substantially identical shape as the first rotor core 760, includes a substantially disk-shaped second core base 771, and secondary cog-shaped magnetic poles 733 that are substantially the same as the third embodiment are formed on an outer circumferential portion of the second core base 771. An insertion hole 772a into which the rotary shaft 712 is to be inserted is penetratingly formed in the axial direction at a shaft fixing portion 772 at a center of the second core base 771 in the radial direction. The rotary shaft 712 is press fitted and fixed in the insertion hole 772a, and the second rotor core 770 and the rotary shaft 712 are enabled to rotate integrally.

Further, an end surface 771a on the outer side in the axial direction in the second core base 771 that opposes the bearing B2 is formed in a flat surface that is vertical to the rotary shaft 712. An end surface 771b on the inner side in the axial direction that is positioned on an opposite side of the end surface 771a on the outer side in the axial direction and that makes close contact with the ring magnet 740 is also formed in a flat surface that is vertical to the rotary shaft 712. That is, in the second core base 771, a thickness in the axial direction of a portion extending from the shaft fixing portion 772 at the center in the radial direction to an outer side in the radial direction is constant. Further, the thickness in the axial, direction of the second core base 771 is equal to a thickness in the axial direction of extended portions 733d of secondary cog-shaped magnetic poles 733 in the radial direction, and the end surface 771a of the second core base 771 on the outer side in the axial direction is leveled with base end surfaces of the secondary cog-shaped magnetic poles 733 in the axial direction.

Here, distal portions 723e (end portions on an opposite side from the bent end portions) of the primary cog-shaped magnetic poles 723 in the axial direction of the fourteenth embodiment are extended in the axial direction, and project from an end surface 771a of the second core base 771 on the outer side in the axial direction. The distal portions 723e further extend to positions overlapping the bearing B2 in the radial direction (overlapping in a radial directional view) over a virtual flat surface P2 extending in a direction vertically intersecting an axis from an end of the bearing B2 on the inner side in the axial direction. Further, in the fourteenth embodiment, primary rear side auxiliary magnets 741 positioned on the inner side in the radial direction of the primary cog-shaped magnetic poles 723 similarly extend to same positions as the distal portions 723e of the primary cog-shaped magnetic poles 723 in the axial direction, and overlap with the bearing B2 in the radial direction. Projection amounts of the respective primary cog-shaped magnetic poles 723 and the respective primary rear side auxiliary magnets 741 from the end surface 771a on the outer side in the axial direction are set to be equal to one another, and lengths L1 of the plurality of primary cog-shaped magnetic poles 723 in the axial direction are set to be equal to one another.

Further, distal portions 733e of the secondary cog-shaped magnetic poles 733 and the secondary rear side auxiliary magnets 742 similarly project from an end surface 761a of the first core base 761 on the outer side in the axial direction. The distal portions 733e and the secondary rear side auxiliary magnets 742 further extend to positions overlapping the bearing B1 in the radial direction over a virtual flat surface P1 extending in the direction vertically intersecting the axis from an end of the bearing B1 on the inner side in the axial direction. Further, lengths L2 of the respective secondary cog-shaped magnetic poles 733 in the axial direction are set to be equal to the lengths L1 of the primary cog-shaped magnetic poles 723 in the axial direction.

In the fourteenth embodiment, as shown in FIG. 66, although the end surfaces of the interpolar magnets 743, 744 in the axial direction are leveled with the end surfaces 761a, 771a of the core bases 761, 771 on the outer side in the axial direction, no specific limitation is made hereto. Similar to the primary and secondary cog-shaped magnetic poles 723, 733, the end surfaces of the interpolar magnets 743, 744 in the axial direction may project from the end surfaces 761a, 771a on the outer side in the axial direction.

A dimensional size of an armature core 707 opposing the primary and secondary cog-shaped magnetic poles 723, 733 as above is set to be equal to a length from the distal portions 723e of the primary cog-shaped magnetic poles 723 to the distal portions 733e of the secondary cog-shaped magnetic poles 733 of the rotor 711A.

Next, characteristic advantages of the fourteenth embodiment will be described.

(31) In the primary cog-shaped magnetic poles 723, the distal portions 723e as the end portions in the axial direction are configured to project from the end surface 771a of the second core base 771 on the outer side in the axial direction, and be positioned on the outer side in the axial direction (bearing B2 side) than the shaft fixing portion 772. With the secondary cog-shaped magnetic poles 733, in the same manner, the distal portions 733e as the end portions in the axial direction are configured to project from the end surface 761a of the first core base 761 on the outer side in the axial direction, and be positioned on the outer side in the axial direction (bearing B1 side) than the shaft fixing portion 762. Thus, an area of the surface opposing the armature core 707 can be enlarged by elongating the lengths L1, L2 of the primary and secondary cog-shaped magnetic poles 723, 733 in the axial direction while maintaining the interval of the respective bearing B1, B2. Thus, the output power can be improved while preventing the motor 701 from becoming large in the axial direction.

Further, when as viewed from another aspect, the shaft fixing portions 762, 772 are positioned on the inner side in the axial direction with respect to the distal portions 723e, 733e of the primary and secondary cog-shaped magnetic poles 723, 733. Thus, it becomes possible to widen the intervals of the first and second core bases 761, 771 (shaft fixing portions 762, 772) and the bearings B1, B2 in the axial direction while maintaining the interval of the respective bearing B1, B2. Thus, the reduction of the leaking magnetic flux from the first and second core bases 761, 771 to the bearings B1, B2 can be achieved while preventing the motor 701 from becoming large in the axial direction, which as a result can increase effective magnetic flux (magnetic flux that contributes to torque generation) acting on the primary and secondary cog-shaped magnetic poles 723, 733.

(32) In the primary and secondary cog-shaped magnetic poles 723, 733, the distal portions 723e, 733e (extended portions) as the end portions in the axial direction are configured to overlap with the bearings B1, B2 in the radial direction (overlap in the radial directional view). Thus, since the primary and secondary cog-shaped magnetic poles 723, 733 can further be configured longer while maintaining the interval of the respective bearings B1, B2, the output power can further be improved while preventing the motor 701 from becoming large in the axial direction.

(33) In the primary and secondary cog-shaped magnetic poles 723, 733, distal portions 723e, 733e as the end portions in the axial direction are projected on the outer side (formed integrally) than the end surfaces 761a, 771a on the outer side in the axial direction. That is, simply by making the primary and secondary cog-shaped magnetic poles 723, 733 longer in the axial direction, the distal portions 723e, 733e of the primary and secondary cog-shaped magnetic poles 723, 733 can be made to position on the outer side in the axial direction than the shaft fixing portions 762, 772. Thus, the rotor 711A can easily be manufactured.

(34) Since the lengths L1 of the primary cog-shaped magnetic poles 723 in the axial direction and the lengths L2 of the secondary cog-shaped magnetic poles 733 in the axial direction are identical, forces in the axial direction generated in the primary and secondary cog-shaped magnetic poles 723, 733 by the magnetic effect with the armature core 707 is homogenized, which as a result can contribute to lowering vibration of the rotor 711A.

The above embodiments may be modified as described below.

In the first to fourth embodiments, the disk magnets 55, 75 as the field magnet members are realized by the Neodymium magnets, however, no limitation is made hereto, and other permanent magnets such as ferrite magnets, samarium nitride iron magnets, samarium cobalt magnets and the like may be used.

In the third embodiment, the rotor 25 of the second embodiment is used in the tandem structure, however, the rotor 25 shown in the first embodiment, or the rotor shown in the fourth embodiment may be used in the tandem structure.

In the first to fourth embodiments the outer diameter of the motor housing 20a is made to be 10 cm, however, it may be 10 cm or less.

In the first embodiment, the present invention is embodied in the brushless motor M of the concentrated winding with fourteen poles and twelve slots, however, no limitation is made hereto. For example, it may be adapted to brushless motors of the concentrated winding with eight poles and twelve slots, with ten poles and twelve slots, sixteen poles and twelve slots, with twelve poles and eighteen slots, with sixteen poles and eighteen slots, twenty poles and eighteen slots, and the like.

In the second embodiment, the present invention is embodied in the brushless motor M of the distributed winding with ten poles and sixty slots, however, no limitation is made hereto. For example, it may be adapted to brushless motors of the distributed winding with six poles and eighteen slots, with six poles and thirty-six slots, sixty poles and seventy-two slots, with eight poles and twenty-four slots, with eight poles and forty-eight slots, with ten poles and thirty slots, with sixteen poles and forty-eight slots, twenty poles and sixty slots, and the like. That is, slots in a multiplied number of the number of poles are provided.

The brushless motor M of the first to fourth embodiments are embodied in the column assist type electric power steering device 1, however, this may be adapted to a rack assist type or pinion assist type power steering assist system. In this case, the advantageous effects are especially large due to being positioned inside an engine room.

The fifth to seventh embodiments use the spaces 145, 164, 174, 184. However, the spaces 145, 164, 174, 184 are not necessary.

In the fifth embodiment and the sixth embodiment, the divergences θ1, θ3 of the magnets 144, 163 are set to be larger than the divergences θ2, θ4 of the salient pole iron cores 143, 162, however, the divergences θ1, θ3 of the magnets 144, 163 and the divergences θ2, θ4 of the salient pole iron cores 143, 162 may be set to be identical.

In the fifth to seventh embodiments, the Neodymium magnets are used as the materials of the magnets, however, no limitation is made hereto so long as permanent magnets are used, and use of SmFeN magnets (samarium nitride iron magnets), SmCo magnets (samarium cobalt magnets) and the like is especially preferable.

In the fifth embodiment, the present invention is embodied in the consequent type brushless motors M of the SPM type formed by the concentrated winding with eight poles and twelve slots, and in addition with ten poles and twelve slots, and with fourteen poles and twelve slots, however, for example, the present invention may be embodied in consequent type brushless motors M of the SPM type formed by the concentrated winding with twelve poles and eighteen slots, and with sixteen poles and eighteen slots.

In the sixth embodiment, the present invention is embodied in the consequent type brushless motors M of the SPM type formed by the distributed winding with ten poles and sixty slots, and in addition with ten poles and thirty slots, however, for example, the present invention may be embodied in consequent type brushless motors M of the SPM type formed by the distributed winding with eight poles and twenty-four slots, with eight poles and forty-eight slots, and with sixteen poles and ninety-six slots.

In the seventh embodiment, although the coils are wound on the stator core 130 in the concentrated winding, the coils may be wound by the distributed winding.

The brushless motors M of the fifth to seventh embodiments are embodied in the column assist type electric power steering devices 1, however, these may be adapted to rack assist type or pinion assist type electric power steering devices.

The magnets 144, 163 in the fifth and sixth embodiments are magnetized so that their outer side in the radial direction is the S pole and the inner side in the radial direction is the N pole, however, may be magnetized so that the outer side in the radial direction is the N pole, and the inner side in the radial direction is the S pole.

In the fifth embodiment, corners between the magnet outer circumferential surface 144b of the magnet 144 and both side surfaces in the circumferential direction 144c of the magnet 144 may be formed in a curved shape, and corners between the outer circumferential surface 143b of the salient pole iron core 143 and both side surfaces 143a of the salient pole iron core 143 may be formed in a curved shape.

More specifically, both side surfaces 144c in the circumferential direction of the magnet 144 are formed in a curve from the positions of the slots 142 to round the corners of the magnet 144 on both sides in the circumferential direction, and both side surfaces 143a of the salient pole iron core 143 are formed in a curve from the positions of the slots 142 to round the corners of the salient pole iron core 143 on both sides in the circumferential direction.

In this case, the divergence θ1 of the magnets 144 and the divergence θ2 of the salient pole iron cores 143 may be defined as follows.

As for the divergence θ1 of the magnets 144, virtual circumference lines extended to both sides in a clockwise direction and a counter clockwise direction along the circumferential direction from the magnet outer circumferential surface 144b are respectively calculated. Further, virtual tangential lines extending from the positions of the slots 142 of both side surfaces 144c of the magnet 144 formed in the curved shape are respectively calculated. Next, intersections of the virtual circumference lines and the virtual tangential lines are respectively calculated.

Then, an angle between the two intersections with the center axis L of the rotary shaft 122 as the center is determined as the divergence θ1 of the magnets 144.

As for the divergence θ2 of the salient pole iron cores 143, virtual circumference lines extended to both sides in the clockwise direction and the counter clockwise direction along the circumferential direction from the outer circumferential surface 143b are respectively calculated. Further, virtual tangential lines extending from the positions of the slots 142 of both side surfaces 143a of the salient pole iron core 143 formed in the curved shape are respectively calculated. Next, intersections of the virtual circumference lines and the virtual tangential lines are respectively calculated.

Then, an angle between the two intersections with the center axis L1 of the rotary shaft 122 as the center is determined as the divergence θ2 of the salient pole iron cores 143.

In the same manner, in the sixth embodiment, corners on both sides of the magnet 163 in the circumferential direction may be rounded by forming both side surfaces 163c of the magnet 163 in a curved shape from the positions of the slots 161, and corners on both sides of the salient pole iron core 162 in the circumferential direction may be rounded by forming both side surfaces 162b of the salient pole iron core 162 in a curved shape from the positions of the slots 161.

In this case, the divergence θ3 of the magnets 163 and the divergence θ4 of the salient pole iron cores 162 may be defined as follows.

As for the divergence θ3 of the magnets 163, virtual circumference lines extended to both sides in the clockwise direction and the counter clockwise direction along the circumferential direction from the magnet outer circumferential surface 163a are respectively calculated. Further, virtual tangential lines extending from the positions of the slots 161 of both side surfaces 163c of the magnet 163 formed in the curved shape are respectively calculated. Next, intersections of the virtual circumference lines and the virtual tangential lines are respectively calculated.

Then, an angle between the two intersections with the center axis L1 of the rotary shaft 122 as the center is determined as the divergence θ3 of the magnets 163.

As for the divergence θ4 of the salient pole iron cores 162, virtual circumference lines extended to both sides in the clockwise direction and the counter clockwise direction along the circumferential direction from the outer circumferential surface 162a are respectively calculated. Further, virtual tangential lines extending from the positions of the slots 161 of both side surfaces 162b of the salient pole iron core 162 formed in the curved shape are respectively calculated. Next, intersections of the virtual circumference lines and the virtual tangential lines are respectively calculated.

Then, an angle between the two intersections with the center axis L1 of the rotary shaft 122 as the center is determined as the divergence θ4 of the salient pole iron cores 162.

The configuration of the shape and the like of the armature coil 252 is not limited to the eighth embodiment. For example, in the present embodiment, although the armature coil 252 is configured by the conductors 261, 262 fixed on the inner and outer circumferential surfaces of the cylinder member 260, the configuration thereof may be formed by plural strips of spiral-shaped copper foil patterns on circumferential surfaces of the cylinder member 260 by photo etching method and the like. Further, for example, an armature coil may be configured by applying insulative resin solution on a plurality of conductive wires formed in a cylinder shape or immersing the same in the insulative resin solution.

In the eighth embodiment, although the armature coil 252 includes the first and second coil bodies 253a, 253b, however, no limitation is made hereto. For example, it may be configured with only the first coil body 253a, with the second coil body 253b being omitted. Further, in the eighth embodiment, although the numbers of the primary conductors 261 and the secondary conductors 262 in the respective coil bodies 253a, 253b are formed by forty-eight, the numbers thereof may suitably be changed in accordance with configuration.

The numbers of poles in the stator 213 and the rotor 215 in the eighth embodiment (the numbers of the respective cog-shaped magnetic poles 222, 232) may suitably be changed in accordance with configuration.

In the eighth embodiment, the shapes of the first and second core members 220, 230 may suitably be changed in accordance with configuration.

In the eighth embodiment, the ring magnet 240 is magnetized to cause the primary cog-shaped magnetic poles 222 to function as the N poles and the secondary cog-shaped magnetic poles 232 to function as the S poles, however, the magnetic poles of the ring magnet 240 may be inverted, to cause the primary cog-shaped magnetic poles 222 to function as the S poles, and the secondary cog-shaped magnetic poles 232 to function as the N poles.

In the eighth embodiment, one ring magnet 240 is used as the field magnet, however, a configuration in which permanent magnets that are divided into a plurality of segments are arranged around the rotary shaft 216 between the first and second core bases 221, 331 in the axial direction may be employed.

In the eighth embodiment, although not specifically mentioned, the first and second core members 220, 230 may for example be formed by laminated layers of magnetic metal plate materials, or molded magnetic powders.

The stator 213 of the eighth embodiment is of the slotless structure in which the cylindrical armature coil 252 is arranged on the inner circumferential side of the core part 251 having no slots (teeth), however, no specific limitation is made hereto, and a configuration in which the core part 251 is omitted and the armature coil 252 for example is fixed directly on the yoke 211 (a so-called coreless structure) may be used. The coreless structure is one type of the slotless structure.

In the ninth embodiment, the outer rotor 508 is a rotor of the SPM structure. This may, for example, be changed to a rotor of the IPM structure or a rotor of the consequent pole type.

In the ninth embodiment, although magnetic materials of the primary permanent magnet 521, the secondary permanent magnet 522, and the disk magnet 550 are not limited, the respective magnets may be formed of the same magnetic material, or the disk magnet 550 may be formed of the magnetic material that is different from the first and secondary permanent magnets 521, 522.

In the ninth embodiment, although the rotor of the Randell type structure is used as the inner rotor 509, a rotor of the Randell type structure may be used as the outer rotor 508 together with the inner rotor 509.

Figure 45:
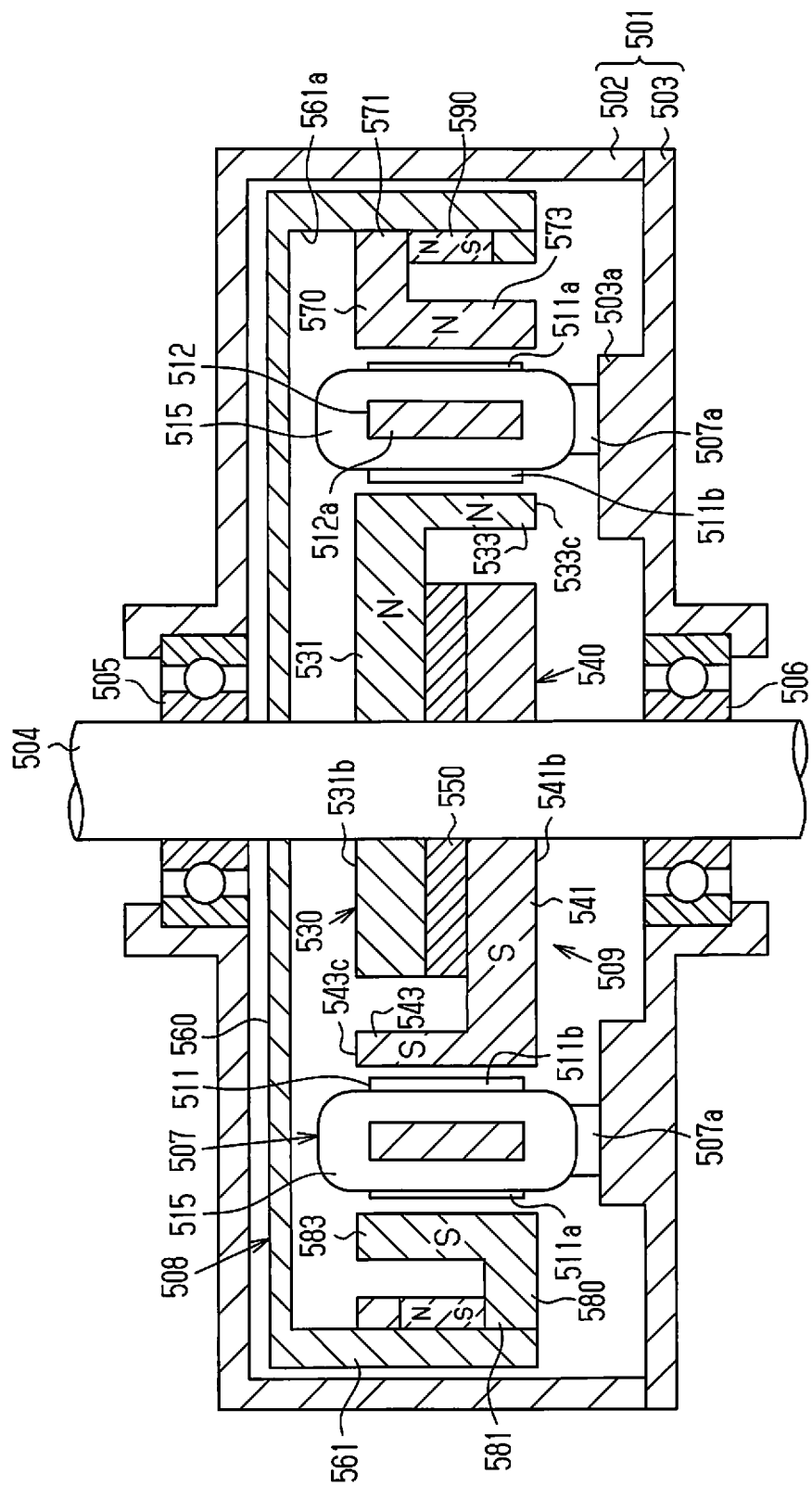
FIG. 45 is an axial direction cross-sectional view showing a brushless motor of another example.
Figure 46:
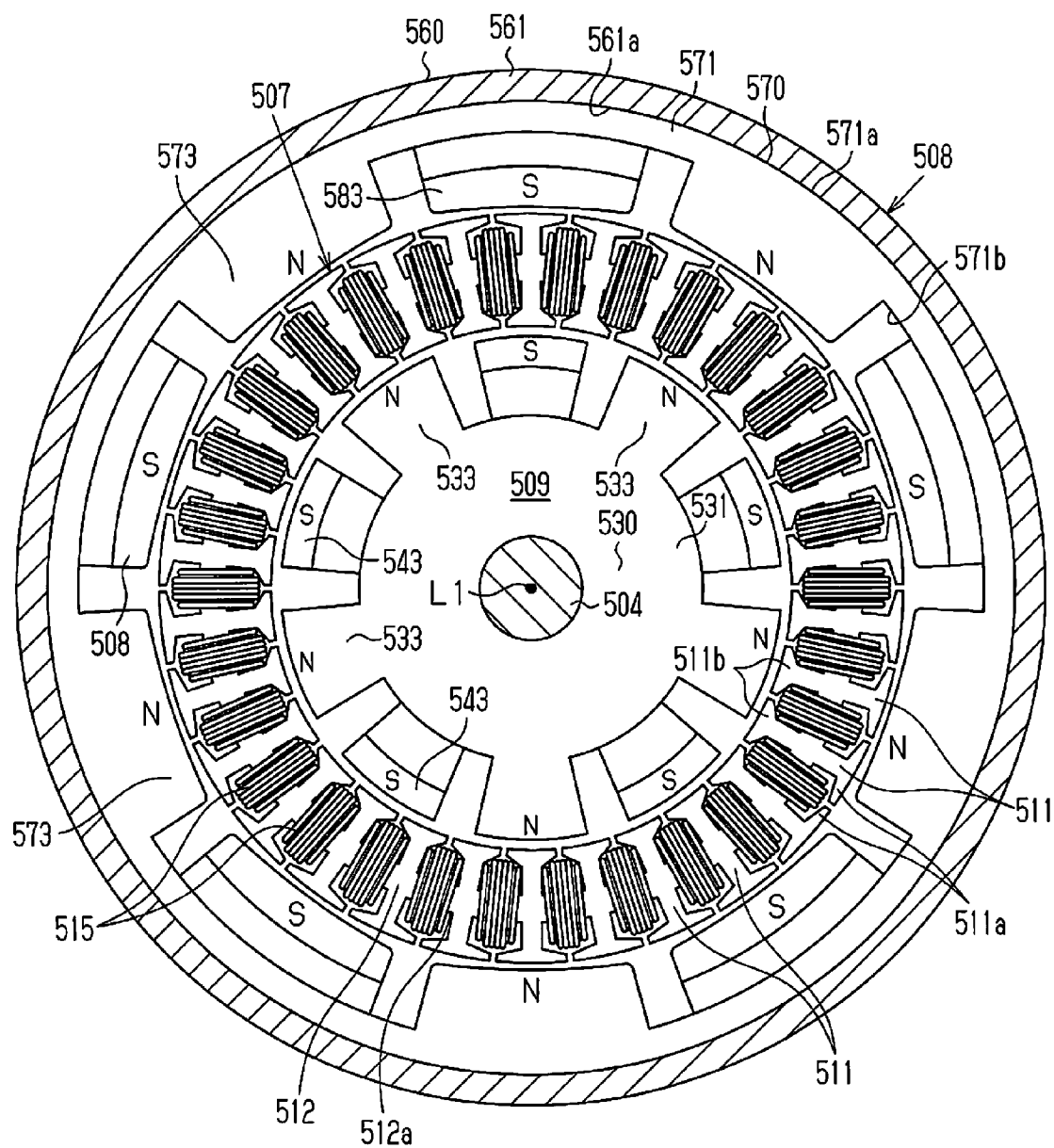
FIG. 46 is a radial direction cross-sectional view of a stator and a rotor of FIG. 45.
Figure 47:
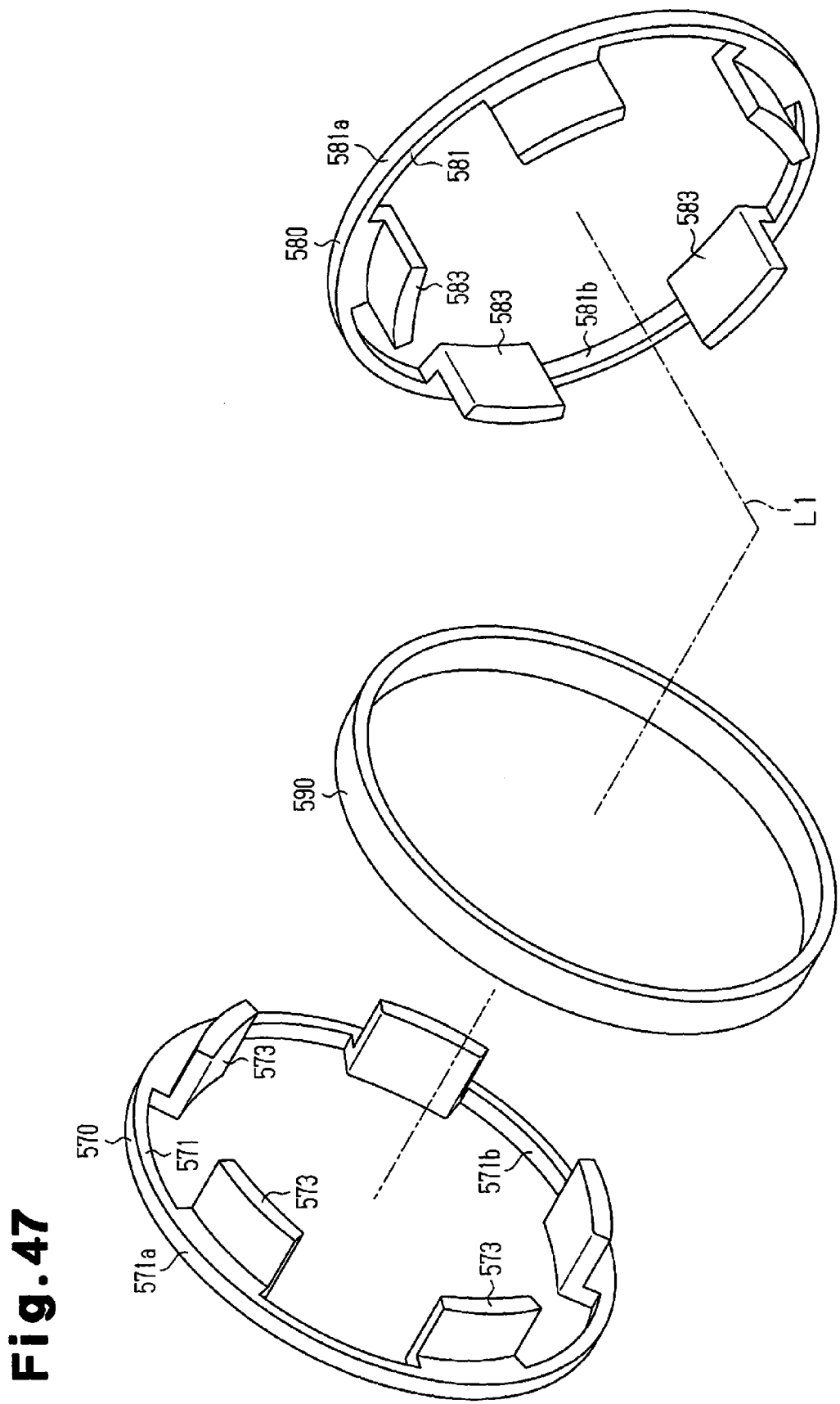
FIG. 47 is an exploded perspective view of an outer rotor of FIG. 46.

For example, as shown in FIG. 45 and FIG. 46, an outer rotor 508 provided with a cylindrical body 560 with a cover fixed on the rotary shaft 504, an outer side first rotor core 570 provided on an inner circumferential surface of the cylindrical body 560 with a cover, an outer side second rotor core 580, and a ring-shaped plate magnet 590 may be used. More specifically, the cylindrical body 560 with a cover formed to cover the stator 507 is fixed to the rotary shaft 504. Further, as shown in FIG. 46 and FIG. 47, the outer side first rotor core 570, the outer side second rotor core 580 arranged o oppose the outer side first rotor core 570, and the ring-shaped plate magnet (field magnet member) 590 arranged between the outer side first rotor core 570 and the outer side second rotor core 580 are arranged at an inner circumferential surface 561a of the cylindrical wall 561 of the cylindrical body 560 with a cover.

That is, the outer side first and second rotor cores 570, 580 include ring plate shaped outer side first and second core bases 571, 581. Outer circumferential surfaces 571a, 581a of the outer side first and second core bases 571, 581 are fixed to the inner circumferential surface 561a of the cylindrical wall 561 of the cylindrical body 560 with a cover. Here, the outer side first and second core bases 571, 581 are fixed to the inner circumferential surface 561a of the cylindrical wall 561 in a state of sandwiching the ring-shaped plate magnet 590 that is similarly ring plate shaped.

Five primary projecting pieces 573 (corresponding to the inner rotor 509 of the Randell type structure) at equal intervals on the inner circumferential surface 571b of the outer side first core base 571. Each of the primary projecting pieces 573 projects to an inner side in a radial direction, its distal end is bent and extended to an outer side in an axial direction, that is, toward the second rotor core 580. In the same manner, five secondary projecting pieces 583 (corresponding to the inner rotor 509 of the Randell type structure) at equal intervals on the inner circumferential surface 581b of the outer side second core base 581. Each of the secondary projecting pieces 583 projects to the inner side in the radial direction, its distal end is bent and extended to the outer side in the axial direction, that is, toward the first rotor core 570.

Further, the outer circumferential surfaces 571a, 581a of the outer side first and second core bases 571, 581 are fixed on the inner circumferential surface 561a of the cylindrical wall 561 of the cylindrical body 560 with a cover under a state in which the primary projecting pieces 573 and the secondary projecting pieces 583 are arranged alternately in the circumferential direction. The ring-shaped plate magnet 590 is magnetized so that a portion on an outer side first rotor core 570 side is an N pole, and a portion on an outer side second rotor core 580 is an S pole. Accordingly, due to the ring-shaped plate magnet 590, the primary projecting pieces 573 of the outer side first rotor core 570 function as the N poles (primary magnetic poles), and the secondary projecting pieces 583 of the outer side second rotor core 580 function as the S poles (secondary magnetic poles). As a result, the outer rotor 508 becomes a rotor of the so-called Randell type structure using the ring-shaped plate magnet 590.

Further, as shown in FIG. 46, the outer rotor 508 of the Randell type structure and the inner rotor 509 of the Randell type structure are relatively opposed so that the primary projecting pieces 573 of the outer rotor 508 and the primary projecting pieces 533 of the inner rotor 509 are opposed in the radial direction, and the secondary projecting pieces 583 of the outer rotor 508 and the secondary projecting pieces 543 of the inner rotor 509 are opposed in the radial direction.

Thus, since the permanent magnet required in the outer rotor 508 is only the ring-shaped plate magnet 590, so a reduction of manufacturing cost can be achieved. Further, centrifugal force that is applied to the ring-shaped plate magnet 590 by the rotation of the outer rotor 508 is supported by the cylindrical wall 561 on the outer side, the ring-shaped plate magnet 590 is not flown off to the outer side by the centrifugal force.

Moreover, in the ninth embodiment, in the outer rotor 508, the primary projecting pieces 573 to be the N poles and the secondary projecting pieces 583 to be the S poles are arranged alternately in the circumferential direction, so it becomes a rotor with the number of the magnetic poles is ten poles (the number of magnetic poles being five).

When using a rotor of the Randell type structure as the outer rotor 508, a rotor of the SPM structure, a rotor of the IPM structure, and a rotor of the consequent pole type may be used as the inner rotor 509.

In the ninth embodiment, the numbers of the magnetic poles are ten poles (the number of pole pairs being five) in both the outer rotor 508 and the inner rotor 509, and the number of the teeth portions 511 is thirty, however, no limitation is made hereto. For example, the present invention may be adapted to brushless motors of which numbers of magnetic poles are eight poles (the number of pole pairs being four), and the number of teeth portions 511 being twenty-four, and the like.

In the tenth to twelfth embodiments, the outer magnet magnetic pole portions 621 and the outer iron core portions 622 of the outer rotor 608 are divided by the outer grooves 623, and the inner magnet magnetic pole portions 631 and the inner iron core portions 632 of the inner rotor 609 are divided by the inner grooves 633, however, the outer grooves 623 and the inner grooves 633 may not be formed.

In the tenth to twelfth embodiments, if a relationship of the outer permanent magnets 624 and the inner permanent magnets 634 does not change, the magnetic poles of the outer permanent magnets 624 and the magnetic poles of the inner permanent magnets 634 may respectively be changed.

In the tenth to twelfth embodiments, although magnetic materials of the outer permanent magnets 624 and the inner permanent magnets 634 are not limited, the outer permanent magnets 624 and the inner permanent magnets 634 may be formed of the same magnetic material, or the outer permanent magnets 624 and the inner permanent magnets 634 may be formed of different magnetic materials.

In the twelfth embodiment, the respective outer permanent magnets 624 embedded in the outer magnet magnetic pole portions 621 are magnetized so that the portions on the inner side (magnetic pole of the magnets) are the S poles, and the portions on the outer side (magnetic pole of the magnets) are the N poles in the radial direction. The respective outer permanent magnets 624 may be magnetized in the same manner as the tenth embodiment so that the portions on the inner side (magnetic pole of the magnets) are the N poles, and the portions on the outer side (magnetic pole of the magnets) are the S poles in the radial direction.

Figure 59:
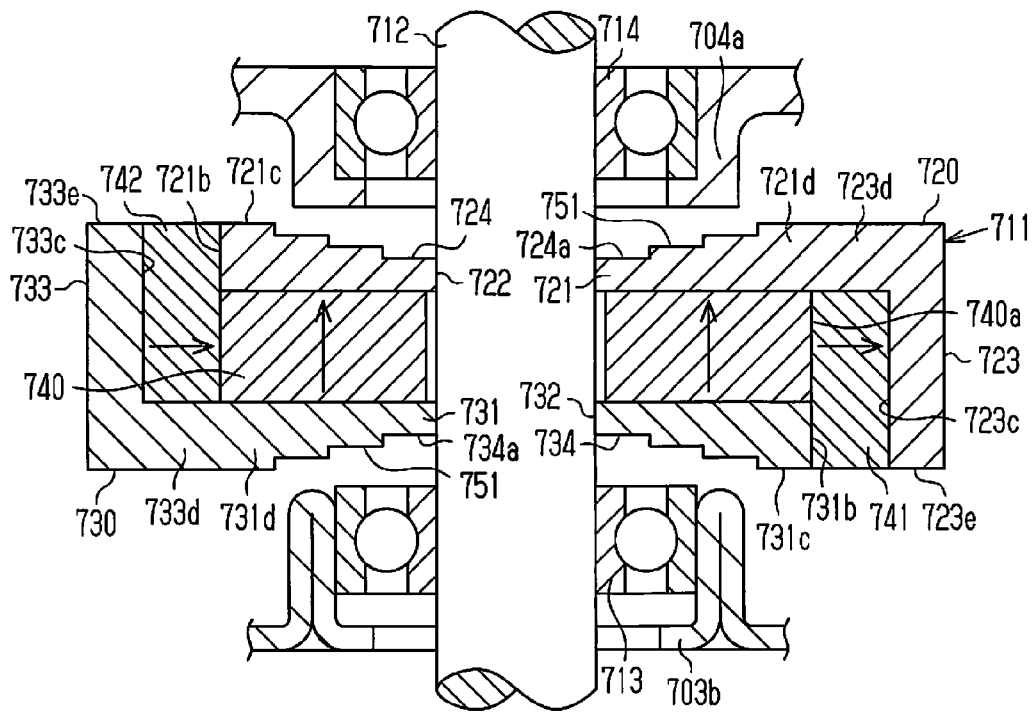
FIG. 59 to FIG. 64 are cross-sectional views showing rotors of other examples.

In the thirteenth embodiment, the thickness of the respective core bases 721, 731 in the axial direction is formed to become thicker toward the outer side in the radial direction by the inclined portions 724b, 734b, however, no specific limitation is made hereto. For example, as shown in FIG. 59, the respective core bases 721, 731 maybe formed so that the thickness of the respective core bases 721, 731 in the axial direction is formed to become thicker toward the outer side in the radial direction by step portions 751 instead of the inclined portions 724b, 734b. According to such a configuration also, advantages that are substantially the same as the thirteenth embodiment may be obtained. In the configuration shown in FIG. 59, the step portions 751 are formed by three steps, however, no limitation is made hereto, and the number of steps in the step portions 751 may suitably be changed according to configurations.

Figure 60:
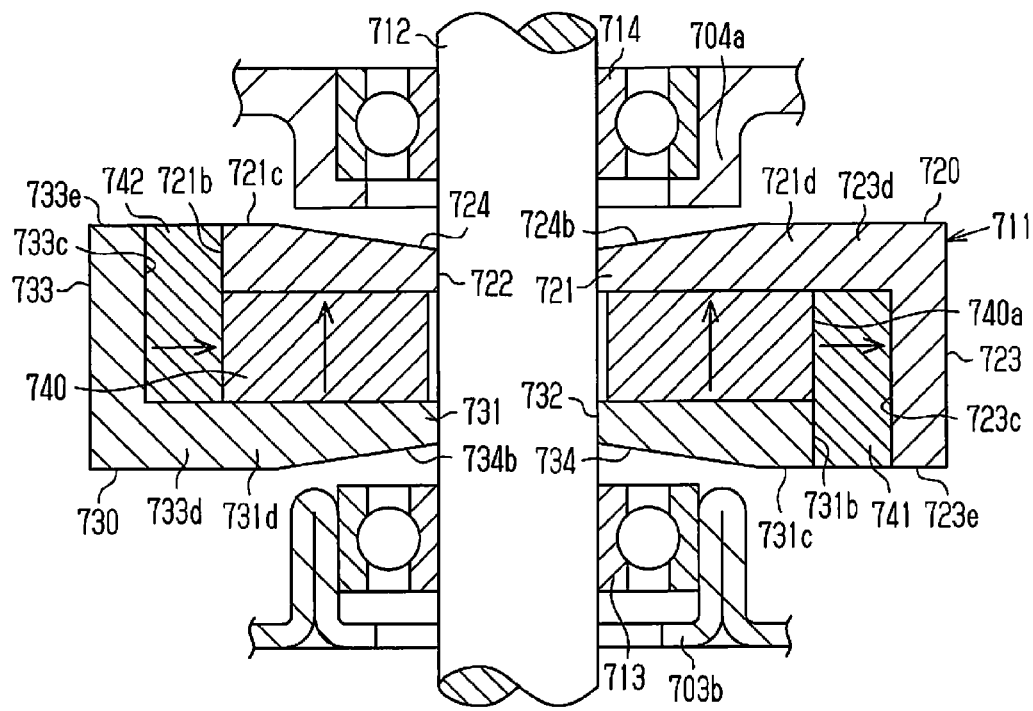

In the thirteenth embodiment, the recessed portions 724, 734 are formed by the bottom portions 724a, 734a forming flat surfaces and the inclined portions 724b, 734b, however, no limitation is made hereto. For example, as shown in FIG. 60, the bottom portions 724a, 734a may be omitted, and the inclined portions 724b, 734b may be formed over entireties of the recessed portions 724, 734 in the radial direction. According to this configuration, the intervals in the axial direction between the recessed portions 724, 734 and the bearings 714, 713 can further be widened. Like in the thirteenth embodiment, in the configuration in which the insertion holes 722, 732 are formed of the bottom portions 724a, 734a forming the flat surfaces, since the length of the insertion holes 722, 732 can be made long in the axial direction, such is advantageous in increasing fixing strength of the rotary shaft 712 and the insertion holes 722, 732.

Figure 61:
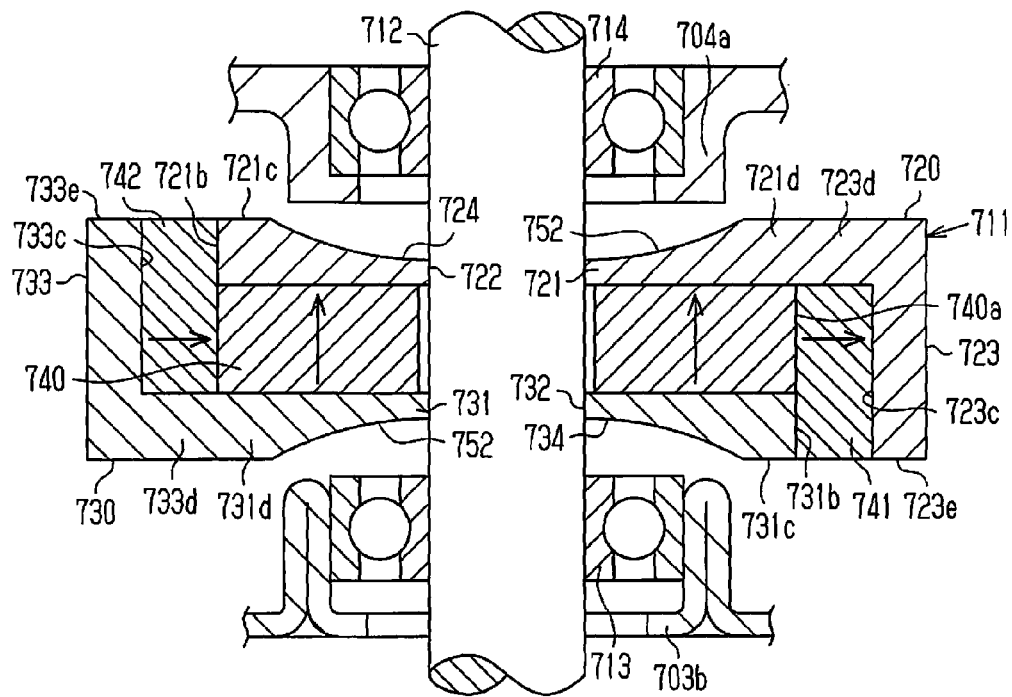

In the configuration of the thirteenth embodiment and that shown in FIG. 60, the inclined portions 724b, 734b are formed in the tapered shape (having a constant inclination angle), however, no limitation is made hereto. For example, in a configuration shown in FIG. 61, curved inclined portions 752 of which inclination becomes greater toward the outer side in the radial direction are formed instead of the inclined portions 724b, 734b in the configuration shown in FIG. 60. Further, the curved inclined portions 752 may be formed instead of the inclined portions 724b, 734b in the thirteenth embodiment. According to such a configuration also, substantially similar advantages as the thirteenth embodiment may be obtained.

Figure 62:
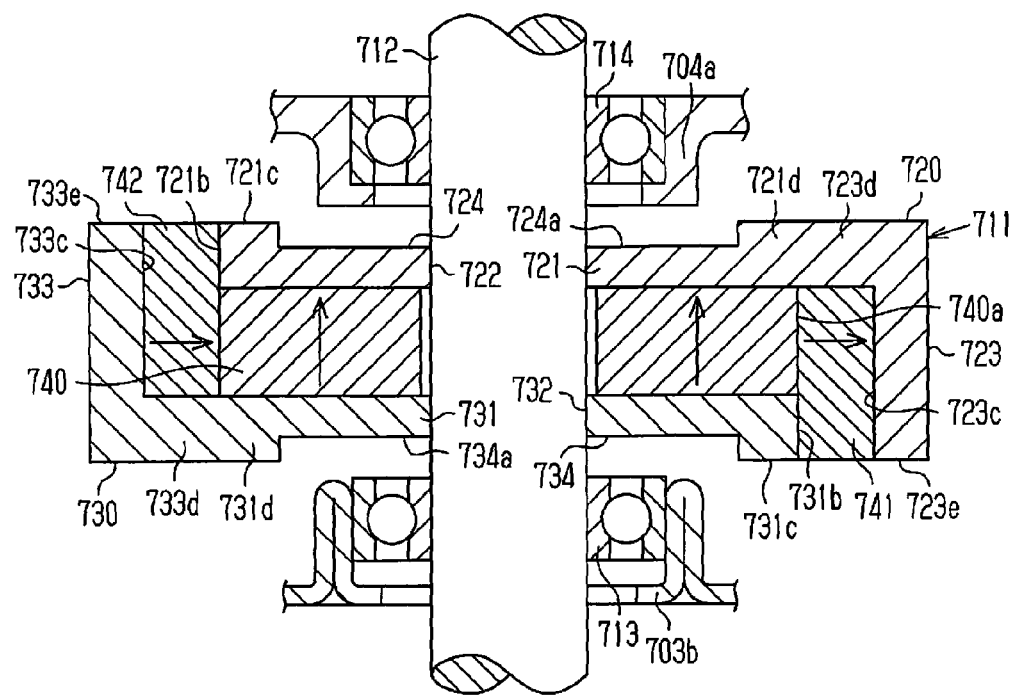

In the thirteenth embodiment, the recessed portions 724, 734 include the inclined portions 724b, 734b, however, no limitation is made hereto. For example, as shown in FIG. 62, a shape thereof may omit the inclined portions 724b, 734b, and cause the bottom portions 724a, 734a to directly transition to the thick portions 721d, 731d. According to such a configuration, the intervals between the recessed portions 724, 734 and the bearings 714, 713 in the axial direction can further be widened.

Figure 63:
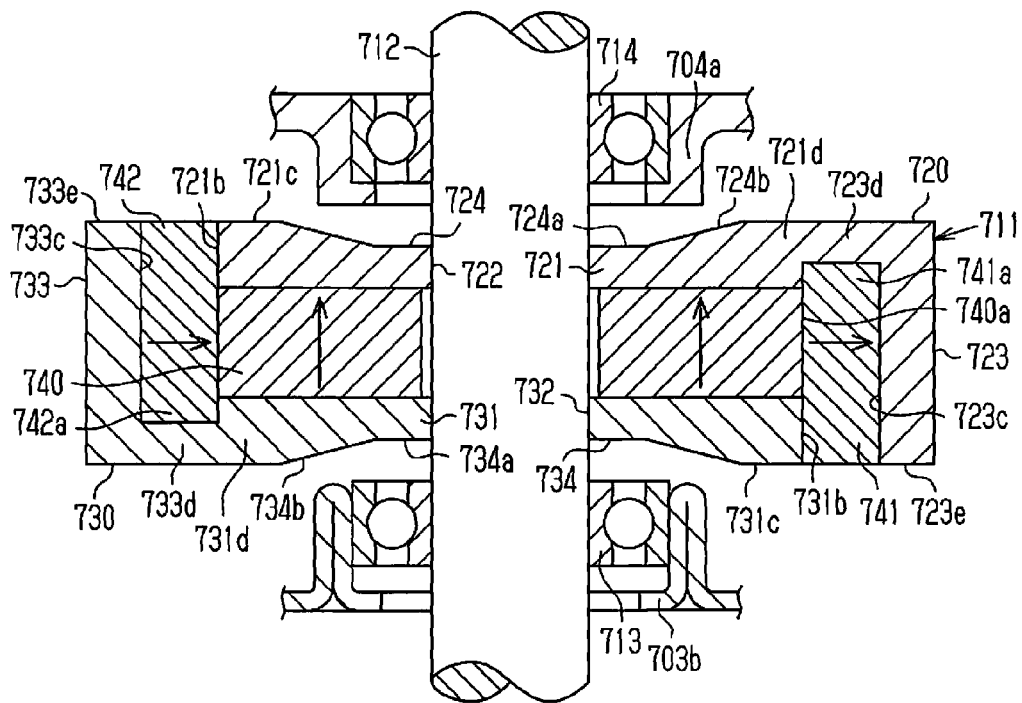

In the thirteenth embodiment, the end surfaces on the inner side in the axial direction of the primary and secondary rear side auxiliary magnets 741, 742 (that is, the end portions of the primary and secondary rear side auxiliary magnets 741, 742 respectively in the vicinity of the first and second core bases 721, 731, and being the end portions contacting the extended portions 723d, 733d in the radial direction) and the end surfaces of the ring magnet 740 in the axial direction are configured to be leveled, however, no limitation is made hereto. For example, as shown in FIG. 63, protruding portions 741a, 742a protruding in the axial direction than the end surfaces of the ring magnet 740 in the axial direction may respectively be formed at the end portions of the primary and secondary rear side auxiliary magnets 741, 742 on the inner side in the axial direction. According to such a configuration, since the primary and secondary rear side auxiliary magnets 741, 742 can be formed long in the axial direction, magnetic capacities of the primary and secondary rear side auxiliary magnets 741, 742 can be increased.

Figure 64:
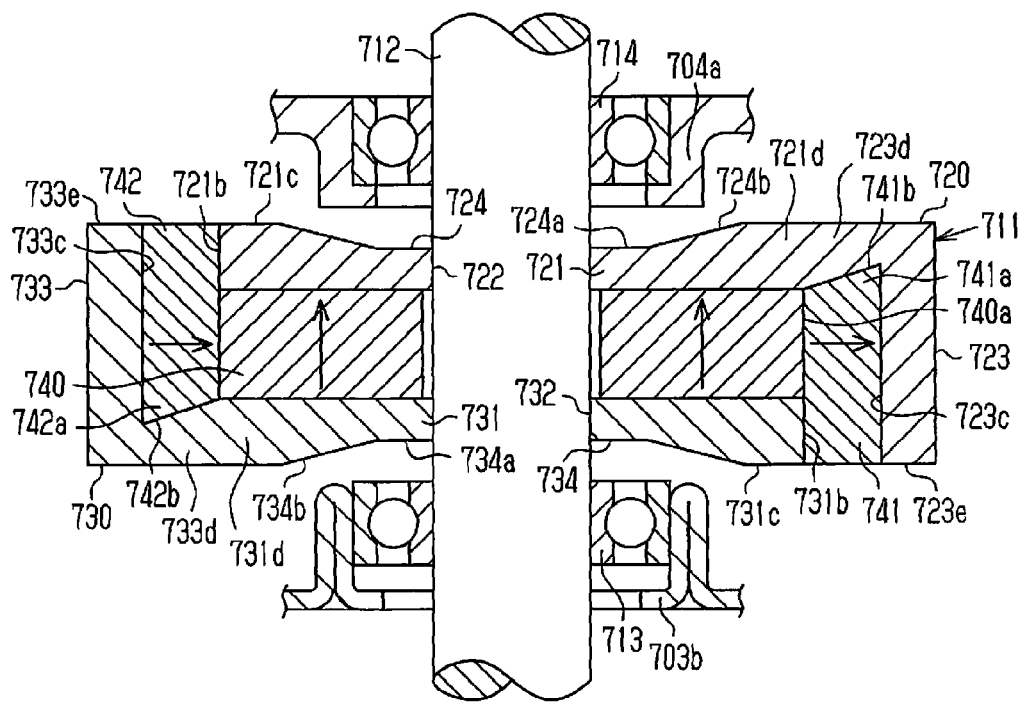

Further, as shown in FIG. 64, end surfaces of the protruding portions 741a, 742a in the axial direction may be formed by tapered-shaped inclined surfaces 741b, 742b so that a length of each of the rear side auxiliary magnets 741, 742 in the axial direction becomes longer as it approaches the outer side in the radial direction. In the configuration shown in FIG. 63, positions in the axial direction of the end portions of the inclined surfaces 741b, 742b in the radial direction conform to positions in the axial direction of the one end surface and the other end surface of the ring magnet 740 in the axial direction. Further, the extended portions 723d, 733d of the respective primary and secondary cog-shaped magnetic poles 723, 733 in the radial direction have a shape corresponding to the inclined surfaces 741b, 742b. That is, the extended portions 723d, 733d in the radial direction have the shape of which thickness in the axial direction becomes thinner toward the outer side in the radial direction. Here, the extended portions 723d, 733d in the radial direction have the shape of which width in the circumferential direction becomes wider toward the outer side in the radial direction (see FIG. 57). Thus, a cross-sectional area of the extended portions 723d, 733d in the radial direction is substantially constant in the radial direction. Accordingly, the magnetic capacities of the respective rear side auxiliary magnets 741, 742 can be increased by the protruding portions 741a, 742a while making the magnetic flux distribution within the extended portions 723d, 733d in the radial direction substantially even.

In the thirteenth embodiment, the respective rear side auxiliary magnets 741, 742 and the respective interpolar magnets 743, 744 may be omitted.

Figure 67:
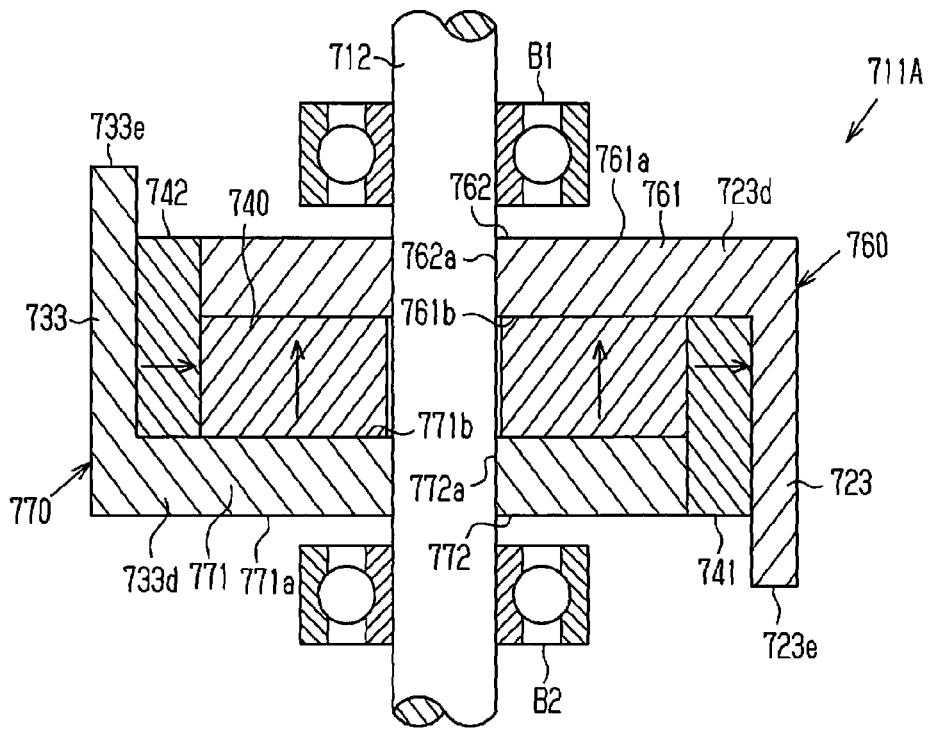
FIG. 67 to FIG. 73 are cross-sectional views showing rotors of other examples.

In the fourteenth embodiment, the rear side auxiliary magnets 741, 742 are projected from the end surfaces 761a, 771a on the outer side in the axial direction, however, no specific limitation is made hereto. For example, as shown in FIG. 67, the end surfaces of the rear side auxiliary magnets 741, 742 in the axial direction may be leveled with the end surfaces 761a, 771a on the outer side in the axial direction.

Figure 68:
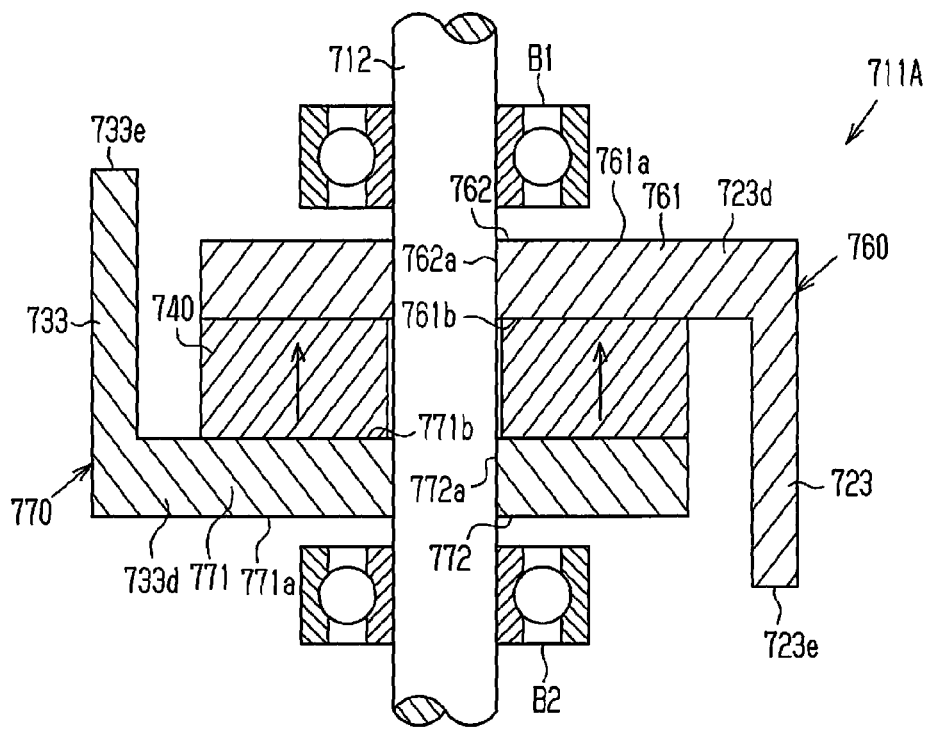

Further, in the fourteenth embodiment, for example as shown in FIG. 68, the respective rear side auxiliary magnets 741, 742 and the respective interpolar magnets 743, 744 may be omitted.

In the fourteenth embodiment, both of the distal portions (end portions in the axial direction) 723e, 733e of the primary and secondary cog-shaped magnetic poles 723, 733 are projected. As an alternative, for example, only the distal portions 723e or the distal portions 733e may be projected.

In the fourteenth embodiment, the distal portions (end portions in the axial direction) 723e, 733e are projected in the axial direction so that the distal portions 723e, 733e of the primary and secondary cog-shaped magnetic poles 723, 733 are positioned on the outer side in the axial direction than the shaft fixing portions 762, 772, however, no specific limitation is made hereto. For example, basal portions (end portions in the axial direction) of at least one of the primary and secondary cog-shaped magnetic poles 723, 733 may be extended in the axial direction.

Figure 69:
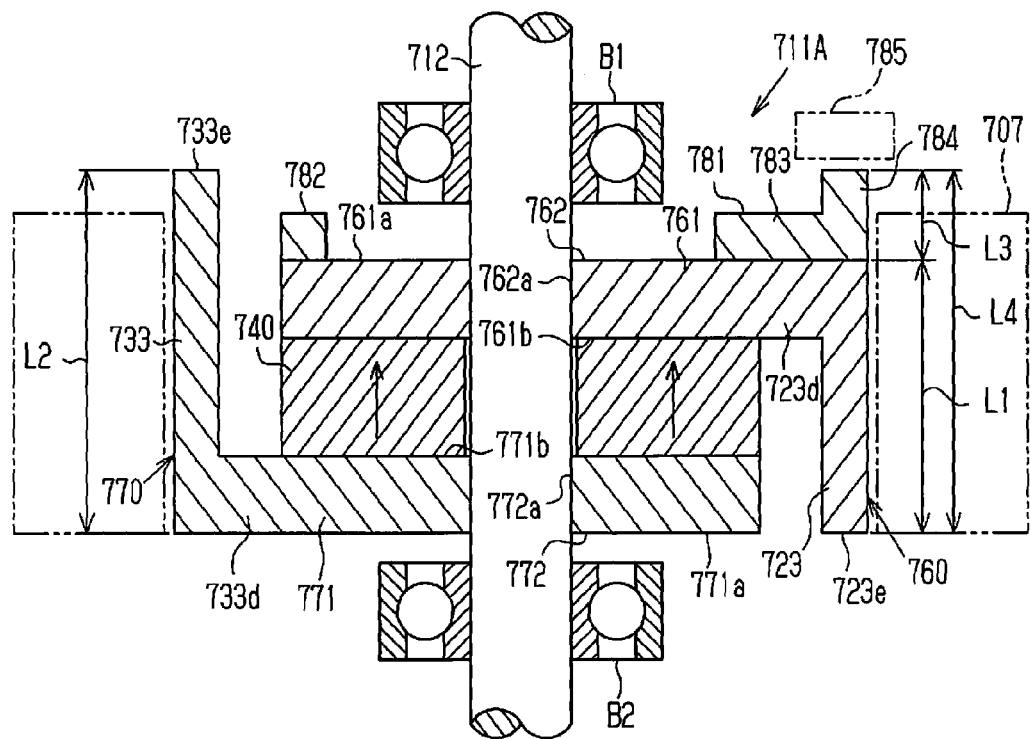
Figure 70:
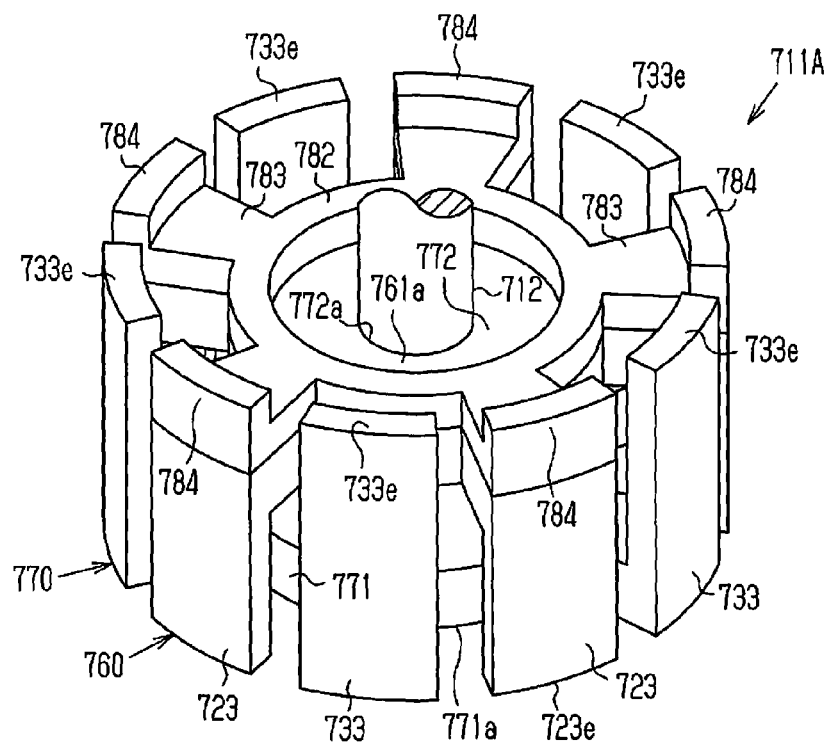

For example, in an example shown in FIG. 69 and FIG. 70, the distal portions 723e of the primary cog-shaped magnetic poles 723 are not extended in the axial direction as in the fourteenth embodiment, and are formed to be positioned on the same plane as the end surface 771a of the second core base 771 on the outer side in the axial direction. The distal portions 733e of the secondary cog-shaped magnetic poles 733 on one side are extended in the axial direction as in the fourteenth embodiment, and overlap with the bearing B1 in the radial direction.

Here, a ring-shaped core member 781 formed of magnetic body such as metal and the like is fixed to an end surface of the first rotor core 760 opposing the bearing B1. The core member 781 includes a circular shaped ring portion 782 fixed to the end surface 761a of the first core base 761 on the outer side in the axial direction. An outer diameter of the ring portion 782 is identical to an outer diameter of the first core base 761.

Further, the core member 781 includes extended portions 783 that are extended to the outer side in the radial direction from the ring portion 782 to positions respectively opposing the primary cog-shaped magnetic poles 723. The respective extended portions 783 have an identical shape as the extended portions 723d of the primary cog-shaped magnetic poles 723 in the radial direction in an axial directional view, and base end side extended portions 784 that are extended to an opposite direction of an extending direction of the primary cog-shaped magnetic poles 723 are formed at outer end portions of the respective extended portions 783 in the radial direction.

The base end side extended portions (end portions in the axial direction) 784 have a width in the circumferential direction that is equal to a width of the primary cog-shaped magnetic poles 723 in the circumferential direction, and are fixed to base end surfaces of the primary cog-shaped magnetic poles 723 in the axial direction. That is, the primary cog-shaped magnetic poles 723 are configured to be elongated to the direction base end side in the axial direction (that is, toward an opposite side from the distal portions 723e of the primary cog-shaped magnetic poles 723) by the base end side extended portions 784. The base end side extended portions 784, that are portions at which the basal portions of the primary cog-shaped magnetic poles 723 are extended in the axial direction, overlap with the bearing B1 in the radial direction in the same manner as the distal portions 733e of the secondary cog-shaped magnetic poles 733. Thus, the base end side extended portions 784 of the primary cog-shaped magnetic poles 723 and the distal portions 733e of the secondary cog-shaped magnetic poles 733 are configured to surround an outer circumference of the bearing B1. A thickness of the base end side extended portions 784 in the radial direction is equal to a thickness of the primary cog-shaped magnetic poles 723 in the radial direction.

Further, a length L3 of the plurality of base end side extended portions 784 in the axial direction is equal to one another, and the length L3 in the axial direction is shorter than the length L1 of the primary cog-shaped magnetic poles 723 in the axial direction. Moreover, a length L4 (L1+L3) of the primary cog-shaped magnetic poles 723 including the base end side extended portions 784 in the axial direction is equal to the length L2 of the secondary cog-shaped magnetic poles 733 in the axial direction. Further, the distal end surfaces of the base end side extended portions 784 in the axial direction and the distal portions 733e of the secondary cog-shaped magnetic poles 733 are positioned on the same plane, and the distal portions 723e of the primary cog-shaped magnetic poles 723 and the base end surfaces of the secondary cog-shaped magnetic poles 733 in the axial direction are positioned on the same plane. That is, the positions of the primary cog-shaped magnetic poles 723 (including the base end side extended portions 784) and the secondary cog-shaped magnetic poles 733 in the axial direction are in conformance. Thus, force in the axial direction generated in the primary and secondary cog-shaped magnetic poles 723, 733 by magnetic effects between the rotor 711 and the armature core 707 is more surely homogenized, which as a result can contribute to further reduction of vibration in the rotor 711A.

According to such a configuration also, substantially the same operation and advantages as the fourteenth embodiment may be obtained. That is, the basal portions in the axial direction (base end side extended portions 784) of the primary cog-shaped magnetic poles 723 and the distal portions 733e of the secondary cog-shaped magnetic poles 733 projected in the axial direction from the end surface 761a of the first core base 761 on the outer side in the axial direction to be positioned on the outer side in the axial direction (bearing B1 side) than the shaft fixing portion 762. Thus, it becomes possible to enlarge areas of the opposing surfaces of the rotor 711 and the armature core 707 by elongating the length L4 of the primary cog-shaped magnetic poles 723 (including the base end side extended portions 784) in the axial direction and the length L2 of the secondary cog-shaped magnetic poles 733 in the axial direction while maintaining the intervals of the respective bearings B1, B2 as they are. Thus, the output power can be improved while preventing the motor 701 from becoming large in the axial direction.

In addition to this, in the present configuration, the length L3 in the axial direction of the base end side extended portions 784 is shorter than the length L1 in the axial direction of the primary cog-shaped magnetic poles 723 not including the base end side extended portions 784. Thus, areas of the inner circumferential surfaces of the base end side extended portions 784 (surfaces on the first core base 761 side, which are surfaces at boundaries of the extended portions 783 and the base end side extended portions 784) can be configured narrow, whereby short circuiting magnetic flux that flows from the inner circumferential surfaces of the base end side extended portions 784 to the first core base 761 through the extended portions 783 can be suppressed to a low amount. As a result, reduction of effective magnetic flux contributing to the rotation of the rotor 711A can be prevented.

In the example shown in FIG. 69 and FIG. 70, a Hall IC 785 as a rotation detecting element for detecting the rotation of the rotor 711A may be arranged to oppose the base end side extended portions 784 in the axial direction, and magnetic change that accompanies the rotation of the rotor 711A may be detected from magnetism mainly from the base end side extended portions 784. According to such a configuration, since detection magnets do not need to be provided additionally on the rotary shaft 712 and the like, an increase in the number of components, and enlargement of the motor 701 in the axial direction can be prevented.

Further, in the example shown in FIG. 69 and FIG. 70, one core member 781 is configured by the respective base end side extended portions 784, the extended portions 783, and the ring portion 782, however, no specific limitation is made hereto. For example, the ring portion 782 and the extended portions 783 may be omitted, a plurality of base end side extended portions 784 may be formed as independent parts, and the plurality of base end side extended portions 784 may respectively be fixed to the base end surfaces of the primary cog-shaped magnetic poles 723.

Figure 71:
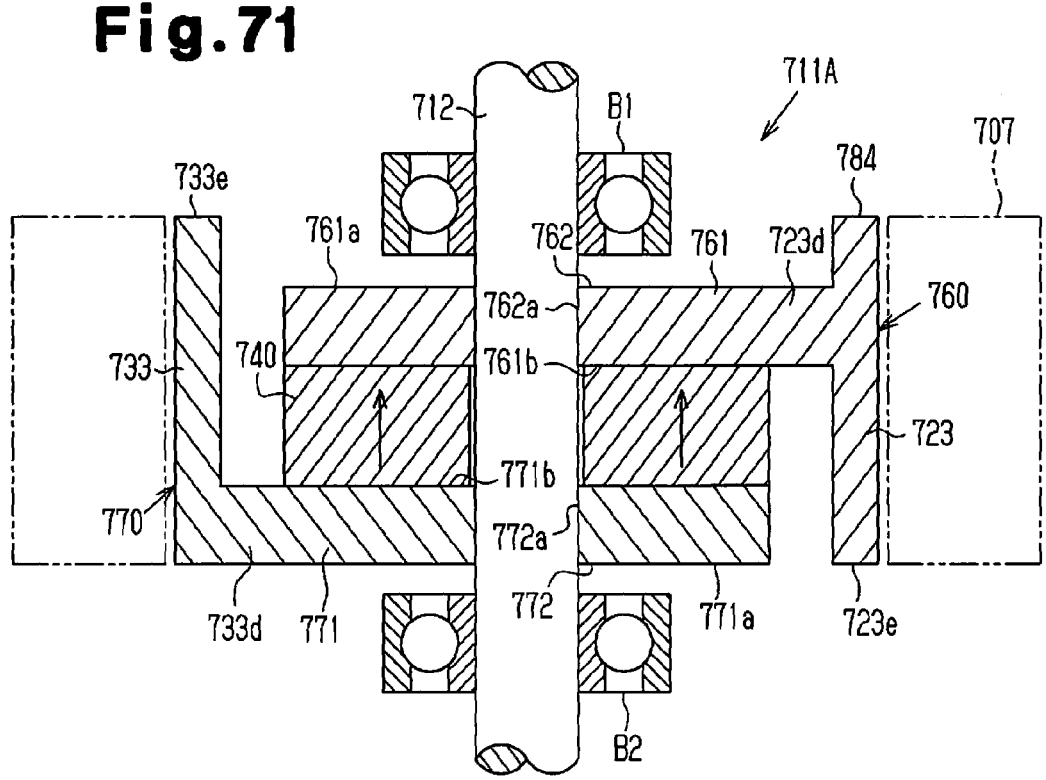
Figure 72:
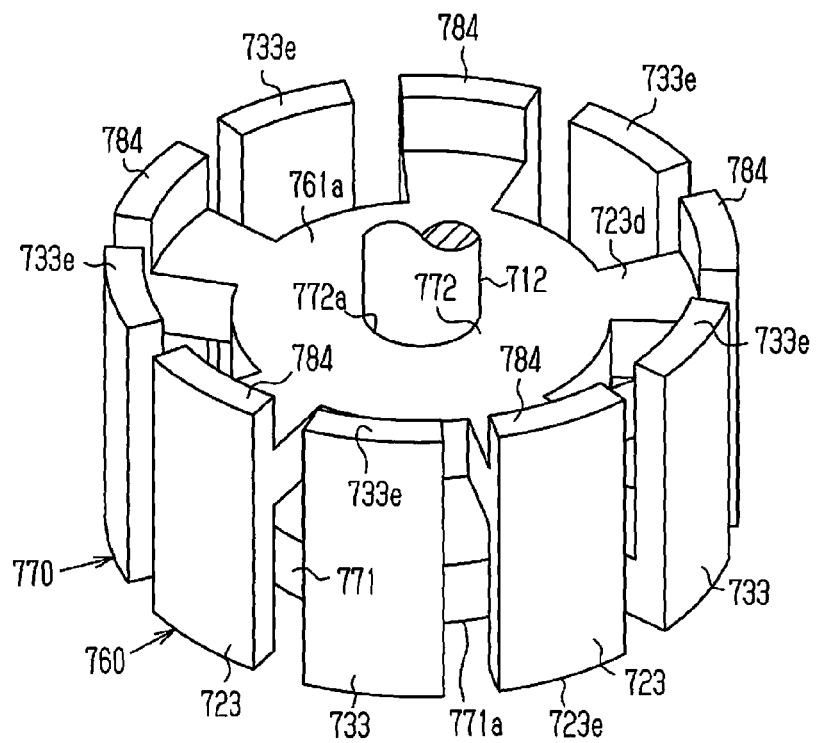

Further, in the example shown in FIG. 69 and FIG. 70, the base end side extended portions 784 are formed by members independent from the primary cog-shaped magnetic poles 723, however, no specific limitation is made hereto. For example, as shown in FIG. 71 and FIG. 72, the base end side extended portions 784 may be formed integrally with the primary cog-shaped magnetic poles 723. According to such a configuration also, substantially the same operation and advantages as the example shown in FIG. 69 and FIG. 70 can be achieved.

Further, in the example shown in FIG. 69 and FIG. 71, the distal portions 723e of the primary cog-shaped magnetic poles 723 and the basal portions of the secondary cog-shaped magnetic poles 733 in the axial direction are configured to be positioned on the same plane as the end surface 771a of the second core base 771 on the outer side in the axial direction, however, no specific limitation is made hereto. For example, either the distal portions 723e of the primary cog-shaped magnetic poles 723 or the basal portions of the secondary cog-shaped magnetic poles 733 in the axial direction, or both of them may be extended in a direction along the axial direction toward the bearing B2 (or elongated by another member), so that either the distal portions 723e or the basal portions of the secondary cog-shaped magnetic poles 733 in the axial direction, or both of them may be positioned on the outer side in the axial direction than the shaft fixing portion 772 of the second core base 771.

Figure 73:
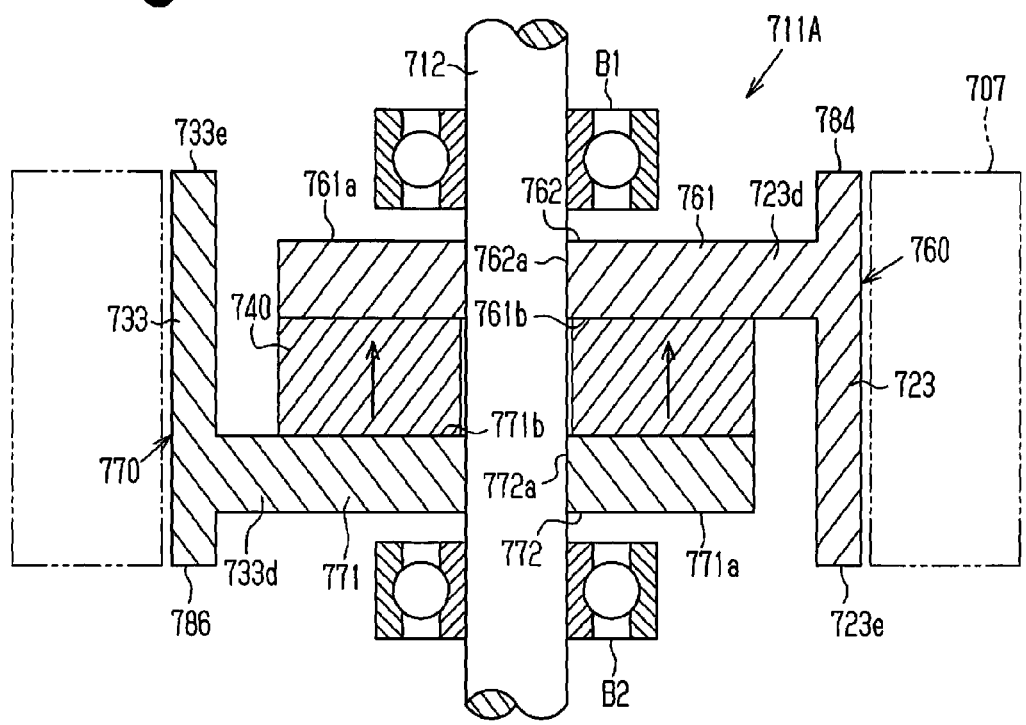

FIG. 73 shows an example of the base end side extended portions 786 with the basal portions of the secondary cog-shaped magnetic poles 733 shown in FIG. 71 projected in the axial direction. The base end side extended portions 786 and the distal portions 723e of the primary cog-shaped magnetic poles 723 are projected toward the bearing B2 in the axial direction to be positioned on the outer side in the axial direction than the shaft fixing portion 772 of the second core base 771. According to such a configuration, since the lengths of the primary and secondary cog-shaped magnetic poles 723, 733 in the axial direction can further be elongated while maintaining the intervals of the respective bearings B1, B2 as they are, the output power can further be improved while preventing the motor 701 from becoming large in the axial direction.

In the fourteenth embodiment and the examples shown in FIG. 69 to FIG. 73, at least one of the distal portions 723e, 733e of the primary and secondary cog-shaped magnetic poles 723, 733 are projected to the outer side in the axial direction than the shaft fixing portion 762 or the shaft fixing portion 772, however, no specific limitation is made hereto. For example, both of the distal portions 723e, 733e of the primary and secondary cog-shaped magnetic poles 723, 733 may not be projected, and the extended portions 784 on the base end side (base end side extended portions 786) may be provided integrally or as independent parts in at least one of the basal portions of the primary and secondary cog-shaped magnetic poles 723, 733.

In the thirteenth and fourteenth embodiments, shapes and numbers of the primary and secondary cog-shaped magnetic poles 723, 733 may suitably be changed according to a configuration.

In the thirteenth and fourteenth embodiments, one ring magnet 740 is used as the field magnet. Alternatively, permanent magnets that are divided into a plurality of segments may be arranged around the rotary shaft 712 between the first and second core bases 731, 771 in the axial direction.

In the thirteenth and fourteenth embodiments, although not specifically mentioned, the first rotor cores 720, 760, the second rotor cores 730, 770 and the armature cores 707 may be configured for example of laminated layers of magnetic metal plate materials, or molded magnetic powders.

In the thirteenth and fourteenth embodiments, although winding methods of coils to teeth of the stator 706 (armature core 707) are not specifically mentioned, concentrated winding, or distributed winding may be used.

The invention claimed is:

1. A brushless motor for an electric power steering device that applies assist torque to a steering wheel, the brushless motor comprising:
a first rotor core including a plurality of primary projecting pieces arranged along a circumferential direction at equal intervals;
a second rotor core shaped identically to the first rotor core and including a plurality of secondary projecting pieces arranged along the circumferential direction at equal intervals, wherein the second rotor core is arranged relative to the first rotor core so that the secondary projecting pieces are positioned between the primary projecting pieces that are adjacent to each other in the circumferential direction; and
a field magnet member arranged between the first rotor core and the second rotor core, wherein the field magnet member is magnetized along an axial direction to generate primary magnetic poles in the primary projecting pieces and generate secondary magnetic poles in the secondary projecting pieces; and
a rotary shaft, wherein
the first rotor core, the second rotor core, and the field magnet member form a rotor,
the first rotor core includes a disk-shaped first core base fixed to the rotary shaft, and the primary projecting pieces extend from an outer circumferential surface of the first core base along a radial direction,
the second rotor core includes a disk-shaped second core base fixed to the rotary shaft, and the secondary projecting pieces extend from an outer circumferential surface of the second core base along the radial direction, and
the field magnet member is a disk-shaped permanent magnet having the same outer diameter as the first and second core bases,
the primary projecting pieces project from the outer circumferential surface of the first core base to an outer side in the radial direction, and distal ends of the primary projecting pieces are bent to extend toward the second rotor core along an axial direction,
the secondary projecting pieces project from the outer circumferential surface of the second core base to the outer side in the radial direction, and distal ends of the secondary projecting pieces are bent to extend toward the first rotor core along the axial direction,
the rotor includes interpolar magnets each arranged between the primary projecting piece and the secondary projecting piece in the circumferential direction,
each interpolar magnet is magnetized in the circumferential direction,
the rotor includes back face magnets arranged radially inside the primary projecting piece and radially inside the secondary projecting piece, and
each back face magnet is magnetized in the radial direction.

2. The brushless motor according to claim 1, wherein the rotor has a length in the axial direction that is one-half or less of an outer diameter of the rotor.

3. The brushless motor according to claim 1, wherein the rotor is one of a plurality of stacked rotors.

* * * * *